(12) United States Patent
Jury et al.

(10) Patent No.: US 7,909,001 B2
(45) Date of Patent: Mar. 22, 2011

(54) METHODS OF RAISING CRUSTACEANS IN LOW SALINITY WATER

(76) Inventors: Steven H. Jury, Scarborough, ME (US); H. William Harris, Jr., Portland, ME (US); Chris F. Holm, Portland, ME (US); Marlies Betka, South Portland, ME (US)

( * ) Notice: Subject to any disclaimer, the term of this patent is extended or adjusted under 35 U.S.C. 154(b) by 17 days.

(21) Appl. No.: 12/612,518

(22) Filed: Nov. 4, 2009

(65) Prior Publication Data

US 2010/0162962 A1  Jul. 1, 2010

Related U.S. Application Data

(63) Continuation of application No. PCT/US2008/005675, filed on May 2, 2008.

(60) Provisional application No. 60/927,559, filed on May 4, 2007, provisional application No. 61/123,666, filed on Apr. 9, 2008.

(51) Int. Cl.
  *A01K 61/00* (2006.01)
(52) U.S. Cl. .......................................... 119/205; 119/212
(58) Field of Classification Search .................. 119/205, 119/204, 206, 207, 211, 212, 213
  See application file for complete search history.

(56) References Cited

U.S. PATENT DOCUMENTS 7,121,227 B2 *  10/2006  Harris et al. ............... 119/51.04

* cited by examiner

*Primary Examiner* — Yvonne R. Abbott
(74) *Attorney, Agent, or Firm* — Hamilton, Brook, Smith & Reynolds, P.C.

(57) ABSTRACT

The present invention relates to methods of raising crustaceans, comprising maintaining crustaceans in low salinity water having a Calcium-sensing Receptor (CaSR) modulator(s), and adding feed that contains an agent that contributes to modulation of a crustacean CaSR to the water.

20 Claims, 18 Drawing Sheets
(3 of 18 Drawing Sheet(s) Filed in Color)

FIG. 7A
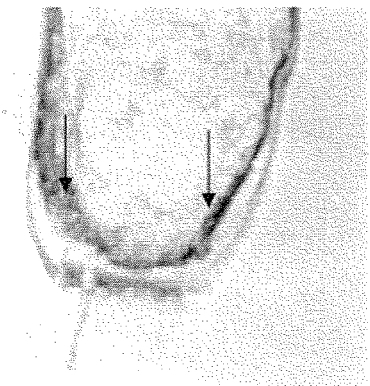
FIG. 7B
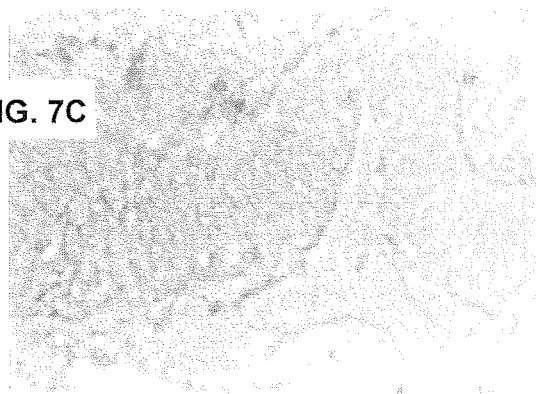
FIG. 7C
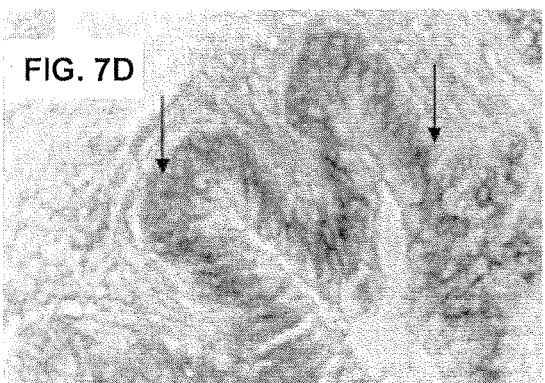
FIG. 7D
FIG. 7E
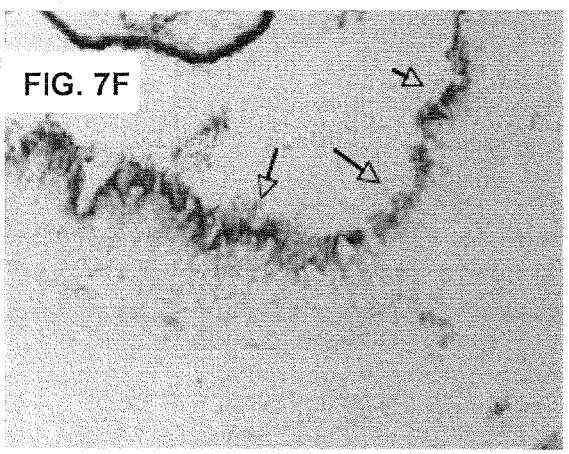
FIG. 7F FIG. 8A
FIG. 8B
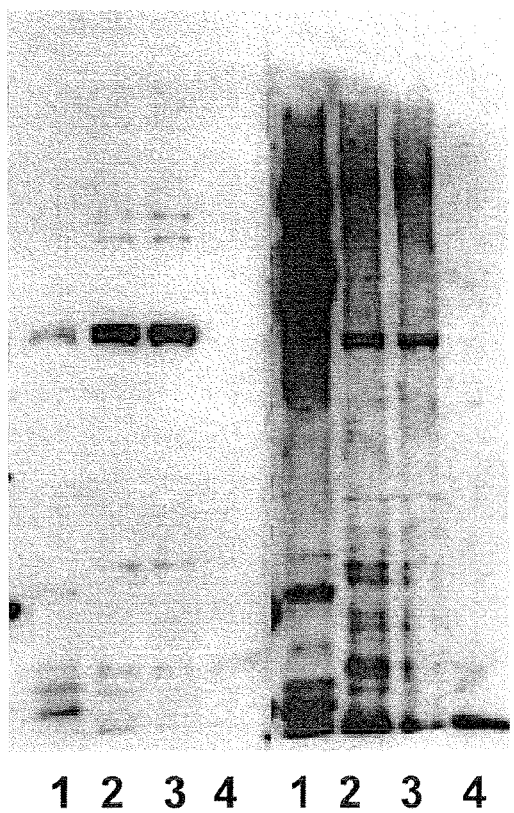
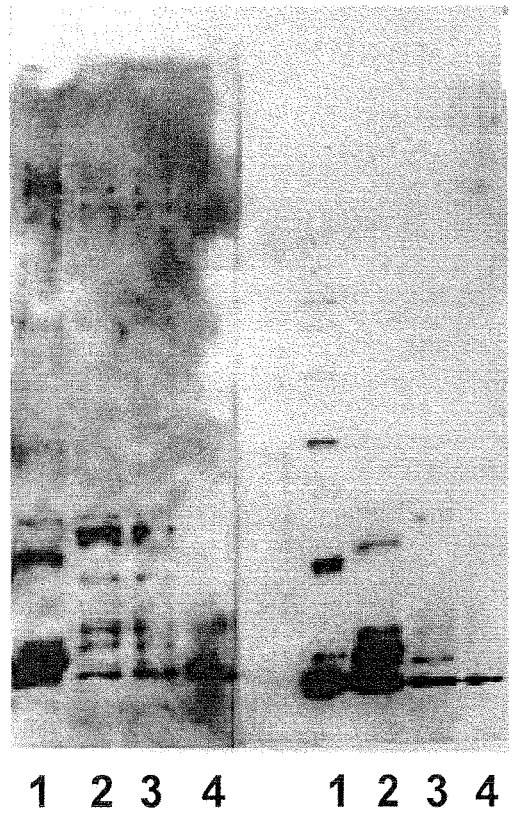
Sample Lanes:
1. Salmon kidney control
2. Shrimp anterior gill
3. Shrimp posterior gill
4. Shrimp hepatopancreas

1. ECO R1
2. BAM HI
3. ECO R1 + BAM HI

FIG. 13A
FIG. 13B
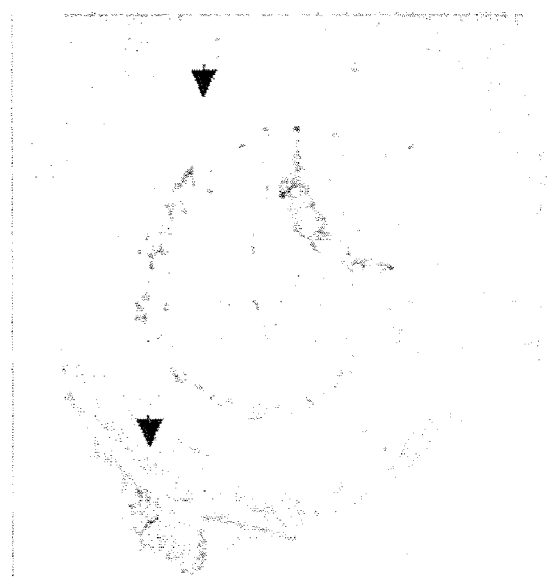
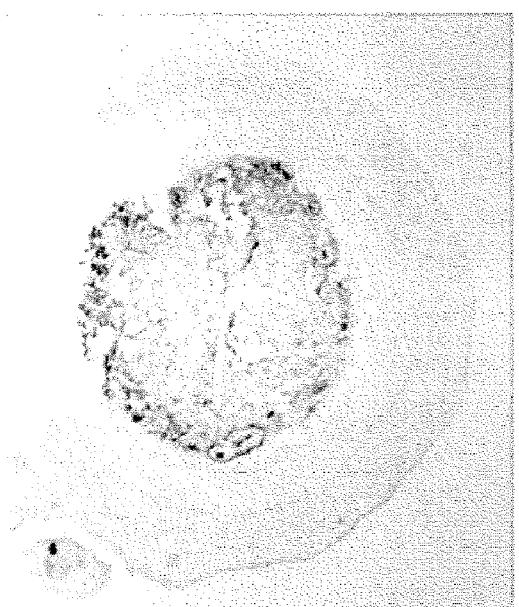
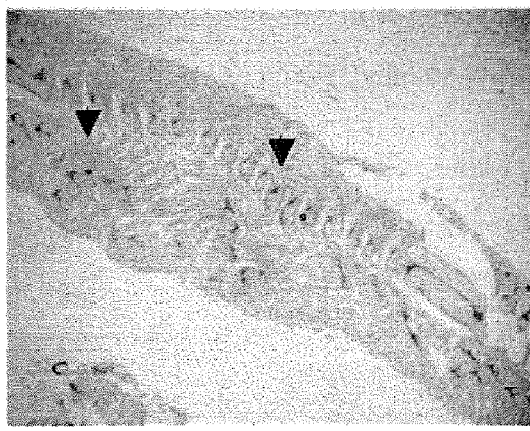
FIG. 13C
FIG. 13D

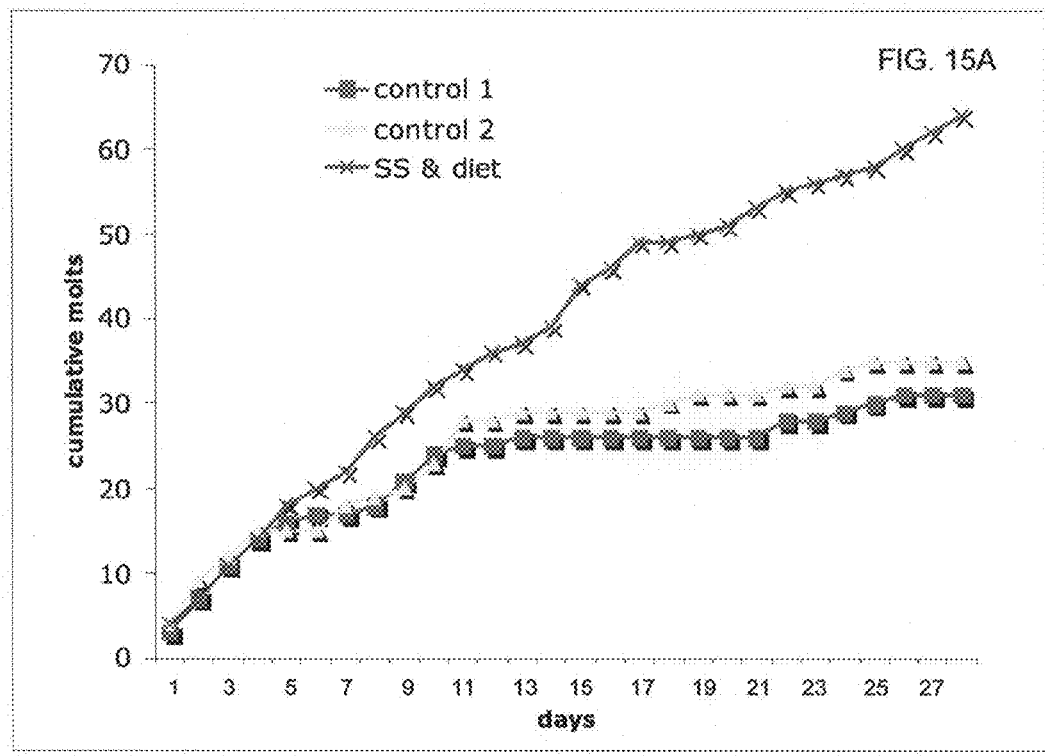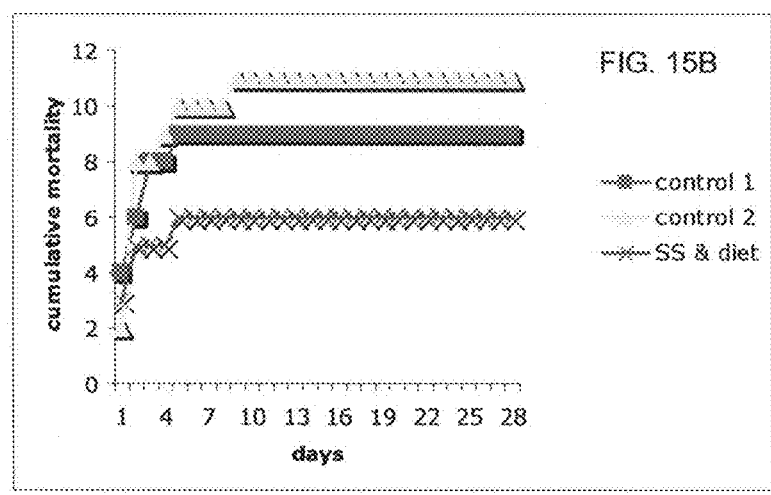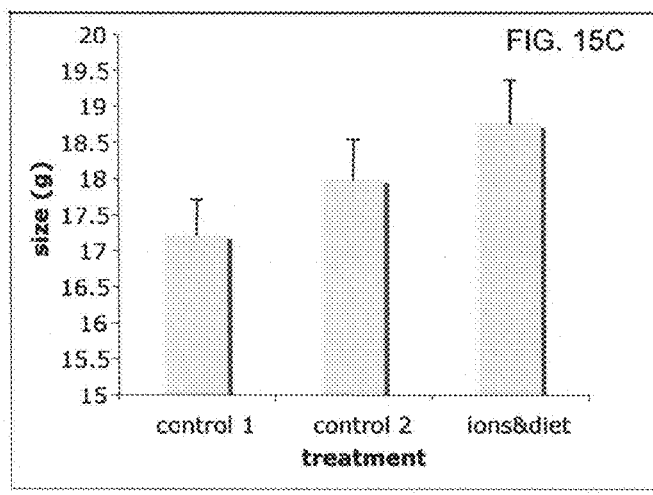

METHODS OF RAISING CRUSTACEANS IN LOW SALINITY WATER

RELATED APPLICATIONS

This application is a continuation of International Application No. PCT/US2008/005675, which designated the United States and was filed on May 2, 2008, published in English, which claims the benefit of U.S. Provisional Application No. 60/927,559, filed on May 4, 2007 and U.S. Provisional Application No. 61/123,666, filed on Apr. 9, 2008. The entire teachings of the above applications are incorporated herein by reference.

BACKGROUND OF THE INVENTION

The production of farmed shrimp and prawns for human consumption, also known as shrimp aquaculture, is a major global food-producing industry that produces greater than 1.5 million tonnes of farmed shrimp on an annual basis. However, current methods of raising shrimp have become unreliable and unstable in many instances, primarily due to disease outbreaks and difficulties meeting various production parameters on a consistent basis.

In the United States and other countries, traditional shrimp farming methods are typically performed at facilities in coastal or brackish waters. However, the high cost of coastal land, the lack of availability of brackish waters, as well as environmental and land stewardship regulations that are not consistent with traditional shrimp farming methods present significant challenges to the continued practice of these traditional methods.

Thus, there is a need for new methods of raising shrimp and other crustaceans (e.g., lobsters, crabs, crayfish).

SUMMARY OF THE INVENTION

The present invention is based on Applicants' discovery of new methods of raising crustaceans under low salinity conditions.

The present invention encompasses, in one embodiment, a method of raising crustaceans in low salinity water, comprising maintaining crustaceans in low salinity water having one or more Calcium-sensing Receptor (CaSR) modulator(s) that are present in an amount sufficient to modulate at least one CaSR in the crustaceans. The method further includes adding feed for crustacean consumption to the low salinity water containing the one or more CaSR modulator(s), wherein the feed contains an agent that is present in an amount sufficient to contribute to modulation of the at least one CaSR in a tissue of the crustaceans, after the crustaceans have consumed the feed. In one embodiment, the agent in the feed is present in an amount sufficient to contribute to an increased level of one or more CaSR modulator(s) in a tissue of the crustaceans. In another embodiment, the feed contains a CaSR modulator. In a particular embodiment, the crustaceans are shrimp.

The invention also provides, in another embodiment, a method of raising crustaceans in low salinity water, comprising adding one or more Calcium-sensing Receptor (CaSR) modulator(s) to low salinity water in an amount sufficient to modulate at least one CaSR in the crustaceans and transferring the crustaceans to the low salinity water containing the one or more CaSR modulator(s). The method also includes the step of adding feed for crustacean consumption to the low salinity water containing the one or more CaSR modulator(s), wherein the feed contains an agent in an amount sufficient to contribute to modulation of the at least one CaSR in a tissue of the crustaceans, after consumption of the feed by the crustaceans.

In yet another embodiment, the invention relates to a method of raising crustaceans, comprising adding one or more Calcium-sensing Receptor (CaSR) modulator(s) to low salinity water in which crustaceans are maintained, wherein the one or more CaSR modulator(s) are added in an amount sufficient to modulate at least one CaSR in tissue of the crustaceans. In addition, the method includes the step of adding feed for crustacean consumption to the low salinity water containing the one or more CaSR modulator(s), wherein the feed contains an agent in an amount sufficient to contribute to modulation of the at least one CaSR in a tissue of the crustaceans, after consumption of the feed by the crustaceans.

In an additional embodiment, the invention relates to a method of raising crustaceans, comprising providing crustaceans that are maintained in low salinity water with a feed that contains one or more Calcium-sensing Receptor (CaSR) modulator(s) in an amount sufficient to modulate at least one CaSR in tissue of the crustaceans, and an agent in an amount sufficient to contribute to modulation of the at least one CaSR in a tissue of the crustaceans, after consumption of the feed by the crustaceans.

In a further embodiment, the invention provides a method of raising shrimp in low salinity water, comprising maintaining shrimp in low salinity water having at least two Calcium-sensing Receptor (CaSR) modulators, each present CaSR modulator present in an amount sufficient to modulate at least one CaSR in the shrimp. Feed that contains an agent in an amount sufficient to contribute to modulation of at least one CaSR in a tissue of the shrimp is added to the low salinity water containing the CaSR modulators. In a particular embodiment, the CaSR modulators include $Ca^{2+}$ and $Mg^{2+}$. In another embodiment, the feed contains at least one CaSR modulator (e.g., tryptophan).

The present invention provides methods of raising crustaceans in low salinity waters, such as the ground waters under a significant portion of the United States or in tanks supported by recirculation aquaculture systems (RAS) equipment, thereby facilitating the development of inland crustacean aquaculture. The methods of the invention also yield crustaceans having highly desirable characteristics, such as improved growth, meat quality, reduced disease, increased survivorship, and/or timing of molting, relative to prior methods of raising crustaceans.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 7A is a micrograph of a histology section from the northern acorn barnacle (*Semibalanus balanoides*), which was probed with pre-immune serum.

FIG. 7B is a micrograph of a coincident histology section (relative to FIG. 7A) from the northern acorn barnacle (*Semibalanus balanoides*), which was probed with LOB-1 antiserum. Localization of immunoreactive LobCaR protein is detected as a dark gray hue. The arrows designate immunostaining in cirri (thoracic feeding appendages).

FIG. 7C is a micrograph of a histology section from the northern acorn barnacle (*Semibalanus balanoides*), which was probed with pre-immune serum.

FIG. 7D is a micrograph of a histology section (relative to FIG. 7C) from the northern acorn barnacle (*Semibalanus balanoides*), which was probed with LOB-1 antiserum. Localization of immunoreactive LobCaR protein is detected as a dark gray hue. The arrows designate immunostaining in epithelial cells lining the GI tract. The arrows designate immunostaining in gut tissue.

FIG. 7E is a micrograph of a histology section from the northern acorn barnacle (*Semibalanus balanoides*), which was probed with pre-immune serum.

FIG. 7F is a micrograph of a histology section (relative to FIG. 7E) from the northern acorn barnacle (*Semibalanus balanoides*), which was probed with LOB-1 antiserum. Localization of immunoreactive LobCaR protein is detected as a dark gray horseradish peroxidase reaction product. The arrows designate immunostaining in epithelial cells lining the GI tract. The arrows designate immunostaining in gut tissue.

FIG. 8A is a western blot of specific white shrimp (*Litopenaeus vannamei*) tissues probed with (immune) or without (preimmune) SDD antibody. The arrow shows the positive staining for SDD in the Atlantic salmon kidney positive control (lane 1), as well as in shrimp anterior (lane 2) and posterior gill (lane 3) that is the same as that shown in FIG. 8B.

FIG. 8B is a western blot of specific white shrimp (*Litopenaeus vannamei*) tissues probed with (immune) or without (preimmune) LobCar antibody. The arrow shows the positive staining for SDD in the Atlantic salmon kidney positive control (lane 1), as well as in shrimp anterior (lane 2) and posterior gill (lane 3) that is the same as that shown in FIG. 8A.

FIG. 13A is a micrograph of a histology section from the posterior gill of the shrimp *Litopenaeus vannamei*, which was probed with Lob-1 antiserum (immune) or in an adjacent section that was not stained with Lob-1 (preimmune). A medium gray in cells located at the presumptive osmoregulatory tissues at the base of gill filaments represents a deposition product that indicates specific staining (see arrows).

FIG. 13B is a micrograph of a higher magnification histology section from the posterior gill of the shrimp *Litopenaeus vannamei*, which was probed with Lob-1 antiboty (LobCaR) or stained for Na/K atpase in an adjacent section. A darker gray (see arrows) indicates positive staining showing colocalization of LobCaR and Na/Katpase at the base of gill filaments in tissues that are putatively involved in ionoregulation, not respiration (see arrows).

FIG. 13C is a micrograph of a histology section from the eyestalk of the shrimp *Litopenaeus vannamei*, which was probed with Lob-1 antiserum. Specific staining is present in the integumentary epithelium, presumptive endocrine tissue and presumptive neural sheath tissue (see arrows).

FIG. 13D is a micrograph of a histology section from the intestine of the shrimp *Litopenaeus vannamei*, which was probed with Lob-1 antiserum. Specific staining is detected in the intestinal epithelial cells and in the lining of gastrointestinal tract (see arrows). The dark staining within the lumen is non-specific staining of fecal material.

FIG. 15A is a graph depicting the effect of adding CaSR modulators to the water and feed (SS & diet group) on molting of the shrimp *Litopenaeus vannamei*. No CaSR modulators were added to the water or feed in either control group (control 1, control 2).

FIG. 15B is a graph depicting the effect of adding CaSR modulators to the water and feed (SS & diet group) on survival of the shrimp *Litopenaeus vannamei*. No CaSR modulators were added to the water or feed in either control group (control 1, control 2).

FIG. 15C is a graph depicting the effect of adding CaSR modulators to the water and feed (ions & diet group) on growth of the shrimp *Litopenaeus vannamei*. No CaSR modulators were added to the water or feed in either control group (control 1, control 2).

DETAILED DESCRIPTION OF THE INVENTION

Definitions

Figure 1:
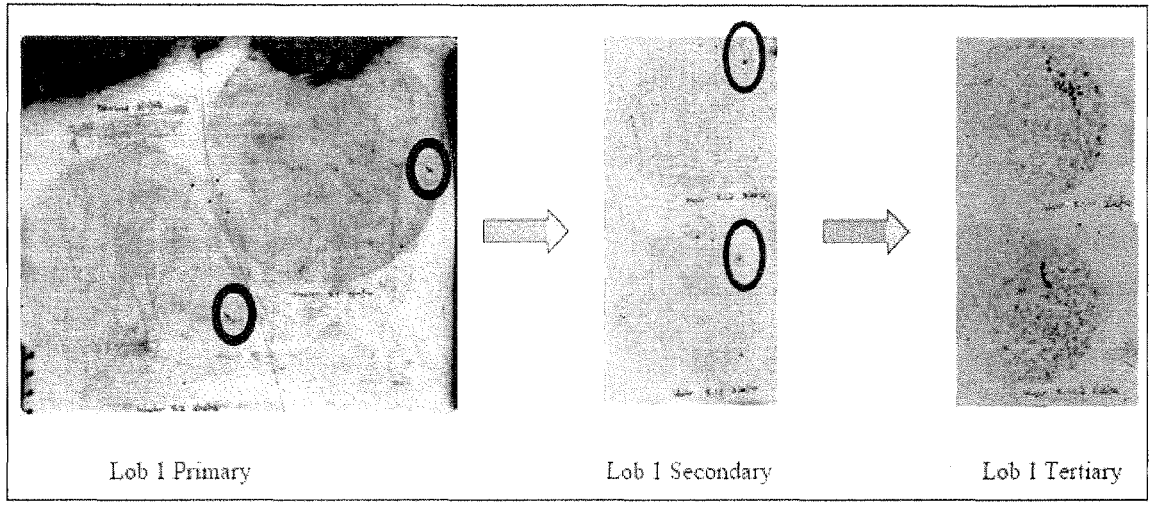
FIG. 1 are autoradiographs of filters that were probed with $^{32}$P-labeled SalmoKCaR II DNA under reduced stringency hybridization conditions, showing the detection of bacteriophage plaques containing the LobCaR gene. The heavy black circles present on duplicate filters after primary and secondary screening (see panels labeled "Lob 1 Primary" and "Lob 1 Secondary," respectively) show specific hybridization of the $^{32}$P-labeled SalmoKCaR II DNA probe to a single positive plaque from among hundreds of other plaques present on the filter. Final selection of the single pure plaque results in $^{32}$P-labeling of all the plaques present on the filter after tertiary screening (see panel labeled "Lob 1 Tertiary").

As used herein "standard seawater" or "normal seawater" refers to water having a total salt concentration of about 30 to about 34 parts per thousand (ppt). The concentrations of major ionic constituents in standard seawater are typically about 450 mM $Na^+$, about 10 mM $Ca^{2+}$, about 50 mM $Mg^{2+}$ and about 10 mM $K^+$ at a pH of about 7.9 to about 8.3.

As used herein, the term "low salinity water" refers to water having a total salt concentration that is significantly less than that of standard seawater, but no less than 0.5 ppt. In a preferred embodiment, "low salinity water" refers to water having a total salt concentration that is about 0.5 ppt to about 12 ppt, and more preferably, about 0.5 ppt to about 5 ppt.

As used herein, "low salinity water with altered ionic conditions" refers to low salinity water, wherein the ratios of the major cations (e.g., $Na^+$, $Ca^{2+}$, $Mg^{2+}$, $K^+$, $Sr^{2+}$) in the water differ significantly from those in standard seawater. In a particular embodiment, "low salinity water with altered ionic conditions" refers to low salinity water, having Na/Ca and/or Mg/Ca ratios that are significantly lower than those found in standard seawater, which typically has a Na/Ca ratio of about 45 and a Mg/Ca ratio of about 5, on a molar/molar basis.

The term "calcium-sensing receptor" or "CaSR" refers to any multimodal G protein coupled receptor (GPCR) that senses extracellular levels of calcium ions. CaSRs are also known in the art as "polyvalent cation-sensing receptors," "polyvalent cation receptors" and "PVCRs," and these terms are used interchangeably herein.

"CaSR modulator" refers to any agent that binds to and modulates the expression, sensitivity, activity, signalling and/or physiological function of a CaSR protein in one or more tissues of a crustacean. A "CaSR modulator" can be, for example, a CaSR agonist or a CaSR antagonist. The term "CaSR modulator" encompasses primary receptor ligands as well as allosteric modulators of a CaSR protein and includes compounds belonging to the following functional classes: calcimimetics (e.g., a Type-I calcimimetic, a Type-II calcimimetic) and calcilytics. Preferred calcimimetic and calcilytic CaSR modulators include, for example, polyvalent cations (e.g., divalent cations, trivalent cations, organic polycations), L-amino acids (e.g., L-aromatic amino acids, L-kynurenines), peptides, phenylalkylamines, polyaromatic hydrocarbons, substituted piperidines and substituted pyrrolidines.

As used herein, the "sensitivity" of the CaSR refers to alteration of CaSR expression in response to a change in the concentration of CaSR modulators. CaSR expression can be assessed by measuring or detecting CaSR polypeptide or nucleic acid molecules in a sample by standard methods.

A "significant" increase is used herein to refer to a measurable rise, particularly a significant rise, in the level or quantity of a CaSR modulator(s) in one or more tissues of the crustaceans, as compared to a control or reference.

As used herein, "effective amount" refers to an amount of a CaSR modulator that significantly alters (e.g., increases, decreases) the behavior or physiology of a crustacean.

"Crustacean" refers to any arthropod animal belonging to the subphylum *Crustacea*.

The term "peptide" refers to a naturally-occurring or synthetic compound that includes from about 2 to about 100 amino acid residues that are joined together by covalent bonds (e.g., peptide bonds, non-peptide bonds). Such peptides are typically less than about 100 amino acid residues in length and are preferably about 2 to about 10 amino acid residues in length. Peptides can be linear or cyclic and can include unmodified and/or modified amino acid residues. In a preferred embodiment, the peptide comprises amino acids that are joined by peptide bonds. The term "peptide" also encompasses peptidomimetics.

As used herein, the term "polypeptide" refers to a polymer of amino acids of any length and encompasses proteins, peptides, and oligopeptides.

As used herein, the terms "chimeric polypeptide" or "fusion polypeptide" refer to polypeptides derived from the fusion of a first amino acid sequence with a second amino acid sequence, wherein the first and second amino acid sequences are not present in a single naturally-occurring polypeptide chain.

As used herein, "functional equivalent" refers to a variant polypeptide that possesses the biological activity of a native polypeptide and/or a functional domain thereof.

As used herein, the term "antibody" refers to a polypeptide having affinity for a target, antigen, or epitope, and includes both naturally-occurring and engineered antibodies. The term "antibody" encompasses polyclonal, monoclonal, human, chimeric, humanized, primatized, veneered, and single chain antibodies, as well as fragments of antibodies (e.g., Fv, Fc, Fd, Fab, Fab', F(ab'), scFv, scFab, dAb). (See e.g., Harlow et al., *Antibodies A Laboratory Manual*, Cold Spring Harbor Laboratory, 1988).

As defined herein, the term "antigen binding fragment" refers to a portion of an antibody that contains one or more CDRs and has affinity for an antigenic determinant by itself. Non-limiting examples include Fab fragments, $F(ab)'_2$ fragments, heavy-light chain dimers, and single chain structures, such as a complete light chain or a complete heavy chain.

As used herein, "specifically binds" refers to a probe (e.g., an antibody, an aptamer) that binds to a target protein (e.g., a CaSR, a LobCaR polypeptide) with an affinity (e.g., a binding affinity) that is at least about 5 fold, preferably at least about 10 fold, greater than the affinity with which the probe binds a non-target protein. "Target protein" refers to a protein to be detected (e.g., using a probe comprising a detectable label).

"Detectable label" as used herein refers to any moiety that is capable of being specifically detected, either directly or indirectly, and therefore, can be used to distinguish a molecule that comprises the detectable label from a molecule that does not comprise the detectable label.

As used herein, the term "nucleic acid" refers to polynucleotides, including naturally occurring polynucleotides, such as deoxyribonucleic acid (DNA) and ribonucleic acid (RNA). The term should also be understood to include analogs of either RNA or DNA that are made from nucleotide analogs (e.g., locked nucleic acid (LNA), peptide nucleic acid (PNA)). The nucleic acids described herein can be single-stranded (sense, antisense) or double-stranded polynucleotides and can include unconventional modifications to any portion of the molecule, including, for example, the sugar phosphate backbone or the base portion of one or more nucleotides. Furthermore, the nucleic acids of the present invention may be naturally-occurring, recombinant or synthetic.

As used herein, an "isolated nucleic acid" refers to a nucleic acid that is separated from nucleotide sequences that normally flank the nucleic acid as it occurs in nature (e.g., in an organism's genome). The term also applies to nucleic acids that are substantially purified from other components that naturally accompany the nucleic acid (e.g., RNA, DNA, protein) in a cell. Such isolated nucleic acid molecules include, for example, a recombinant DNA molecule that has been incorporated into a vector or plasmid, or into the genome of a host prokaryote or eukaryote, or which exists as a separate molecule (e.g., as a cDNA or a genomic or cDNA fragment produced by PCR or restriction enzyme digestion) that is independent of other sequences. The term also includes a recombinant nucleic acid that is part of a hybrid gene encoding additional polypeptide sequence. In vivo and in vitro RNA transcripts of the present invention are also encompassed by "isolated" nucleic acid molecules.

A "substantially purified nucleic acid" is one that is separated from at least about 75%, 80%, 90%, or 95% of the components which naturally accompany the nucleic acid in its naturally occurring state, as assessed on a per-weight basis or a per-mole basis.

As used herein, the term "percent (%) identical" refers to sequence identity between two nucleotide sequences or between two amino acid sequences. Identity can be determined by comparing a position in each of two or more sequences, which may be aligned for purposes of comparison. When an equivalent position in the compared sequences is occupied by the same nucleotide base or amino acid, the molecules are considered to be identical at that position. When the equivalent site is occupied by the same or a similar amino acid residue (e.g., similar in steric or electronic nature), then the molecules are referred to as homologous or similar at that position. Expression as a percentage of homology, similarity or identity refers to a function of the number of identical or similar amino acids at positions shared by the compared sequences (i.e., % identity=# of identical positions/ total # of positions×100). Various alignment algorithms or programs are known to those of skill in the art and may be used to determine percent identity. A non-limiting example of such an algorithm is described in Karlin, et al. *Proc. Natl. Acad. Sci. USA,* 90:5873-5877 (1993). Such an algorithm is incorporated into the BLASTN and BLASTX programs (version 2.2) as described in Schaffer, et al. *Nucleic Acids Res.,* 29:2994-3005 (2001). When utilizing BLAST and Gapped BLAST programs, the default parameters of the respective programs (e.g., BLASTN; available at the Internet site for the National Center for Biotechnology Information) can be used. In one embodiment, the searchable database is a non-redundant (NR) database, and parameters for sequence comparison can be set at: no filters; Expect value of 10; Word Size of 3; the Matrix is BLOSUM62; and Gap Costs have an Existence of 11 and an Extension of 1.

The phrase "specifically hybridizes" refers to the specific association of two complementary nucleotide sequences (e.g., DNA/DNA, RNA/RNA, DNA/RNA, DNA/PNA) in a duplex under stringent conditions. The association of two nucleic acid molecules in a duplex occurs as a result of hydrogen bonding between complementary base pairs.

As used herein, the term "isolated polypeptide" refers to a polypeptide that is purified from, or otherwise substantially free of, other proteins and cellular material normally associated with the native protein in a cell or cell lysate. The term "isolated polypeptide" encompasses individual preparations of a protein comprising, in one embodiment, less than 20% (by dry weight) contaminating protein, and, in another embodiment, comprises less than 5% contaminating protein.

Unless defined otherwise, all technical and scientific terms used herein have the same meaning as commonly understood by one of ordinary skill in the art of biology or chemistry (e.g., in cell culture, molecular genetics, nucleic acid chemistry, hybridization techniques and biochemistry). Standard techniques are used for molecular, genetic and biochemical methods (see generally, Sambrook et al., Molecular Cloning: A Laboratory Manual, 2d ed. (1989) Cold Spring Harbor Laboratory Press, Cold Spring Harbor, N.Y. and Ausubel et al., Short Protocols in Molecular Biology (1999) $4_{th}$ Ed, John Wiley & Sons, Inc. which are incorporated herein by reference) and chemical methods.

The present invention is based, in part, on the identification of CaSR proteins in crustaceans. As described herein, a gene encoding a CaSR, referred to herein as LobCaR, has been isolated and cloned from tissue of the spiny lobster *Panulirus interruptus* using molecular biological techniques, as described in Example 1. Using nucleic acid probes based on the LobCaR sequence and antibodies that recognize a peptide in the LobCaR protein, CaSR proteins were detected in various tissues of different species of lobster (Example 3), shrimp (Examples 5 and 7) and other crustaceans (Example 4). Furthermore, the addition of CaSR modulators to low salinity water and shrimp feed increased the incidence of molting, growth, and survivorship (Example 9), and influenced the hemolymph composition and amino acid composition in the tail muscle of shrimp raised in the low salinity water (Example 10).

Methods of Raising Crustaceans

The present invention relates to methods of raising crustaceans in low salinity water. The methods involve modulating the expression, sensitivity, activity, signalling and/or physiological function of a Calcium-sensing Receptor (CaSR) (e.g., at least one CaSR) in one or more tissues of the crustaceans. The invention relates to modulating the CaSR(s) that affects the ability of crustaceans to adapt to, grow in and/or survive in low salinity water, including low salinity water with altered ionic conditions.

In particular, the methods of the present invention include maintaining crustaceans in low salinity water having one or more Calcium-sensing Receptor (CaSR) modulator(s) that are present in an amount sufficient to modulate at least one CaSR in the crustaceans, and adding a specially made or modified feed to the low salinity water for consumption by the crustaceans. The CaSR modulator(s) can be present in the water, the feed, or both. In one embodiment, the method involves adding one or more CaSR modulator(s) to low salinity water that already contains crustaceans. In another embodiment, the crustaceans are transferred to low salinity water to which the CaSR modulator(s) have already been added. In yet another embodiment, the method involves adding a feed that contains one or more CaSR modulator(s) to low salinity water in which crustaceans are maintained. When CaSR modulators are added to both the low salinity water and the feed, the CaSR modulator in the feed can be the same as, or different from, the CaSR modulator in the water. When the CaSR modulator in the water and feed is the same, the water or feed may contain an additional CaSR modulator(s) that is not present in the other.

The feed contains a sufficient amount of an agent that contributes to modulation of at least one CaSR in a tissue of the crustaceans after the crustaceans have consumed the feed. In certain embodiments, the agent in the feed can enhance the ability of a CaSR modulator(s) to modulate the expression, sensitivity, activity, signalling and/or physiological function of at least one CaSR in one or more tissues of the crustaceans. Preferably, the CaSR modulator is increased in a tissue of the crustacean that contains a CaSR, such as, for example, hemolymph, a gastrointestinal tissue, a hepatopancreatic tissue, an endocrine tissue, a neural or meuromuscular tissue, a reproductive tissue, an osmoregulatory tissue, and an integumentary tissue. Methods of measuring or detecting a significant increase in a CaSR modulator are disclosed herein and/or known to one skilled in the art. In a particular embodiment, the agent in the feed that contributes to modulation of the at least one CaSR in a tissue of the crustaceans is sodium chloride (NaCl) (e.g., between about 1% and about 10% by weight, or about 10,000 mg/kg to about 100,000 mg/kg) or another sodium salt.

The methods of the present invention pertain to raising crustaceans in low salinity water. Particularly suitable crustaceans for the methods of the invention are motile crustaceans, such as, for example, shrimp, prawns, spiny lobsters, clawed lobsters, crayfish and crabs. In a preferred embodiment, the crustaceans are shrimp. Exemplary species of shrimp include, but are not limited to, *Litopenaeus vannemei*,

*Penaeus monodon, P. stylirostris, P. chinensis, P. japonicus, P. indicus, P. merguiensis* and *Machrobrachium rosenbergii*. In another preferred embodiment, the crustaceans are lobsters (e.g., spiny lobsters, clawed lobsters). Suitable species of lobster include, species of lobster belonging to one of the following genera: *Homarus, Nephrops, Jasus, Panulirus,* and *Palinurus*, among others.

The crustaceans are maintained in low salinity water containing CaSR modulators in sufficient amounts to modulate the expression, sensitivity, activity, signalling and/or physiological function of at least one CaSR in one or more tissues of the crustaceans. The CaSR, which is located in various tissues (e.g., gill, intestine, antennal gland, testis, lymphoid organ, eyestalk) of crustaceans, senses alterations in levels of CaSR modulators, including various polyvalent ions (e.g., divalent cations), for example, in the surrounding water, in hemolymph or in the luminal contents of tubules or hemal spaces inside the body, such as antennal gland, hepatopancreas, or intestine. The ability to sense CaSR modulators results in a modulation of the CaSR, thereby allowing the crustaceans to better grow in low salinity water. Modulation of the CaSR can occur, for example, in one or more tissues (e.g., ionoregulatory tissues, osmoregulatory tissues).

The modulation of CaSRs by CaSR modulators allows for, or assists in, one or more of the following functions in crustaceans: sensing or adapting to at least one CaSR modulator in tissues (e.g., hemolymph) or in the surrounding environment; altering the behavioral response to sensory stimuli, especially olfaction and gustation; altering osmoregulation or divalent cation homeostasis; altering one or more endocrine pathways; and altering chemo sensory signal concentration or composition. As used herein, the "sensitivity" of the CaSR refers to either an alteration of CaSR expression in response to a change in the concentration of CaSR modulators or an alteration in the ability of the CaSR to respond to various ligands that stimulate its action to interact in specific ways with other cellular signal transduction pathways. CaSR expression can be assessed by measuring or detecting CaSR polypeptide or nucleic acid molecules in a sample by standard methods. Suitable assays and techniques for assessing the expression sensitivity, activity, signaling and/or physiological function of a CaSR are known in the art, and include those described herein.

CaSR modulators include both CaSR agonists (e.g., calcimimetics) that increase the expression, sensitivity, activity, signalling and/or physiological function of at least one CaSR, and CaSR antagonists (e.g., calcilytics) that decrease the expression, sensitivity, activity, signalling and/or physiological function of at least one CaSR. Calcimimetic CaSR modulators include, for example, Type 1 calcimimetics and Type II calcimimetics (e.g., NPS-R-467 and NPS-R-568 from NPS Pharmaceutical Inc., (Salt Lake, Utah, U.S. Pat. Nos. 5,962,314; 5,763,569; 5,858,684; 5,981,599; 6,001,884), which can be administered in concentrations of between about 0.1 µM and about 100 µM feed or water. See Nemeth, E. F. et al., *PNAS* 95: 4040-4045 (1998)).

CaSR modulators encompass primary receptor ligands for a CaSR, as well as allosteric modulators of a CaSR (e.g., aromatic amino acids, tryptophan derivatives, peptides). CaSR modulators can be naturally occurring (e.g., isolated from a natural source), synthetic (e.g., produced by standard chemical synthesis techniques), or recombinant (e.g., produced by bio fermentation).

Suitable CaSR modulators for use in the methods of the invention include, but are not limited to, polyvalent cations (e.g., inorganic polycations, organic polycations) and amino acids. Examples of inorganic polycations are divalent cations including calcium (e.g., at a concentration between about 0.3 and about 12.0 mM) and magnesium (e.g., at a concentration between about 0.5 and about 30.0 mM); and trivalent cations including, but not limited to, gadolinium (Gd3+) at a concentration between about 1 and about 500 µM.

Organic polycations include, but are not limited to, aminoglycosides such as neomycin or gentamicin (e.g., in concentrations of between about 1 and about 8 gm/kg feed) as well as organic polycations including polyamines (e.g., polyarginine, polylysine, polyhistidine, polyomithine, spermine, cadaverine, putricine, copolymers of poly arginine/histidine, poly lysine/arginine (e.g., in concentrations of between about 10 µM and 10 mM feed)). See Brown, E. M. et al., *Endocrinology* 128: 3047-3054 (1991); Quinn, S. J. et al., *Am. J. Physiol.* 273: C1315-1323 (1997). In a particular embodiment, the organic polycation is hexacycline.

Additionally, CaSR modulators include amino acids, such as L-amino acids. The L-amino acids can be unmodified or modified (e.g., halogenated). Examples of suitable L-amino acids are L-Tryptophan, L-Tyrosine, L-Phenylalanine, L-Alanine, L-Serine, L-Arginine, L-Histidine, L-Leucine, L-Isoleucine, and L-Cystine (e.g., at concentrations of between about 1 and about 10 gm/kg feed). See Conigrave, A. D., et al., *PNAS* 97: 4814-4819 (2000). In a particular embodiment, the L-amino acid is an aromatic amino acid. In a preferred embodiment, the L-amino acid is L-tryptophan. CaSR modulators further include tryptophan-pathway metabolites and tryptophan derivatives, such as, for example, kynurenine, 3-OH kynurenine, xanthurenic acid, quinolic acid and kynurenic acid.

In addition, suitable CaSR modulators for use in the present invention include peptides. Such peptides are typically less than about 100 amino acid residues in length, and are preferably about 2 to about 10 amino acid residues in length. The peptide can comprise any suitable L- and/or D-amino acid, for example, common α-amino acids (e.g., alanine, glycine, valine), non-α-amino acids (e.g., β-alanine, 4-aminobutyric acid, 6-aminocaproic acid, sarcosine, statine), and unusual amino acids (e.g., citrulline, homocitruline, homoserine, norleucine, norvaline, ornithine, kynurenine). The amino, carboxyl and/or other functional groups on a peptide can be free (e.g., unmodified) or protected with a suitable protecting group. Suitable protecting groups for amino and carboxyl groups, and methods for adding or removing protecting groups are known in the art and are disclosed in, for example, Green and Wuts, "*Protecting Groups in Organic Synthesis*", John Wiley and Sons, 1991. The functional groups of a peptide can also be derivatized (e.g., alkylated) using art-known methods.

The peptide can comprise one or more modifications (e.g., amino acid linkers, acylation, acetylation, amidation, methylation, halogenation, terminal modifiers (e.g., cyclizing modifications)), if desired. The peptide can also contain chemical modifications (e.g., N-methyl-α-amino group substitution). In addition, the peptide can be an analog of a known and/or naturally-occurring peptide, for example, a peptide analog having conservative amino acid residue substitution(s). These modifications can improve various properties of the peptide (e.g., solubility, binding), including its ability to modulate a CaSR in a crustacean.

Peptide CaSR modulators can be linear, branched or cyclic, e.g., a peptide having a heteroatom ring structure that includes several amide bonds. In a particular embodiment, the peptide is a cyclic peptide. Such peptides can be produced by one of skill in the art using standard techniques. For example, a peptide can be derived or removed from a native protein by enzymatic or chemical cleavage, or can be synthesized by suitable methods, for example, solid phase peptide synthesis (e.g., Merrifield-type synthesis) (see, e.g., Bodanszky et al. "*Peptide Synthesis*," John Wiley & Sons, Second Edition, 1976). Peptides can also be produced, for example, using recombinant DNA methodologies or other suitable methods (see, e.g., Sambrook J. and Russell D. W., *Molecular Cloning: A Laboratory Manual*, $3^{rd}$ Edition, Cold Spring Harbor Laboratory Press, Cold Spring Harbor, N.Y., 2001).

Peptides can be synthesized and assembled into libraries comprising a few to many discrete molecular species. Such libraries can be prepared using methods of combinatorial chemistry, and can be screened using any suitable method to determine if the library comprises peptides with a desired biological activity. Such peptides can then be isolated using suitable methods.

Peptide CaSR modulators can also be peptidomimetic compounds. For example, polysaccharides can be prepared that have the same functional groups as peptides. Peptidomimetics can be designed, for example, by establishing the three dimensional structure of a peptide agent in the environment in which it is bound or will bind to a target molecule. The peptidomimetic comprises at least two components, the binding moiety or moieties and the backbone or supporting structure.

The binding moieties are the chemical atoms or groups that will react or form a complex (e.g., through hydrophobic or ionic interactions) with a target molecule, for example, a crustacean CaSR. For example, the binding moieties in a peptidomimetic can be the same as those in a peptide or protein antagonist. The binding moieties can be an atom or chemical group that reacts with the receptor in the same or similar manner as the binding moiety in the peptide antagonist. For example, computational chemistry can be used to design peptide mimetics of CaSR binding site, for instance, a ligand binding site. Examples of binding moieties suitable for use in designing a peptidomimetic for a basic amino acid in a peptide include nitrogen-containing groups, such as amines, quarternary ammonia moieties, guanidines and amides or phosphoniums. Examples of binding moieties suitable for use in designing a peptidomimetic for an acidic amino acid include, for example, carboxyl, lower alkyl carboxylic acid ester, sulfonic acid, a lower alkyl sulfonic acid ester or a phosphorous acid or ester thereof.

The supporting structure is the chemical entity that, when bound to the binding moiety or moieties, provides the three dimensional configuration of the peptidomimetic. The supporting structure can be organic or inorganic. Examples of organic supporting structures include polysaccharides, polymers or oligomers of organic synthetic polymers (such as, polyvinyl alcohol or polylactide). It is preferred that the supporting structure possesses substantially the same size and dimensions as the peptide backbone or supporting structure. This can be determined by calculating or measuring the size of the atoms and bonds of the peptide and peptidomimetic. In one embodiment, the nitrogen of the peptide bond can be substituted with oxygen or sulfur, for example, forming a polyester backbone. In another embodiment, the carbonyl can be substituted with a sulfonyl group or sulfinyl group, thereby forming a polyamide (e.g., a polysulfonamide). Reverse amides of the peptide can be made (e.g., substituting one or more-CONH-groups for a-NHCO-group). In yet another embodiment, the peptide backbone can be substituted with a polysilane backbone.

These compounds can be manufactured by known methods. For example, a polyester peptidomimetic can be prepared by substituting a hydroxyl group for the corresponding α-amino group on amino acids, thereby preparing a hydroxyacid and sequentially esterifying the hydroxyacids, optionally blocking the basic and acidic side chains to minimize side reactions. Determining an appropriate chemical synthesis route can generally be readily identified upon determining the chemical structure.

Peptidomimetics can be synthesized and assembled into libraries comprising a few to many discrete molecular species. Such libraries can be prepared using well-known methods of combinatorial chemistry, and can be screened to determine if the library comprises one or more peptidomimetics which have the desired activity. Such peptidomimetic antagonists can then be isolated by suitable methods.

In addition, CaSR modulators include phenylalkylamines. Methods of synthesizing, isolating and/or preparing phenylalkylamines are known in the art. Suitable phenylalkylamines for use in the methods of the invention include, but are not limited to, MC 0100 and MC 0106 compounds described herein (See, Examples 14 and and FIGS. 29A and B).

CaSR modulators can also be substituted piperidines and substituted pyrrolidines. methods of synthesizing, isolating and/or preparing substituted piperidines and substituted pyrrolidines are known in the art. Suitable substituted piperidines and substituted pyrrolidines for use in the methods of the invention include, but are not limited to, substituted piperidines and substituted pyrrolidines described in U.S. Pat. Nos. 7,265,145 and 7,307,171.

CaSR modulators also include compounds that indirectly alter CaSR expression (e.g., 1,25 dihydroxyvitamin D (e.g., in concentrations of about 3,000-10,000 International Units/kg feed), cytokines such as Interleukin Beta, and Macrophage Chemotactic Peptide-1 (MCP-1)).

The molar concentrations of CaSR modulators referred to herein are free or ionized concentrations of the CaSR modulator in the low salinity water, and do not include amounts of bound CaSR modulator (e.g., CaSR modulator bound to negatively charged particles including glass, proteins, or plastic surfaces). Any combination of these modulators can be added to the water or to the feed (in addition to the agent (e.g., NaCl), as described herein), so long as the combination modulates at least one CaSR.

The CaSR modulator can be administered to the crustaceans in a number of ways. The invention encompasses administration of the CaSR modulator in any way that is sufficient to modulate the CaSR. In one embodiment, the CaSR modulator is simply added to the low salinity water, as described herein. CaSR modulators that are added to the water can, for example, modulate the CaSR on the integument and gills of the crustaceans, and/or can be ingested by the crustaceans. Alternatively or in addition, the CaSR modulator can be added to the feed. Amounts and types of CaSR modulators added to the feed can be any CaSR modulator described herein. In a particular embodiment, tryptophan is added to the feed. Other embodiments include subjecting the crustaceans to the CaSR modulator by "dipping" the crustaceans in the modulator, e.g., organic polycations. The CaSR modulators can be formulated in such a way as to allow the polycations to adhere to the integument and gills of the crustaceans, in sufficient amounts to increase or maintain expression of the CaSR. Alternatively, a particular organism that is a standard food for a crustacean may be enriched as to its content of CaSR modulator(s) and then fed to the crustacean whereupon such CaSR modulators contained in the prey or standard food are released and available to bind to CaSR proteins present in the gastrointestinal tract of larval, juvenile or adult crustaceans.

The invention also embodies assessing the amount of an existing, or background, level of a CaSR modulator in the low salinity water environment and/or the tissues of crustaceans before a CaSR modulator is added to the water and/or feed. CaSR modulators are assessed or measured using methods known in the art. After the existing level of a CaSR modulator in the water is assessed, the CaSR modulator is added to the water to increase or decrease the concentration to an amount sufficient to modulate at least one CaSR, or sufficient to bring the concentrations of the CaSR modulator within the stated ranges.

In a preferred embodiment, the present invention is practiced by adding a combination of two or more CaSR modulators to the low salinity water. In a particular embodiment, calcium and magnesium are added to the low salinity water (e.g., to bring the concentrations of each to between about 0.3 mM and about 10.0 mM of calcium, and between about 0.5 mM and about 30.0 mM of magnesium).

Calcium and magnesium can come from a variety of sources that are known to those of skill in the art. For example, sources of calcium and magnesium can be mixtures of a variety of compounds that contain calcium and magnesium, or can be substantially uniform or pure compound. Sources of calcium include, for example, $Ca(CO_3)_2$, $CaCl_2$, and $CaSO_4$, while sources of magnesium include, for example, $MgCl_2$, $MgSO_4$, $MgBr_2$, and $MgCO_3$.

In one embodiment, the invention includes intermittent (e.g., interrupted) as well as continuous (e.g., non-interrupted) exposure of crustaceans to low salinity water having at least one CaSR modulator. Intermittent exposure to the CaSR can occur provided that the CaSR remains modulated.

The invention further includes adding feed to the low salinity water. The feed contains a sufficient amount of an agent that contributes to modulation of at least one CaSR in a tissue of the crustaceans after the crustaceans have consumed the feed. In certain embodiments, the agent in the feed enhances the ability of a CaSR modulator(s) to modulate the expression, sensitivity, activity, signalling and/or physiological function of at least one CaSR in one or more tissues of the crustaceans. For example, the agent in the feed can increase the level of one or more CaSR modulators in a tissue of the crustaceans after the crustaceans have consumed the feed (e.g., via gill uptake) and/or directly modulate the expression, sensitivity, activity, signalling and/or physiological function of at least one CaSR in one or more tissues of the crustaceans after the crustaceans have consumed the feed. Thus, the agent in the feed can be, in some embodiments, a CaSR modulator. In a particular embodiment, the agent in the feed that contributes to modulation of the at least one CaSR in a tissue of the crustaceans is sodium chloride (NaCl) (e.g., between about 1% and about 10% by weight, or about 10,000 mg/kg to about 100,000 mg/kg) or another sodium salt or source of sodium. Other suitable agents include, but are not limited to $Ca^{2+}$, $K^+$, $Mg^{++}$, $Sr^{2+}$, and tryptophan.

The frequency and amount of feed that crustaceans are fed, are taught in the art. Generally, the crustaceans are fed at least about 1-10 times a day, depending on life history stage, size and species of crustacean. The feed has enough CaSR modulator to contribute to a modulation of a CaSR in a tissue (e.g., hemolymph) of the crustaceans. Without wishing to be bound by any one theory, it is believed that, in certain embodiments, the presence of sufficient amounts of NaCl in the feed causes the crustaceans to take up more water from the surrounding environment. The ingestion or gill uptake of water having one or more CaSR modulators causes an overall rise in the level of CaSR modulator in tissues (e.g., hemolymph) of the crustaceans. The increase in levels of CaSR modulator in the crustaceans' tissues results in modulation of CaSRs in those tissues.

The present invention also relates to a feed for crustaceans. A suitable feed for use in the present invention contains between about 1%-10% NaCl by weight, or between about 10,000 mg NaCl/kg of feed and about 100,000 mg NaCl/kg of feed (e.g., about 12,000 mg NaCl/kg). The NaCl can be combined with other sodium salts to confer the desired effect of modulating a CaSR in the crustaceans. Hence, as used herein, the term NaCl, includes a substantially pure compound, and mixtures of NaCl with other sources of sodium. The feed can further include a CaSR modulator as described herein. In a particular embodiment, the feed includes an amino acid (e.g., tryptophan). In one embodiment, the feed has between about 1% and about 10% NaCl by weight and an amino acid in an amount between about 1 and about 10 gm/kg.

The feed can be made in a number of ways, provided that the proper concentration of the agent that contributes to modulation of the at least one CaSR in a tissue of the crustaceans (e.g., NaCl) is present. The feed can be made, for example, by reformulating the feed, or by allowing the feed to absorb a solution having the NaCl and optionally, adding a CaSR modulator. Additionally, a top dressing can be added for palatability. By contrast, specific live feeds or other organisms used as feeds can be enriched for their content of CaSR modulators that, in turn, may be ingested by a crustacean. Subjecting live feed organisms to either specific environmental conditions or diets containing CaSR modulators that can be accumulated in such organisms also provides a means to provide a crustacean with dietary CaSR modulators. Alternate methods of preparing fish feed are known to those of skill in the relevant art.

Another embodiment of the present invention includes feeding crustaceans feed having between about 1% and about 10% NaCl by weight when the crustaceans are maintained in a low salinity environment.

According to the invention, the crustaceans are raised in low salinity water. Salinity refers to the sum of ionic concentrations (e.g., calcium, magnesium and sodium, etc.) in water. In a particular embodiment, the low salinity water has a total salt concentration in the range of about 0.5 ppt to about 12 ppt. For example, the total salt concentration of the low salinity water can be about 0.5, 1, 2, 3, 4, 5, 10 or 12 ppt. In a preferred embodiment, the low salinity water has a total salt concentration in the range of about 0.5 ppt to about 5 ppt. Low salinity water used in the methods of the invention can have altered ionic conditions, wherein the ratios of the major cations (e.g., $Na^+$, $Ca^{2+}$, $Mg^{2+}$, $K^+$, $Sr2^+$) in the low salinity water differ significantly from those in standard seawater. For example, the ratio of Na/Ca and/or Mg/Ca can be significantly lower (e.g., due to increased calcium concentration) than those found in standard seawater (i.e., a Na/Ca ratio of about 45, a Mg/Ca ratio of about 5). Methods of assessing the concentrations and ratios of ions in water of varying salinities are known in the art.

The crustaceans can be raised under standard rearing conditions that are known in the art. Such conditions include recirculating, partial flow through, and flow-through rearing conditions (e.g., hatchery, pond, raceway), among others. Other conditions include extensive, intensive, and semi-intensive culture conditions. In a particular embodiment, the crustaceans are raised under recirculating conditions.

The methods described herein can be practiced on crustaceans at various stages of commercial aquaculture production. The different stages of commercial aquaculture production are know to those of skill in the art and include, for example, broodstock phase, reproductive phase, spawning phase, hatchery phase, settlement phase, larval phase, post-larval phase, juvenile growout phase, adult growout phase, harvest phase, and finishing phase.

The methods of the present invention modulate CaSRs in crustaceans raised in low salinity water, thereby resulting in improved growth and survivorship of the crustaceans, as well as other benefits. For example, the methods of the invention can also result in one or more of the following benefits for crustaceans raised in low salinity water: improved nutrient retention, improved food conversion, reduced food waste, decreased molt associated mortality (e.g. molt timing or frequency), increased size uniformity, increased disease resistance and/or immune function, improved quality or quantity of reproductive output (e.g., of broodstock shrimp), an increase in site specific settlement behavior of larvae, improved flesh or shell characteristics (e.g., smell, taste, texture), reduced competitive behavior, a decrease in stress-induced impairments, improved health benefits to humans consuming the crustacean, and improved shell and by-product characteristics to facilitate post-processing of wastes, among others.

LobCaR Nucleic Acid Molecules, Vectors and Host Cells

The present invention also provides isolated nucleic acid molecules comprising the full length genomic sequence of a CaSR gene (SEQ ID NO: 1) of the spiny lobster (*Panulirus interruptus*), referred to herein as the LobCaR gene, as well as isolated nucleic acids containing the putative protein coding sequence of the LobCaR gene (SEQ ID NO:2). The invention also relates to isolated nucleic acid molecules that encode a LobCaR polypeptide having the amino acid sequence of SEQ ID NO:3. Furthermore, nucleic acids that encode LobCaR homologs, variants, derivatives and fragments are also encompassed by the invention.

One of skill in the art will recognize that, due to degeneracy of the genetic code, a number of possible nucleotide sequences, in addition to those depicted by SEQ ID NO:1 and SEQ ID NO:2, will encode the same LobCaR polypeptide. Accordingly, The isolated LobCaR nucleic acid molecules of the present invention include nucleic acids with nucleotide sequences that are homologous to the LobCaR gene sequences described herein (e.g., SEQ ID NO:1, SEQ ID NO:2). As used herein, the term "homologous" or "analogous" when referring to a LobCaR nucleic acid sequence means that the nucleic acid sequence has sufficient identity to a nucleic acid sequence encoding the LobCaR protein of SEQ ID NO:3, such that the poylpeptide encoded by that sequence possesses one or more biological activities of the native LobCaR polypeptide. For example, a homologous nucleic acid molecule can be produced with "silent" changes or mutations that do not affect the function or biological activity of the encoded LobCaR polypeptide. Examples of such "silent" changes or mutations include additions, deletions or substitutions. Also encompassed by the present invention are nucleic acid sequences that encode LobCaR polypeptides that exhibit greater, or lesser, biological activity than the LobCaR protein of SEQ ID NO:3.

In certain embodiments, the present invention is directed to nucleic acid molecules that are at least about 70%, 75%, 80%, 85%, 90%, 95%, 98% or 99% identical to the amino acid sequence of SEQ ID NO: 1 or SEQ ID NO:2, or to nucleotide sequences complementary to SEQ ID NO: 1 or SEQ ID NO:2. In a particular embodiment, the isolated nucleic acid molecules are at least 80% identical to SEQ ID NO: 1, the complement of SEQ ID NO:1, SEQ ID NO:2, or the complement of SEQ ID NO:2.

Also encompassed by the present invention are nucleic acid molecules (e.g., DNA, RNA) that have nucleotide sequences that are substantially complementary to the DNA sequences encoding LobCaR.

Stringency conditions for hybridization refer to conditions, such as temperature and buffer composition, which determine the degree of identity that a first nucleic acid sequence and a second nucleic acid sequence must share in order for those sequences to hybridize to each other. Therefore, high stringency conditions are those conditions under which only very similar nucleic acid sequences (e.g., nucleic acid sequences that share greater than or equal to 90% identity) will hybridize to each other. The sequences can be less similar to each other if they hybridize under moderate stringency conditions. Still, less similarity is needed for two sequences to hybridize under low stringency conditions.

By varying the hybridization conditions from a stringency level at which no hybridization occurs, to a level at which hybridization is first observed, conditions can be determined under which a given sequence will hybridize to other similar sequences. The precise conditions determining the stringency of a particular hybridization include not only the ionic strength, temperature, and the concentration of destabilizing agents such as formamide, but also factors such as the length of the nucleic acid sequences, their base composition, the percent of mismatched base pairs between the two sequences, and the frequency of occurrence of subsets of the sequences (e.g., small stretches of repeats) within other non-identical sequences. Washing is the step in which conditions are set so as to determine a minimum level of similarity between the sequences hybridizing with each other. Generally, from the lowest temperature at which only homologous hybridization occurs, a 1% mismatch between two sequences results in a 1° C. decrease in the melting temperature ($T_m$) for any chosen SSC concentration. Generally, a doubling of the concentration of SSC results in an increase in the $T_m$ of about 17° C. Using these guidelines, the washing temperature can be determined empirically, depending on the level of mismatch sought. Suitable hybridization and wash conditions are explained in *Current Protocols in Molecular Biology* (Ausubel, F. M. et al., eds., John Wiley & Sons, Inc., 1995, with supplemental updates) on pages 2.10.1 to 2.10.16, and 6.3.1 to 6.3.6.

High stringency conditions can include, for example, (1) 1×SSC (10×SSC=3 M NaCl, 0.3 M $Na_3$-citrate$2H_2O$ (88 g/liter), pH to 7.0 with 1 M HCl), 1% SDS (sodium dodecyl sulfate), 0.1-2 mg/ml denatured calf thymus DNA at 65° C.; (2) 1×SSC, 50% formamide, 1% SDS, 0.1-2 mg/ml denatured calf thymus DNA at 42° C.; (3) 1% bovine serum albumin (fraction V), 1 mM $Na_2$EDTA, 0.5 M $NaHPO_4$ (pH 7.2) (1 M $NaHPO_4$=134 g $Na_2HPO_47H_2O$, 4 ml 85% $H_3PO_4$ per liter), 7% SDS, 0.1-2 mg/ml denatured calf thymus DNA at 65° C.; (4) 50% formamide, 5×SSC, 0.02 M Tris-HCl (pH 7.6), 1×Denhardt's solution (100x=10 g Ficoll 400, 10 g polyvinylpyrrolidone, 10 g bovine serum albumin (fraction V), water to 500 ml), 10% dextran sulfate, 1% SDS, 0.1-2 mg/ml denatured calf thymus DNA at 42° C.; (5) 5×SSC, 5×Denhardt's solution, 1% SDS, 100 .µg/ml denatured calf thymus DNA at 65° C.; or (6) 5×SSC, 5×Denhardt's solution, 50% formamide, 1% SDS, 100 µg/ml denatured calf thymus DNA at 42° C., with high stringency washes of either (1) 0.3-0.1× SSC, 0.1% SDS at 65° C., or (2) 1 mM $Na_2$EDTA, 40 mM $NaHPO_4$ (pH 7.2), 1% SDS at 65° C.

Moderate stringency conditions can employ hybridization at either (1) 4×SSC, (10×SSC=3 M NaCl, 0.3 M $Na_3$-citrate$2H_2O$ (88 g/liter), pH to 7.0 with 1 M HCl), 1% SDS (sodium dodecyl sulfate), 0.1-2 mg/ml denatured calf thymus DNA at 65° C.; (2) 4×SSC, 50% formamide, 1% SDS, 0.1-2 mg/ml denatured calf thymus DNA at 42° C.; (3) 1% bovine serum albumin (fraction V), 1 mM $Na_2$.EDTA, 0.5 M $NaHPO_4$ (pH 7.2) (1 M $NaHPO_4$=134 g $Na_2HPO_4 7H_2O$, 4 ml 85% $H_3PO_4$ per liter), 7% SDS, 0.1-2 mg/ml denatured calf thymus DNA at 65° C., (4) 50% formamide, 5×SSC, 0.02 M Tris-HCl (pH 7.6), 1×Denhardt's solution (100×10 g Ficoll 400, 10 g polyvinylpyrrolidone, 10 g bovine serum albumin (fraction V), water to 500 ml), 10% dextran sulfate, 1% SDS, 0.1-2 mg/ml denatured calf thymus DNA at 42° C.; (5) 5×SSC, 5×Denhardt's solution, 1% SDS, 100 µg/ml denatured calf thymus DNA at 65° C.; or (6) 5×SSC, 5×Denhardt's solution, 50% formamide, 1% SDS, 100 µg/ml denatured calf thymus DNA at 42° C.; with moderate stringency washes of 1×SSC, 0.1% SDS at 65° C. The above conditions are intended to be used for DNA-DNA hybrids of 50 base pairs or longer. Where the hybrid is believed to be less than 18 base pairs in length, the hybridization and wash temperatures should be 5-10° C. below that of the calculated $T_m$ of the hybrid, where $T_m$ in ° C.=(2× the number of A and T bases)+ (4× the number of G and C bases). For hybrids believed to be about 18 to about 49 base pairs in length, the $T_m$ in ° C.=(81.5° C.+16.6($\log_{10}$M)+0.41(% G+C)−0.61 (% formamide)−500/L), where "M" is the molarity of monovalent cations (e.g., $Na^+$), and "L" is the length of the hybrid in base pairs.

Low stringency conditions can employ hybridization at either (1) 4×SSC, (10×SSC=3 M NaCl, 0.3 M $Na_3$-citrate2$H_2O$ (88 g/liter), pH to 7.0 with 1 M HCl), 1% SDS (sodium dodecyl sulfate), 0.1-2 mg/ml denatured calf thymus DNA at 50° C.; (2) 6×SSC, 50% formamide, 1% SDS, 0.1-2 mg/ml denatured calf thymus DNA at 40° C.; (3) 1% bovine serum albumin (fraction V), 1 mM $Na_2$EDTA, 0.5 M $NaHPO_4$ (pH 7.2) (1 M $NaHPO_4$=134 g $Na_2HPO_4 7H_2O$, 4 ml 85% $H_3PO_4$ per liter), 7% SDS, 0.1-2 mg/ml denatured calf thymus DNA at 50° C.; (4) 50% formamide, 5×SSC, 0.02 M Tris-HCl (pH 7.6), 1×Denhardt's solution (100x=10 g Ficoll 400, 10 g polyvinylpyrrolidone, 10 g bovine serum albumin (fraction V), water to 500 ml), 10% dextran sulfate, 1% SDS, 0.1 2 mg/ml denatured calf thymus DNA at 40° C.; (5) 5×SSC, 5×Denhardt's solution, 1% SDS, 100 µg/ml denatured calf thymus DNA at 50° C.; or (6) 5×SSC, 5×Denhardt's solution, 50% formamide, 1% SDS, 100 µg/ml denatured calf thymus DNA at 40° C.; with low stringency washes of either 2×SSC, 0.1% SDS at 50° C.; or (2) 0.5% bovine serum albumin (fraction V), 1 mM $Na_2$EDTA, 40 mM $NaHPO_4$ (pH 7.2), 5% SDS.

The above conditions are typically intended to be used for DNA-DNA hybrids of 50 base pairs or longer. Where the hybrid is believed to be less than 18 base pairs in length, the hybridization and wash temperatures should be 5-10° C. below that of the calculated $T_m$ of the hybrid, where $T_m$ in ° C.=(2× the number of A and T bases)+(4× the number of G and C bases). For hybrids believed to be about 18 to about 49 base pairs in length, the $T_m$ in ° C.=(81.5° C.+16.6($\log_{10}$M)+0.41(% G+C)−0.61 (% formamide)−500/L), where "M" is the molarity of monovalent cations (e.g., $Na^+$), and "L" is the length of the hybrid in base pairs.

In certain embodiments, the present invention relates to nucleic acid molecules that hybridize with full-length and/or partial LobCaR nucleic acid sequences under conditions of high stringency. In one embodiment, the invention provides nucleic acid molecules that hybridize under conditions of high stringency to the full-length genomic LobCaR gene sequence (i.e., SEQ ID NO: 1 or the complement thereof) and nucleic acid molecules that hybridize to the coding nucleotide sequence for the LobCaR protein (i.e., SEQ ID NO:2 or the complement thereof). Examples of suitable conditions of high stringency are known to those of skill in the art and include, for example, those described herein.

In some embodiments, nucleic acid molecules that hybridize to LobCaR nucleic acid sequences (e.g., SEQ ID NO:1, SEQ ID NO:2) are capable of hybridizing to at least about 200 continuous nucleotides of the LobCaR sequence or more (e.g., 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 continuous nucleotides) under high stringency conditions.

The LobCaR nucleic acids of the present invention can be used for one or more of the following purposes without limitation: (1) to produce recombinant CASR proteins (e.g., Lob-CaR polypeptides), which can be assessed, for example, for structure determination and/or activity, and can also be used to obtain antibodies that bind to the CASR protein; (2) to serve as a basis for comparison with the nucleotide sequences of other CASRs in order to determine one or more of the following: conserved sequences, unique nucleotide sequences for normal and altered receptors, and suitable target sites for antisense nucleic acids, ribozymes, and/or PCR amplification primers; (3) as hybridization probes to detect presence and/or level of a LobCaR nucleic acid in a sample; (4) as PCR primers to amplify particular nucleic acid sequences (e.g., sequences to be used as hybridization probes); and (5) to identify and isolate additional CASR homologs in other species (e.g., other invertebrate species).

Thus, in certain embodiments, a LobCaR nucleic acid, or a fragment thereof, is used as a probe to detect (e.g., via hybridization) the expression level of a LobCaR nucleic acid in a sample (e.g., a biological sample). Methods for identifying a nucleic acid by hybridization are routine in the art (see Current Protocols In Molecular Biology, Ausubel, F. M. et al., Eds., John Wiley & Sons: New York, N.Y., (1997). For example, using a LobCaR detection probe, LobCaR nucleic acids can be detected by Northern blot analysis of mRNA isolated from a biological sample using standard protocols that are known to those of skill in the art. In a particular embodiment, the LobCaR probe is detectably labeled. For example, the nucleic acid probe can be labeled with, e.g., a radionuclide such as $^3H$, $^{32}P$, $^{33}P$, $^{14}C$, or $^{35}S$, a heavy metal, or a ligand capable of functioning as a specific binding pair member for a labeled ligand (e.g., biotin, avidin or an antibody), a fluorescent molecule, a chemiluminescent molecule, an enzyme or the like.

In other embodiments, LobCaR nucleic acids and fragments thereof are used to identify and isolate CASR homologs in other invertebrate organisms (e.g., crustaceans). For example, a DNA library (e.g., cDNA library, genomic DNA library) from an invertebrate organism can be screened using a labeled LobCaR nucleic acid sequence to identify CASR genes, for example, as described in e.g., Ausubel, et al., Eds., Current Protocols In Molecular Biology, John Wiley & Sons, New York (1997). The sequences of LobCaR homologs can then be compared to determine differences and similarities between them.

Accordingly, the invention provides isolated fragments (e.g., nucleic acid probes) of the LobCaR nucleic acid molecules described herein. Such fragments can be at least about 5%, 10%, 20%, 30%, 40%, 50%, 60%, 70%, 80% or 90% the length of a LobCaR nucleic acid sequence (e.g., SEQ ID NO:1, SEQ ID NO:2) and are useful as primers and as probes for assays and techniques described herein. In particular embodiments, LobCaR fragments include at least about 50 continuous nucleotides of the LobCaR sequence or more (e.g., 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 continuous nucleotides).

In one embodiment, LobCaR probes (e.g., oligonucleotide probes) are designed to have a $T_m$ of approximately 80° C. (assuming 2° C. for each A or T and 4 degrees for each G or C).

The present invention further encompasses using primers based on the LobCaR nucleic acid sequences described herein to detect LobCaR nucleic acid molecules by Polymerase Chain Reaction (PCR) methods that are well known in the art. Methods and protocols for performing PCR are described generally in the following: PCR Technology: Principles and Applications for DNA Amplification (ed. H. A. Erlich, Freeman Press, NY, N.Y., 1992); PCR Protocols: A Guide to Methods and Applications (Eds. Innis, et al., Academic Press, San Diego, Calif., 1990); Mattila et al., Nucleic Acids Res., 19:4967 (1991); Eckert et al., PCR Methods and Applications, 1:17 (1991); PCR (eds. McPherson et al., IRL Press, Oxford); Ausubel, F. M. et al., Current Protocols in Molecular Biology, Greene Publishing Assoc. and Wiley-Interscience 1987, & Supp. 49, 2000; and U.S. Pat. No. 4,683, 202).

In one embodiment, the level of a LobCaR nucleic acid (e.g., mRNA) in a sample (e.g., tissue sample, cell sample) is determined by Reverse Transcriptase-Polymerase Chain Reaction (RT-PCR), a technique that is well known in the art. Briefly, RNA is extracted from the tissue of interest, poly A+ RNA is isolated from the extract by standard methods and the isolated poly A+ RNA reverse transcribed. Subsequently, a PCR amplification reaction is performed with LobCaR-specific primers using the products of the reverse transcription reaction and the presence of the predicted LobCaR product is determined, for example, by detecting the product of the RT-PCR reaction (e.g., via agarose gel electrophoresis). The RT-PCR product can be a nucleic acid molecule having part or all of a LobCaR nucleotide sequence. The RT-PCR product can optionally be detectably labeled (e.g., radioactively labeled, fluorescently labeled) and the presence or amount of LobCaR product can be determined using an appropriate detection means (e.g., autoradiography). Alternative methods of labeling and quantifying the RT-PCR product are well known to one of skill in the art (see Ausubel, F. M. et al., Current Protocols in Molecular Biology, Greene Publishing Assoc. and Wiley-Interscience 1987, & Supp. 49, 2000.

The present invention also includes kits for detecting and/or quantifying a LobCaR nucleic acid molecule comprising nucleotide probes (e.g., PCR primers) that can hybridize to the LobCaR nucleic acid under conditions of appropriate stringency.

In addition to RT-PCR, Northern blotting and other RNA blotting hybridization techniques, the levels of LobCaR nucleic acids can be detected by in situ hybridization. This technique requires fewer cells than Northern blotting, and involves depositing whole cells onto a microscope cover slip and probing the nucleic acid content of the cell with a solution containing radioactive or otherwise labeled nucleic acid probes. The practice of the in situ hybridization technique is described in more detail in U.S. Pat. No. 5,427,916, the entire disclosure of which is incorporated herein by reference. Suitable probes for in situ hybridization of a LobCaR nucleic acid molecule can be produced, as described above, from the nucleic acid sequences of SEQ ID NO:1 or SEQ ID NO:2.

The invention also provides vectors (e.g., phages, viral vectors, non-viral vectors) and plasmids containing one or more of the LobCaR nucleic acid sequences described herein (e.g., SEQ ID NO:1, SEQ ID NO:2). Suitable vectors for use in eukaryotic and prokaryotic cells are known in the art and are commercially available or are readily prepared by a skilled artisan. Exemplary vectors are described, for example, in Ausubel, F. M., et al., Current Protocols in Molecular Biology, (Current Protocol, 1994) and Sambrook et al., "Molecular Cloning: A Laboratory Manual," 2nd ED. (1989). Vectors and plasmids containing the LobCaR gene or gene fragments can be used, for example, to generate hybridization probes for detecting and measuring the level of LobCaR gene expression in tissues and/or for identifying LobCaR homologs in other invertebrates; (2) to express the LobCaR mRNA or protein in vitro or in vivo; and (3) to generate transgenic non-human animals or recombinant host cells.

A LobCaR nucleic acid sequence can be inserted into a suitable vector using standard molecular cloning techniques and readily available starting materials known to those of skill in the art. In a particular embodiment, the vector is an expression vector, which contains genetic elements (e.g., regulatory sequences) that are necessary to direct expression of the LobCaR sequence when introduced into an appropriate host cell. Expression vectors generally comprise a promoter that is operably-linked with a portion of the isolated nucleic acid that encodes or specifies a gene product. Numerous expression vectors are known in the art and are commercially available including, but not limited to, linear polynucleotides, polynucleotides associated with ionic or amphiphilic compounds, plasmids, and viruses. In particular, expression systems containing the requisite control sequences, such as promoters and polyadenylation signals, and preferably enhancers, are readily available and known in the art for a variety of different hosts (see e.g., Sambrook, et al., Molecular Cloning a Laboratory Manual, Second Ed. Cold Spring Harbor Press (1989)).

A vector or plasmid containing a LobCaR nucleotide sequence may be provided to a cell so as to stimulate production of the active LobCaR polypeptide in vivo. For this purpose, various techniques and reagents have been developed. For example, a number of viral vectors have been developed that allow for transfection and, in some cases, integration of the virus into the host cell. See, for example, Dubensky et al. (1984) Proc. Natl. Acad. Sci. USA 81, 7529-7533; Kaneda et al., (1989) Science 243, 375-378; Hiebert et al. (1989) Proc. Natl. Acad. Sci. USA 86, 3594-3598; Hatzoglu et al. (1990) J. Biol. Chem. 265, 17285-17293 and Ferry, et al. (1991) Proc. Natl. Acad. Sci. USA 88, 8377-8381. Non-viral delivery methods such as administration of the DNA via complexes with liposomes may also be used.

In one embodiment, the present invention encompasses host cells transformed with the plasmids or vectors described herein. LobCaR nucleic acid molecules can be inserted into a construct which can, optionally, replicate and/or integrate into a recombinant host cell, by known methods. The host cell can be a eukaryotic cell or prokaryotic cell and includes, for example, yeast (such as *Pichia pastorius* or *Saccharomyces cerevisiae*), bacteria (such as *E. coli* or *Bacillus subtilis*), insect cells (such as baculovirus-infected SF9 cells) or mammalian cells (somatic or embryonic cells, Human Embryonic Kidney (HEK) cells, Chinese hamster ovary cells, HeLa cells, human 293 cells and monkey COS-7 cells).

A nucleic acid molecule can be incorporated or inserted into the host cell by known methods. Examples of suitable methods of transfecting or transforming cells include calcium phosphate precipitation, electroporation, microinjection, infection, lipofection and direct uptake. "Transformation" or "transfection" as used herein refers to the acquisition of new or altered genetic features by incorporation of additional nucleic acids, e.g., DNA. "Expression" of the genetic information of a host cell is a term of art which refers to the directed transcription of DNA to generate RNA which is translated into a polypeptide. Methods for preparing such recombinant host cells and incorporating nucleic acids are described in more detail in Sambrook et al., "Molecular Cloning: A Laboratory Manual," Second Edition (1989) and Ausubel, et al. "Current Protocols in Molecular Biology," (1992), for example.

In one embodiment of the invention, the nucleic acid constructs are delivered to cells by transfection, i.e., by delivery of a "naked" nucleic acid or a nucleic acid that is complexed with a colloidal dispersion system. A colloidal system includes macromolecule complexes, nanocapsules, microspheres, beads, and lipid-based systems including oil-in-water emulsions, micelles, mixed micelles, and liposomes. An exemplary colloidal system of this invention is a lipid-complexed or liposome-formulated DNA. In the former approach, prior to formulation of DNA, e.g., with lipid, a plasmid containing a transgene bearing the desired DNA constructs may first be optimized for expression (e.g., inclusion of an intron in the 5' untranslated region and elimination of unnecessary sequences (Felgner, et al., Ann NY Acad Sci 126-139, 1995). Formulation of DNA, e.g. with various lipid or liposome materials, may then be accomplished using known methods and materials and delivered to the recipient mammal. See, e.g., Canonico et al, Am J Respir Cell Mol Biol 10:24-29, 1994; Tsan et al, Am J Physiol 268; Alton et al., Nat. Genet. 5:135-142, 1993 and U.S. Pat. No. 5,679,647 by Carson et al.

In certain embodiments of the invention, a LobCaR nucleic acid is delivered to a cell (e.g. a host cell) as a viral vector, such as a recombinant retrovirus (e.g., lentivirus), adenovirus, adeno-associated virus (AAV), herpes simplex derived vector, hybrid adeno-associated/herpes simplex viral vector, influenza viral vector, especially those based on the influenza A virus, and alphavirus, for example the Sinbis and semliki forest viruses). The LobCaR nucleic acid can also be provided to a host cell as recombinant bacterial or eukaryotic plasmid, among others.

The host cell is then maintained under suitable conditions that allow for expression and recovery of the expressed LobCaR proteins. Generally, the cells are maintained in a suitable buffer and/or growth medium or nutrient source for growth of the cells and expression of the gene product(s). The growth media are not critical to the invention, are generally known in the art and include sources of carbon, nitrogen and sulfur. Examples include Luria broth, Superbroth, Dulbecco's Modified Eagles Media (DMEM), RPMI-1640, M199 and Grace's insect media. The growth media can contain a buffer, the selection of which is not critical to the invention. The pH of the buffered Media can be selected and is generally one tolerated by or optimal for growth for the host cell.

The host cell is maintained under a suitable temperature and atmosphere. Alternatively, the host cell is aerobic and the host cell is maintained under atmospheric conditions or other suitable conditions for growth. The temperature should also be selected so that the host cell tolerates the process and can be for example, between about 13 and 40° C.

LobCaR Polypeptides

The present invention also encompasses isolated LobCaR polypeptides encoded by the LobCaR nucleic acid molecules described herein. Such polypeptides include, for example, an isolated LobCaR polypeptide comprising the amino acid sequence of SEQ ID NO:3. In particular embodiments, a LobCaR polypeptide of the invention is encoded by a Lob-CaR nucleic acid molecule having the sequence of SEQ ID NO:1 or 2.

An isolated LobCaR polypeptide can be prepared by a variety of techniques that are known to those of skill in the art. For example, the LobCaR polypeptide can be expressed in an in vitro expression mixture using a polynucleotide that encodes a LobCaR protein (e.g., SEQ ID NO:1, SEQ ID NO:2), or it may be expressed in a human or non-human cell that contains an expression vector comprising a LobCaR-encoding nucleic acid molecule, and subsequently purified therefrom. Alternatively, a LobCaR polypeptide can be purified using, for example, standard chromatographic techniques from a naturally occurring source of LobCaR protein (e.g. a tissue or cell sample from an invertebrate organism).

Other forms of the LobCaR polypeptides encompassed by the present invention include those that are "functionally equivalent" to native LobCaR protein of SEQ ID NO: 3.

One of skill in the art will recognize that certain changes in the amino acid sequence of a protein/polypeptide can occur without disrupting one or more functions of that protein/polypeptide. For instance, the skilled artisan would reasonably expect that an isolated replacement of a leucine with an isoleucine or valine, an aspartate with a glutamate, a threonine with a serine, or a similar replacement of an amino acid with a structurally related amino acid (i.e., conservative mutations) will not have a major effect on the biological activity of the resulting molecule. Conservative replacements are those that take place within a family of amino acids that are related in their side chains. Genetically encoded amino acids are can be divided into four families: (1) acidic=aspartate, glutamate; (2) basic=lysine, arginine, histidine; (3) nonpolar=alanine, valine, leucine, isoleucine, proline, phenylalanine, methionine, tryptophan; and (4) uncharged polar=glycine, asparagine, glutamine, cysteine, serine, threonine, tyrosine. Phenylalanine, tryptophan, and tyrosine are sometimes classified jointly as aromatic amino acids. In similar fashion, the amino acid repertoire can be grouped as (1) acidic=aspartate, glutamate; (2) basic=lysine, arginine histidine, (3) aliphatic=glycine, alanine, valine, leucine, isoleucine, serine, threonine, with serine and threonine optionally be grouped separately as aliphatic-hydroxyl; (4) aromatic=phenylalanine, tyrosine, tryptophan; (5) amide=asparagine, glutamine; and (6) sulfur-containing=cysteine and methionine. (see, for example, Biochemistry, 2nd ed., Ed. by L. Stryer, W.H. Freeman and Co., 1981).

Whether a change in the amino acid sequence of a polypeptide results in a functional homolog can be readily determined by assessing the ability of the variant polypeptide to produce a response in a cell that is identical or similar to a response produced by the wild-type protein. For instance, variant forms of LobCaR polypeptides can be assessed, e.g., for one or more functions performed by native LobCaR polypeptides. Accordingly, the term "LobCaR polypeptide" or "LobCaR protein" also encompasses conservative and other variants (e.g., allelic variants, species variants) of the LobCaR polypeptide depicted by SEQ ID NO:3. In general, these variant polypeptides are also referred to as "analogs".

Accordingly, in some embodiments, the present invention relates to isolated LobCaR polypeptides having at least about 70% (e.g., 75%, 80%, 85%, 90% or 95%) identity to SEQ ID NO:3. In a particular embodiment, the invention relates to isolated LobCaR polypeptides having at least about 90% identity to SEQ ID NO:3.

The skilled artisan also will recognize that the activity of a protein/polypeptide may reside in one or more functional domains within the protein/polypeptide and, in certain cases, these functional domains will retain their activity outside the context of the full-length form of the protein. Therefore, the term "LobCaR polypeptide" also encompasses derivatives and biologically-active fragments of the LobCaR polypeptide having the sequence shown as SEQ ID NO:3.

Biologically-active LobCaR protein derivatives and fragments may be derived from a full-length LobCaR polypeptide (e.g., following enzymatic digestion, for example, by a protease). Isolated peptidyl portions of LobCaR polypeptides also can be obtained by screening recombinant polypeptides that are produced from nucleic acid fragments that encode such polypeptides. In addition, LobCaR polypeptide fragments can be synthesized chemically using techniques known in the art, such as conventional Merrifield solid phase f-Moc or t-Boc chemistry.

LobCaR polypeptides may further comprise post-translational modifications or non-amino acid elements, such as hydrophobic modifications (e.g. polyethylene glycols or lipids), poly- or mono-saccharide modifications, phosphates, and acetylations, among others.

In addition, mimetics (e.g., peptide or non-peptide agents), which are able to mimic one or more activities of a LobCaR polypeptide are also encompassed by the invention. For example, amino acid residues of a LobCaR polypeptide may be mapped, using standard techniques (e.g., scanning mutagenesis), to determine which ones affect one or more activities of a LobCaR protein. Using this information, peptidomimetic compounds can be generated which mimic those residues involved in the activities and/or interactions of interest. Non-hydrolyzable peptide analogs of such residues can be generated using benzodiazepine (e.g., see Freidinger et al., in Peptides: Chemistry and Biology, G. R. Marshall ed., ESCOM Publisher: Leiden, Netherlands, 1988), azepine (e.g., see Huffman et al., in Peptides: Chemistry and Biology, G. R. Marshall ed., ESCOM Publisher: Leiden, Netherlands, 1988), substituted gamma lactam rings (Garvey et al., in Peptides: Chemistry and Biology, G. R. Marshall ed., ESCOM Publisher: Leiden, Netherlands, 1988), keto-methylene pseudopeptides (Ewensbn et al., (1986) J. Med. Chem. 29:295; and Ewenson et al., in Peptides: Structure and Function (Proceedings of the 9th American Peptide Symposium) Pierce Chemical Co. Rockland, Ill., 1985), b-turn dipeptide cores (Nagai et al., (1985) Tetrahedron Lett 26:647; and Sato et al., (1986) J Chem Soc Perkin Trans 1:1231), and b-aminoalcohols (Gordon et al., (1985) Biochem Biophys Res Commun 126:419; and Dann et al., (1986) Biochem Biophys Res Commun 134:71).

LobCaR polypeptides can also be fusion or chimeric polypeptides. Fusion proteins can be manufactured according to known methods of recombinant DNA technology. For example, fusion polypeptides can be expressed from a nucleic acid molecule comprising sequences which code for all or a portion (e.g., a biologically active portion) of the LobCaR polypeptide and its fusion partner (e.g., all or a portion of an immunoglobulin molecule). For example, fusion polypeptides can be produced by the insertion of nucleic acid sequences encoding the fusion partners into a suitable expression vector, phage vector, or other commercially available vector. The resulting construct can be introduced into a suitable host cell for expression. Upon expression, the fusion proteins can be isolated or purified from a cell by means of an affinity matrix or other technique known to those of skill in the art. These cells, or the fusion polypeptides produced from them, can be utilized in a variety of screening assays.

In certain embodiments, the LobCaR polypeptides and/or LobCaR fragments of the invention are reactive with, and bind to, any one of the LobCaR antibodies described herein. In a particular embodiment, a LobCaR polypeptide can be bound by an antibody that binds to an epitope contained in the amino acid sequence of SEQ ID NO:4 or SEQ ID NO:6.

Antibodies that Bind LobCaR Polypeptides

The present invention also encompasses antibodies (e.g., polyclonal antibodies, monoclonal antibodies) that are reactive with, and bind to, any of the LobCaR polypeptides described herein. In a particular embodiment, the antibodies specifically bind LobCaR polypeptides or fragments thereof.

Methods for making and selecting antibodies are well known to those of skill in the art, as evidenced by standard reference works such as: Harlow, et al., Antibodies, A Laboratory Manual, Cold Spring Harbor Laboratory N.Y. (1988); Klein, Immunology: The Science of Self-Nonself Discrimination (1982); Kennett, et al., Monoclonal Antibodies and Hybridomas: A New Dimension in Biological Analyses (1980); and Campbell, "Monoclonal Antibody Technology" in laboratory techniques in biochemistry and molecular biology.

Polyclonal antibodies are derived from the sera of animals (e.g., rabbits, mice, guinea pigs) that have been immunized with antigen. Methods for producing such polyclonal antibodies are well known in the art and may involve either injecting the full-length LobCaR protein itself or a portion thereof, or, alternatively, injecting short peptides made to correspond to different regions of the LobCaR polypeptide into an appropriate animal.

Monoclonal antibodies can be prepared using hybridoma technology (Kohler, et al., Nature 256:495 (1975); Hammerling, et al., In: Monoclonal Antibodies and T-Cell Hybridomas, Elsevier, N.Y. pp. 563-681 (1981)). In general, this technology involves, for example, immunizing an animal, usually a mouse, with either intact LobCaR protein or a fragment thereof. The splenocytes of the immunized animals are extracted and fused with suitable myeloma cells (e.g., $SP_2/O$ cells) to produce a hybridoma. After fusion, the resulting hybridoma cells are selectively maintained in culture medium (e.g., HAT medium) and then cloned by limiting dilution (Wands, et al., Gastroenterology 80:225-232 (1981)). The cells obtained through such selection are then tested to identify clones which secrete antibodies capable of binding to LobCaR with the desired specificity using a suitable assay (e.g. ELISA).

Anti-LobCaR antibodies can be raised against appropriate immunogens, such as, for example, isolated and/or recombinant LobCaR polypeptides, analogs or fragments (e.g., synthetic peptides), as described herein. Such antibodies can also be raised against a host cell that expresses recombinant LobCaR protein. In addition, cells expressing recombinant LobCaR protein, such as transfected cells, can be used as immunogens or to screen for antibodies that bind the LobCaR polypeptide. In one embodiment, anti-LobCaR antibodies are raised against a peptide sequence from a LobCaR protein (e.g., SEQ ID NO:3). Suitable peptides immunogens include peptides having the amino acid sequence of SEQ ID NO:4 or SEQ ID NO:6.

In certain embodiments, the antibodies of the invention are detectably labeled. Suitable labels can be detected directly, such as radioactive, fluorescent or chemiluminescent labels. They can also be indirectly detected using labels such as enzyme labels and other antigenic or specific binding partners like biotin. Examples of such labels include fluorescent labels such as fluorescein, rhodamine, chemiluminescent labels such as luciferase, radioisotope labels such as $^{32}P$, $^{125}I$, $^{131}I$, enzyme labels such as horseradish peroxidase, and alkaline phosphatase, β-galactosidase, biotin, avidin, spin labels, magnetic beads and the like. The detection of antibodies in a complex can also be done immunologically with a second antibody which can then be detected (e.g., by means of a label). Conventional methods or other suitable methods can directly or indirectly label an antibody. Labeled primary and secondary antibodies can be obtained commercially or prepared using methods know to one of skill in the art (see Harlow, E. and D. Lane, 1988, Antibodies: A Laboratory Manual, (Cold Spring Harbor Laboratory: Cold Spring Harbor, N.Y.).

The invention also encompasses kits that comprise an antibody that binds to a LobCaR polypeptide as described herein for use in, for example, detecting the presence of a LobCaR polypeptide in a sample.

The antibodies of the present invention may be used in methods for determining the level of a LobCaR polypeptide in a sample (e.g., a biological sample from an invertebrate organism, such as, a tissue sample, a cell sample, a blood sample). For example, the LobCaR antibodies described herein may be used to detect the presence of LobCaR proteins and homologs in a sample using standard immunological methods that are known to those of skill in the art. Such methods include Western blot analysis, FACS analysis, radioimmunoassays, flow cytometry, immunochemistry (e.g., immunocytochemistry, immunohistochemistry), enzyme-linked immunosorbent assays (ELISA) and chemiluminescence assays, among others. Radioimmunoassays, or immunometric assays, are also known as "two-site" or "sandwich" assays (see Chard, "An Introduction to Radioimmune Assay and Related Techniques," in: Laboratory Techniques in Biochemistry and Molecular Biology, North Holland Publishing Co., N.Y. (1978)). In a typical immunometric assay, a quantity of unlabeled antibody is bound to a solid support that is insoluble in the fluid being tested, e.g., blood, lymph, cellular extracts, etc. After the initial binding of antigen to immobilized antibody occurs, a quantity of detectably labeled secondary antibody is added to permit detection and/or quantitation of bound antigen (see, e.g., Radioimmune Assay Method, Kirkham, et al., ed. pp. 199-206, E&S Livingstone, Edinburgh (1970)). Many variations of these types of assays are known in the art and may be employed for the detection of the LobCaR polypeptides.

Antibodies to LobCaR polypeptides may also be used in the purification of either the intact receptor or fragments of the receptor (see generally Dean, et al., Affinity Chromatography, A Practical Approach, IRL Press (1986)). Typically, antibody is immobilized on a chromatographic matrix such as Sepharose 4B. The matrix is then packed into a column and the preparation containing LobCaR polypeptide is passed through the column under conditions that promote binding, e.g., under conditions of low salt. The column is then washed, and bound LobCaR polypeptide is eluted using a buffer that promotes dissociation from antibody, e.g., buffer having an altered pH or salt concentration. The eluted LobCaR polypeptide may be transferred into a buffer of choice, e.g., by dialysis, and either stored or used directly.

Screening Methods for LobCaR Modulators

The present invention also includes methods for identifying and assaying compounds that modulate the expression level and/or activity of an invertebrate CaSR nucleic acid molecule or protein (e.g., a LobCaR nucleic acid molecule or polypeptide). In determining whether compounds are LobCaR modulators, one can measure changes in the expression level of one or more of the LobCaR genes or proteins described herein, or changes that occur in one or more intracellular signal transduction pathways (e.g., a pathway involved in the sensing and/or processing of stimuli) involving the LobCaR polypeptide.

In a particular embodiment, a compound that modulates the expression level or activity of an invertebrate CaSR protein is identified by contacting a cell that expresses a LobCaR polypeptide (e.g., a polypeptide comprising the amino acid sequence of SEQ ID NO: 3) with a test compound and subsequently detecting the expression level or activity of said polypeptide in the host cell, wherein an alteration in the expression level or activity of the nucleic acid or polypeptide relative to a suitable control (e.g., a cell that expresses a LobCaR nucleic acid molecule and/or polypeptide that has not been contacted with the test compound). An alteration (e.g., a decrease, an increase) in the expression level or activity of the LobCaR nucleic acid or polypeptide in the presence of the test compound, relative to the expression level of the same molecule in the control, indicates that the test compound modulates the expression of an invertebrate CASR protein.

Suitable test compounds for the screening methods of the invention include, but are not limited to, compounds belonging to any of the classes of CaSR modulators described herein. Such test compounds may be naturally occurring, or may be produced using synthetic methods known in the art.

The present invention is further and more specifically illustrated by the following Examples, which are not intended to be limiting in any way.

EXEMPLIFICATION

Example 1

Identification and Characterization of the LobCaR Gene

A reduced stringency DNA-DNA hybridization approach was used to identify and isolate the LobCaR gene. A $^{32}$P-labeled probe containing the cDNA sequence encoding the complete amino acid sequence of an Atlantic salmon CaSR, SalmoKCaR II, which had been previously isolated and described in U.S. Pat. Nos. 6,979,558, 6,951,739, 6,979,559, and 7,101,988, was utilized to probe a commercially-available lobster genomic library (Stratagene FIX II Lobster Genomic Library catalog #946630). A total of 1 million plaques on filters were screened and washed under reduced stringency hybridization conditions that included hybridization and washes using 2×SSC, 0.1% SDS at 53'C. A total of 2 positive plaques were identified (FIG. 1) that appeared to be identical upon purification and mapping by restriction enzyme analysis.

Figure 2:
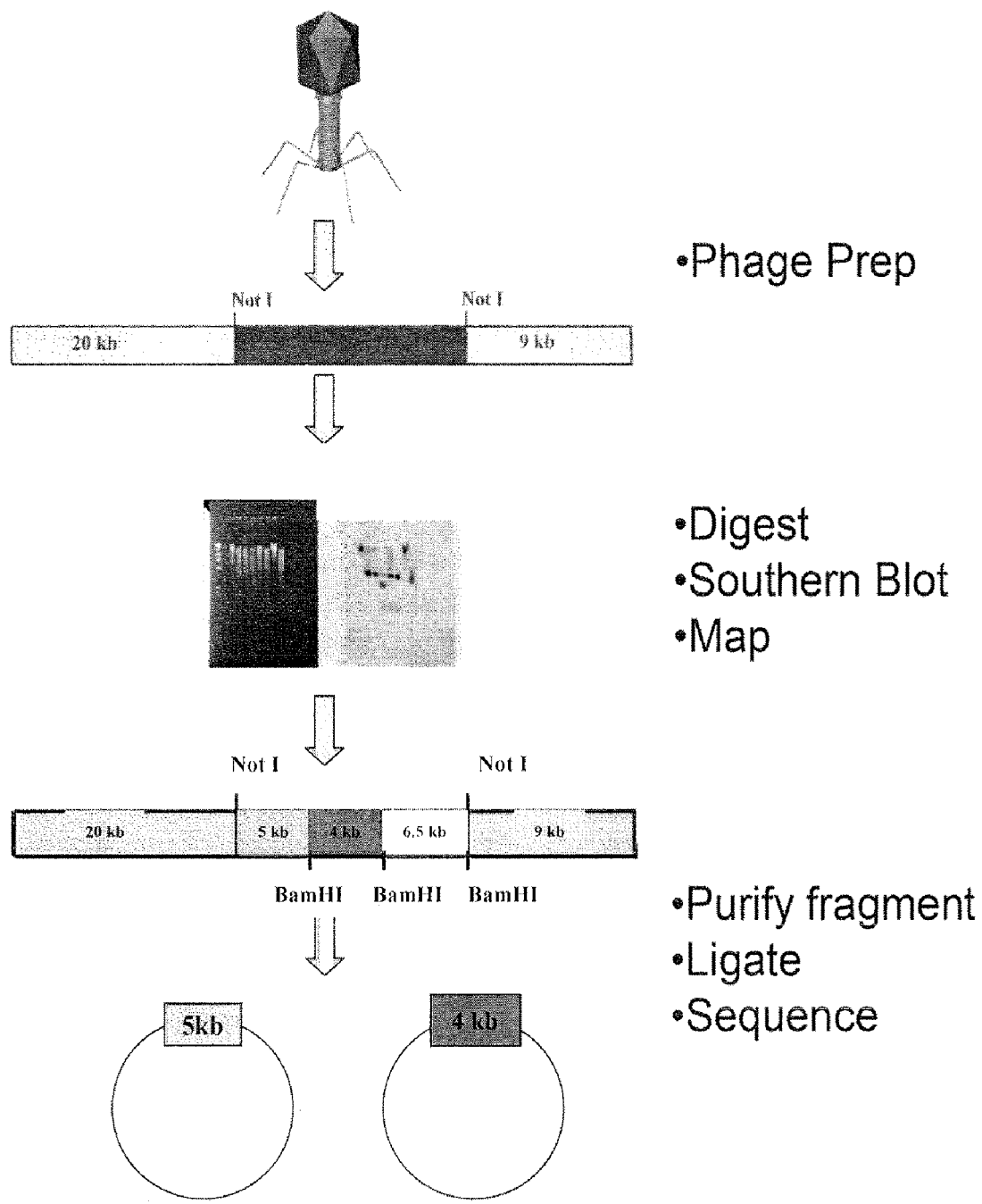
FIG. 2 is a schematic diagram depicting the identification and subcloning of 2 restriction endonuclease fragments of 4 kb and 5 kb that contain the LobCaR sequence. Using standard subcloning and DNA sequencing methods, the 4 kb and 5 kb pieces of recombinant DNA were excised from the phage vector and ligated into plasmids for full length DNA sequencing analysis.

The positive plaque containing the LobCaR gene was then characterized using standard subcloning and DNA sequencing methods. FIG. 2 shows a diagram of a DNA restriction endonuclease map of the DNA insert of the λ bacteriophage that contains the LobCaR gene sequence. The combination of restriction enzyme analyses and DNA-DNA hybridization analyses of the resulting fragments, together with DNA sequencing, demonstrated that the LobCaR sequence was contained within two restriction endonuclease fragments of 4 kb and 5 kb, respectively.

Figure 3:
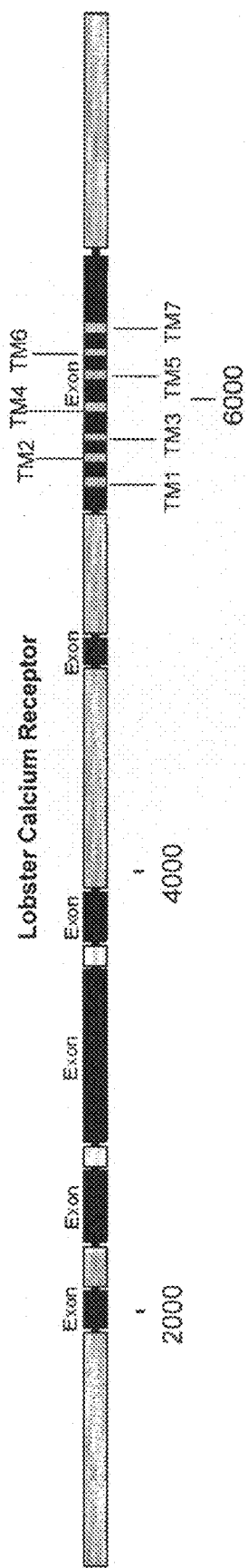
FIG. 3 is a schematic diagram of the LobCaR gene showing the locations of 6 exons (labeled), 7 introns, as well as 7 transmembrane (TM) domains.

DNA sequence analysis of the entire 4 kb DNA fragment and a portion of the 5 kb DNA fragment revealed that the majority of the LobCaR gene was contained within the 4 kb DNA fragment. The remaining portions of the gene, which code for portions of the extracellular domain of LobCaR, are contained in the 5 kb DNA fragment. The complete sequence of the LobCaR gene (SEQ ID NO:1) is composed of a total of 6 exons that are interspersed between a total of 7 introns (FIG. 3).

To determine whether the LobCaR DNA sequence (SEQ ID NO:1) hybridizes to other known CaSR DNA sequences under high stringency conditions (0.1×SSC, 0.1% SDS at 65° C.), a hybridization experiment was performed. Individual filters were lifted from respective agar plates containing a pure lawn of bacteriophage k plaques that possessed either the LobCaR DNA sequence (FIG. 4B) or the sequence for the shark kidney CaSR (FIGS. 4A and 4C, respectively) (see U.S. Pat. No. 6,337,391, International Patent Application No. PCT 0934407, German Patent No. 69733763.4-08, and Australian Patent No. 755847). Filters 1 and 2 were initially hybridized to a $^{32}$P-labeled SKCaR probe under very low stringency conditions (2×SSC, 0.1% SDS at 53° C.), while filter 3 was initially hybridized to $^{32}$P-labeled human parathyroid CaSR (HuPCaR) (see U.S. Pat. Nos. 6,688,938; 5,763,569; 5,858,684; and 5,962,314; Australia Patent No. 711247; Canadian Patent No. 2,115,828; Europe Patent Nos. 0 637237; 1,296,142; and 1,366,764). The filters were then washed under the stringency conditions described below followed by autoradiographic exposure to detect the presence of hybridized $^{32}$P-labeled SKCaR or HuPCaR to filter DNA.

Figure 4A:
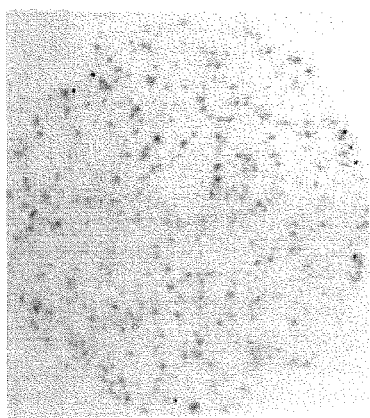
FIG. 4A is an autoradiograph of a filter containing a lawn of λ bacteriophage plaques containing recombinant DNA from shark kidney CaSR(SKCaR), which was hybridized with a $^{32}$P-labeled SKCaR DNA probe and then washed 2×30 min with 0.1×SSC, 0.1% SDS at 65° C.
Figure 4B:
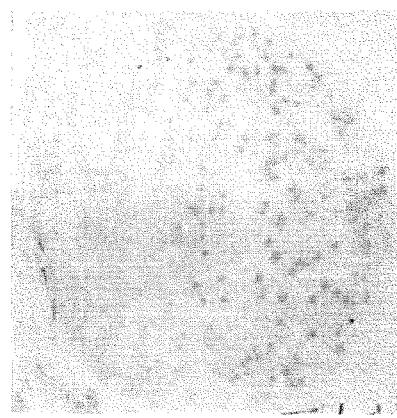
FIG. 4B is an autoradiograph of a filter containing a lawn of λ bacteriophage plaques containing recombinant lobster genomic CaSR (LobCaR) DNA, which was hybridized with a $^{32}$P-labeled SKCaR DNA probe and then washed 2×30 min with 0.5×SSC, 0.1% SDS at 65° C.
Figure 4C:
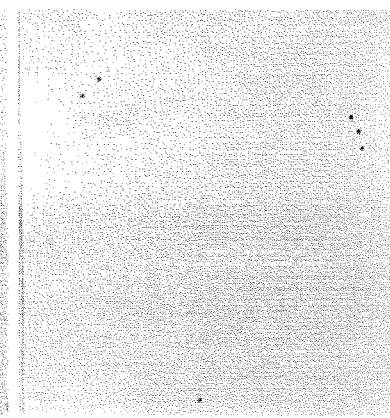
FIG. 4C is an autoradiograph of a filter containing a lawn of λ bacteriophage plaques containing recombinant human parathyroid CaSR (HuPCaR) DNA, which was hybridized with a $^{32}$P-labeled SKCaR DNA probe and then washed 2×30 min with 0.1×SSC, 0.1% SDS at 65° C.

As expected, the washing of filter #1 containing SKCaR λ bacteriophage plaques under high stringency conditions (0.1×SSC, 0.1% SDS at 65° C.) did not result in the removal of $^{32}$P-labeled SKCaR probe. This is indicated by the presence of $^{32}$P-labeled plaques after exposure to x-ray film for 3 hr of exposure (FIG. 4A). By contrast, significant DNA-DNA hybridization remains only after washing the filter with the LobCaR DNA sequence under reduced stringency (0.5×SSC, 0.1% SDS at 65° C.) (FIG. 4B). This DNA-DNA hybridization is only detectable after an 8 hr autoradiographic exposure that is greater than 2.5 times longer than the exposures performed on the filters shown in Panels 1 and 3. Washing of the filter containing the LobCaR sequence under high stringency conditions (0.1×SSC, 0.1% SDS at 65° C.) removes all $^{32}$P-labeled SKCaR DNA and no plaques are detected (data not shown). Finally, the washing of a filter with SKCaR in λ bacteriophages under high stringency conditions (0.1×SSC, 0.1% SDS at 65° C.) removes all 32P-labeled HuPCaR DNA and no plaques are detected (FIG. 4C).

Thus, the LobCaR DNA sequence (SEQ ID NO:1) does not hybridize to either (SalmoKCaR 2) or elasmobranch (SKCaR) CaSR DNA sequences under high stringency conditions (0.1×SSC, 0.1% SDS at 65° C.), suggesting that LobCaR DNA sequence is sufficiently different from both finfish (SalmoKCaR 2) and elasmobranch (SKCaR) CaSR DNA sequences.

Example 2

Comparison of the Amino Acid Sequence of the Putative LobCaR to Known CaSRs from Other Species A comparison of the percent identity (exact match) between aligned amino acid sequences of the putative LobCaR and other known CaSRs was performed (Table 1). The putative amino acid sequence of LobCaR (SEQ ID NO:3) is 64.3% identical to human parathyroid calcium receptor (HuPCaR) and 65.7% identical to the shark kidney CaSR (SKCaR). By contrast, LobCaR is approximately 83.5% identical to SalmoKCaR-2.

TABLE 1

Comparison of putative LobCaR amino acid sequence aligned to other CaSRs.
PerCent Amino Acid Identities for Various Calcium Sensing Receptors or Polyvalent Cation Sensing Receptors
As Compared to the Lobster Polyvalent Cation Sensing Receptor (LobCaR) Consisting of 944 Amino Acids

| Name of CaSR or PVCR | # of Amino Acids | AA Identical to Lobster PVCR (LobCaR) Number of AA | % |
|---|---|---|---|
| Human Calcium Sensing Receptor (HuPCaR) | 1078 | 693 of 1078 | 64.3 |
| Shark Kidney Polyvalent Cation Sensing Receptor (SKCaR) | 1027 | 675 of 1027 | 65.7 |
| Atlantic Salmon Kidney Polyvalent Cation Sensing Receptor (SalmoKCaR-2) | 941 | 788 of 944* | 83.5 |

*% identity calculation for SalmoKCaR-2 vs. LobCaR is performed using LobCaR as denominator since it is 3 amino acids longer than SKCaR-2.

These data are consistent with the findings that the LobCaR DNA sequence only hybridizes to SalmoKCaR-2 or SKCaR under reduced stringency DNA-DNA hybridization conditions (FIGS. 1 and 4). These data also indicate that the LobCaR gene, and CaSR genes in crustaceans in general, are sufficiently divergent in structure from all other known CaSRs that have been previously described, thereby suggesting that crustacean CaSRs have different functions than CaSRs in other organisms. This conclusion is supported by the fact that functionally-equivalent beta actin proteins from six highly divergent organisms have greater than 95% amino acid identity and, for most organisms, greater than 98% identity (Table 2). In contrast to actin that is incorporated into actin filaments possessing a highly conserved structure, CaSRs are expressed in multiple cell types where the structural and functional characteristics between such cells is very different and these cells are exposed to differing extracellular environments.

TABLE 2

Comparison of human beta actin amino acid sequence aligned to other beta actin proteins from various species obtained using publicly available DNA and protein databases.
PerCent Amino Acid Identities for Various Beta Actin Proteins
As Compared to the Beta Actin Protein From Humans Consisting of 375 Amino Acids

| Name of Beta Actin | # of Amino Acids | AA Identical to Human Beta Actin Number of AA | % |
|---|---|---|---|
| Xenopus laevis (African clawed frog) | 375 | 374 of 375 | 99.73 |
| Triakis scyllium (banded hound shark) | 375 | 374 of 375 | 99.73 |
| Ornithodoros moubata (soft tick insect) | 376 | 371 of 376 | 98.7 |
| Salmo salar (Atlantic salmon) | 375 | 370 of 375 | 98.7 |
| Callinectes sapidus (Blue Crab) | 376 | 369 of 376 | 98.1 |
| Strongylocentrotus purpuratus (Sea Urchin) | 376 | 362 of 376 | 96.3 |

Example 3

Expression of the LobCaR Gene in Lobsters is Tissue-Specific

To determine whether the amino acid sequence of SEQ ID NO:3 is the LobCaR protein, and to demonstrate that the LobCaR gene is expressed in various tissues of lobsters, we utilized two separate polyclonal antibodies that were created for both immunocytochemistry analyses and immunoblotting experiments. One antibody, called LOB-1, was raised against a 19 amino acid peptide (SEQ ID NO:4) of LobCaR. The other antibody, called SDD, was raised previously against a 16 amino acid peptide (SEQ ID NO:6) from salmon CaSR. To produce the polyclonal antibodies, the individual peptides were synthesized, conjugated to an antigenic protein (keyhole limpet hemocyanin) and injected intradermally into rabbits. Rabbit polyclonal antisera were produced using standard methods and techniques that are generally known to those of skill in the art. For the SDD antibody, the peptide sequence used to create the antibody differs from the corresponding LobCaR amino acid sequence (SEQ ID NO:5) by a single amino acid, (N vs. K) (Table 3). Thus, the SDD antiserum is reactive to both the LobCaR protein and its corresponding CaSR homolog in Atlantic salmon.

TABLE 3

Amino acid sequences of two peptides used for the creation of rabbit polyclonal antisera capable of recognizing LobCaR proteins in lobsters and other invertebrate organisms.

| | | |
|---|---|---|
| Lobster | LOB-1: | SVNGKKGAKLSIDKTKIL (SEQ ID NO: 4) |
| Lobster | | SDDEYGRPGIEKFEKENEM (in LobCaR CaSR) (SEQ ID NO: 5) |
| Salmon | SDD: | SDDEYGRPGIEKFEKEKEM (in SalmoKCaR-2 CaSR) (SEQ ID NO: 6) |

Figure 5A:
FIG. 5A is a micrograph of a histology section of intestine from the spiny lobster (*Panulirus interruptus*), which was probed with rabbit pre-immune serum.
Figure 5B:
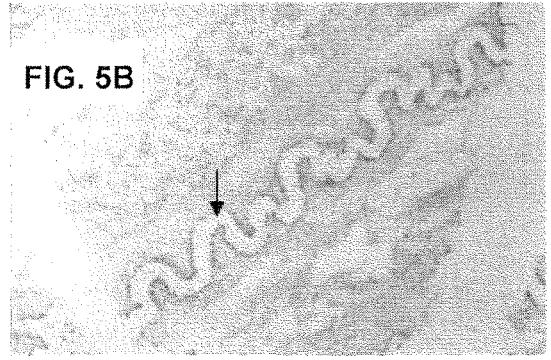
FIG. 5B is a micrograph of a histology section of intestine from the spiny lobster (*Panulirus interruptus*), which was probed with LOB-1 antiserum. Localization of immunoreactive LobCaR protein is detected as a dark gray hue. The arrow designates representative immunostaining in specific cell types.
Figure 5C:
FIG. 5C is a micrograph of a histology section of antennal gland from the spiny lobster (*Panulirus interruptus*), which was probed with rabbit pre-immune serum.
Figure 5D:
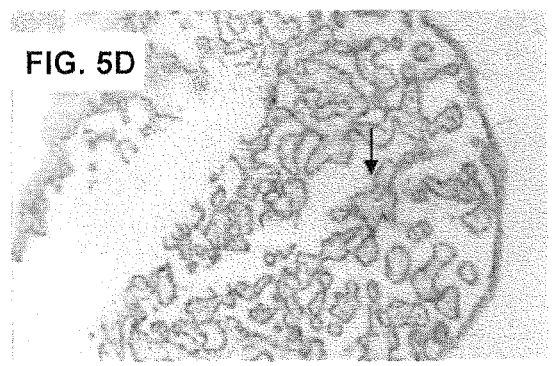
FIG. 5D is a micrograph of a histology section of antennal gland from the spiny lobster (*Panulirus interruptus*), which was probed with LOB-1 antiserum. Localization of immunoreactive LobCaR protein is detected as a dark gray hue. The arrow designates representative immunostaining in specific cell types.
Figure 5E:
FIG. 5E is a micrograph of a histology section of testis from the spiny lobster (*Panulirus interruptus*), which was probed with rabbit pre-immune serum.
Figure 5F:
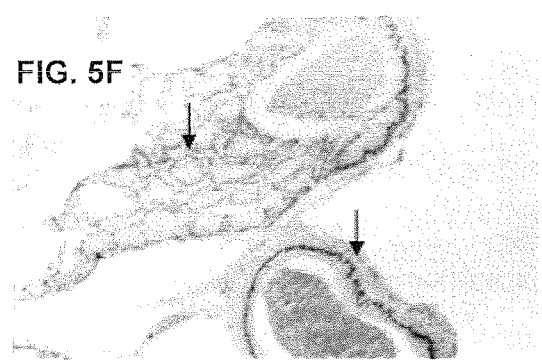
FIG. 5F is a micrograph of a histology section of testis from the spiny lobster (*Panulirus interruptus*), which was probed with LOB-1 antiserum. Localization of immunoreactive LobCaR protein is detected as a dark gray hue. The arrows designate representative immunostaining in specific cells.

Immunolocalization studies using the LOB-1 and SDD antibodies were performed on various tissues from different species of lobster. Immunoreactive LobCaR protein was detected in cells present within the intestine, antennal gland and testis of spiny lobsters (*Panulirus interruptus*) using the LOB-1 antiserum (FIGS. 5B,D,F). Exposure of identical histology sections from these same sample tissues to rabbit preimmune control antiserum, which was collected prior to immunization of the rabbits with the LOB-1 peptide, displays minimal or no reactivity (FIGS. 5A,C,E).

Figure 6A:
FIG. 6A is a micrograph of a histology section of intestine from the American lobster (*Homarus americanus*), which was probed with pre-immune serum.
Figure 6B:
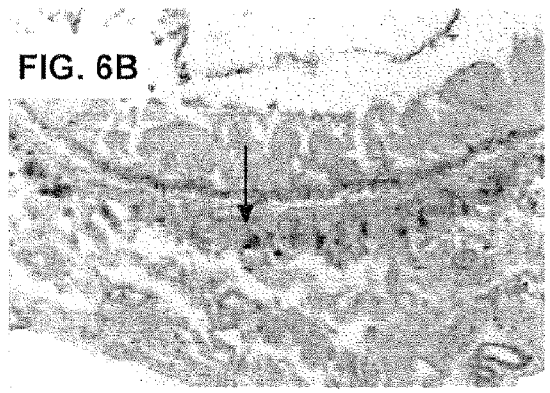
FIG. 6B is a micrograph of a histology section of intestine from the American lobster (*Homarus americanus*), which was probed with SDD antiserum. Localization of immunoreactive LobCaR protein is detected as a dark gray hue. The arrow designates representative immunostaining in specific cell types.
Figure 6C:
FIG. 6C is a micrograph of a histology section of antennal gland from the American lobster (*Homarus americanus*), which was probed with pre-immune serum.
Figure 6D:
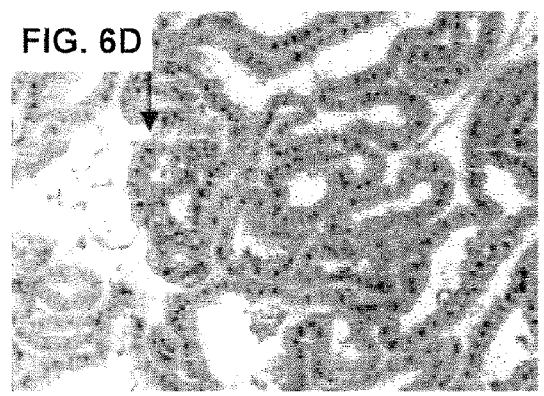
FIG. 6D is a micrograph of a histology section of antennal gland from the American lobster (*Homarus americanus*), which was probed with SDD antiserum. Localization of immunoreactive LobCaR protein is detected as a dark gray hue. The arrow designates representative immunostaining in specific cell types.
Figure 6E:
FIG. 6E is a micrograph of a histology section of testis from the American lobster (*Homarus americanus*), which was probed with pre-immune serum.
Figure 6F:
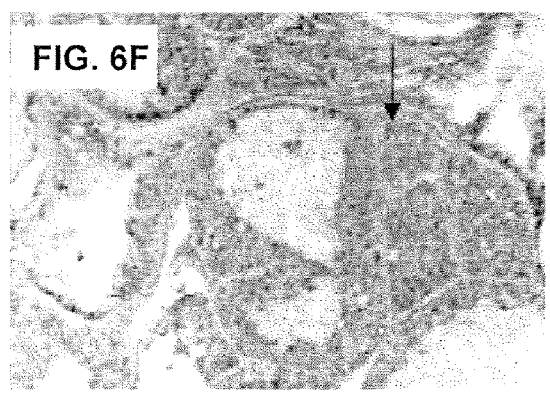
FIG. 6F is a micrograph of a histology section of testis from the American lobster (*Homarus americanus*), which was probed with SDD antiserum. Localization of immunoreactive LobCaR protein is detected as a dark gray hue. The arrow designates representative immunostaining in specific cells.
Figure 6G:
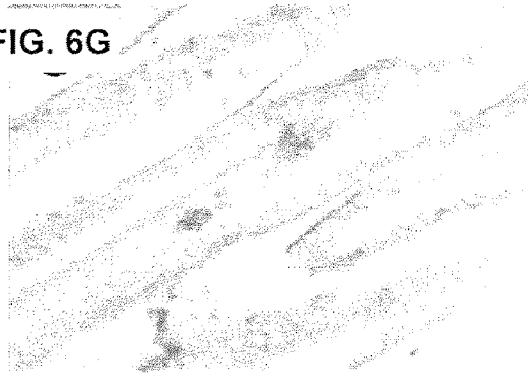
FIG. 6G is a micrograph of a histology section of gill tissue from the American lobster (*Homarus americanus*), which was probed with pre-immune serum.
Figure 6H:
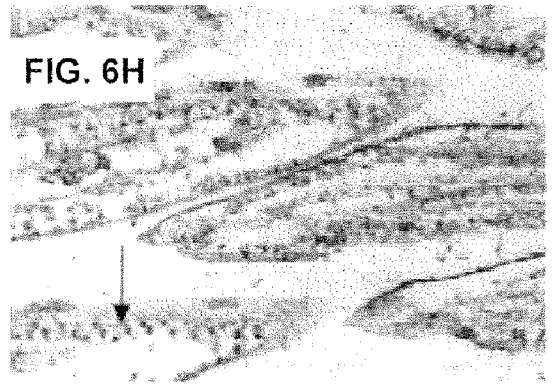
FIG. 6H is a micrograph of a histology section of gill tissue from the American lobster (*Homarus americanus*), which was probed with SDD antiserum. Localization of immunoreactive LobCaR protein is detected as a dark gray hue. The arrow designates representative immunostaining in specific cells.

A similar study was performed using tissues from another lobster species, the American lobster (*Homarus americanus*). SDD antiserum (FIGS. 6B,D,F,H), but not its pre-immune counterpart (FIGS. 6A,C,E,G), localized LobCaR protein to specific cells in lobster intestine (FIG. 6B), antennal gland (FIG. 6D), testis (FIG. 6F) and gill (FIG. 6H). The pattern of antibody localization of LobCaR immunoreactive protein is similar in common tissues tested from both lobster species, including intestine, antennal gland and testis. These data show that LobCaR protein is selectively expressed in lobster cells.

Example 4

Antibodies that Recognize LobCaR can Detect the Localization of CaSR Proteins in other Crustaceans and Invertebrates LOB-1 and SDD antibodies were utilized as probes to determine the presence and location of LobCaR homologs in other crustaceans and/or invertebrates, we performed immunolocalization studies using the LOB-1 and SDD antibodies described in Example 3 in various life stages of another crustacean, the northern acorn barnacle (*Semibalanus balanoides*) (FIGS. 7A-F). Immunostaining was detected in selected cells of the barnacle that included the cirri (thoracic feeding appendages) (FIG. 7B) and epithelial cells lining the GI tract (FIG. 7D).

Figure 9:
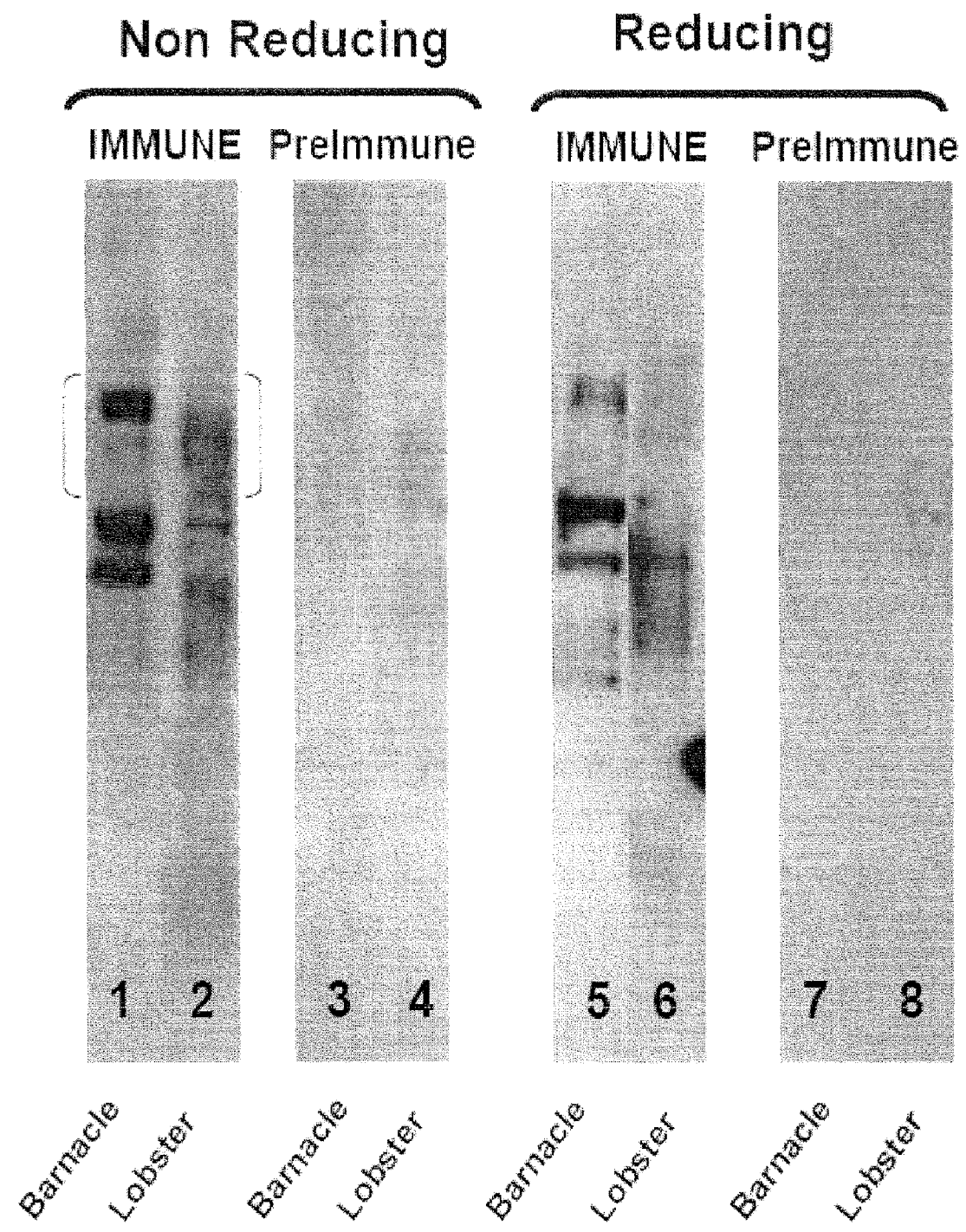
FIG. 9 is an immunoblot depicting at least 3 major bands in both barnacle (*Semibalanus balanoides*) (Lanes 1, 3, 5 and 7) and star lobster (*Panulirus guttatus*) (Lanes 2, 4, 6, and 8) fractionated protein extracts that were recognized by anti-SDD LobCaR antiserum (IMMUNE; Lanes 1, 2, 5 and 6), but not by preimmune antiserum (PreImmune; Lanes 3, 4, 7 and 8). A reduction in the intensity of high molecular weight bands (denoted by brackets on Lanes 1 and 2) was observed in lanes fractionated under reducing conditions compared to nonreducing conditions.

To demonstrate that antibody reagents produced from peptides containing amino acid sequences present in LobCaR are useful as probes to further characterize the structure, function and roles of CaSRs in invertebrates, immunoblotting analyses were performed after sodium dodecylsulfate polyacrylamide gel electrophoresis (SDS-PAGE) fractionation of proteins from barnacles (*Semibalanus balanoides*) and star lobsters (*Panulirus guttatus*) under non-reducing (no addition of sulfhydryl reducing agents) or reducing (addition of sulfhydryl reducing agents) conditions (FIG. 9). Exposure of membranes containing fractionated proteins to immune anti-SDD LobCaR antiserum (IMMUNE), but not preimmune (PreImmune) antiserum, resulted in at least three major bands in lanes containing barnacle and lobster extracts (Lanes 1,2 and 5,6). The intensity of the larger molecular weight bands (denoted by the brackets) was diminished in lanes fractionated under reducing conditions as compared to nonreducing conditions. The apparent reduction in the molecular weight of these immunoreactive bands is similar to that observed in various other CaSR proteins in both terrestrial (Ward, D. et al. J. Biol. Chem. 1997) as well as aquatic organisms.

Example 5

Identification of CaSR Genes in Various Invertebrate Organisms using Complete or Partial LobCaR Gene Sequences as Probes The complete and partial DNA sequences of the LobCaR gene (e.g., SEQ ID NOS: 1 and 2) can be utilized as probes to determine both the presence and structure of CaSR genes in invertebrates using standard genomic DNA-DNA hybridization techniques. Because the DNA sequence of the LobCaR gene is more homologous to other invertebrate and teleost fish CaSR genes than CaSR genes form other organisms (see Table 1), DNA-DNA hybridization techniques using the LobCaR gene DNA can be used to identify the presence and structure of CaSR genes in various invertebrates under both high and reduced stringency conditions, due to lack of significant cross-hybridization with CaSR genes from other organisms (see FIGS. 4A-C).

Figure 10:
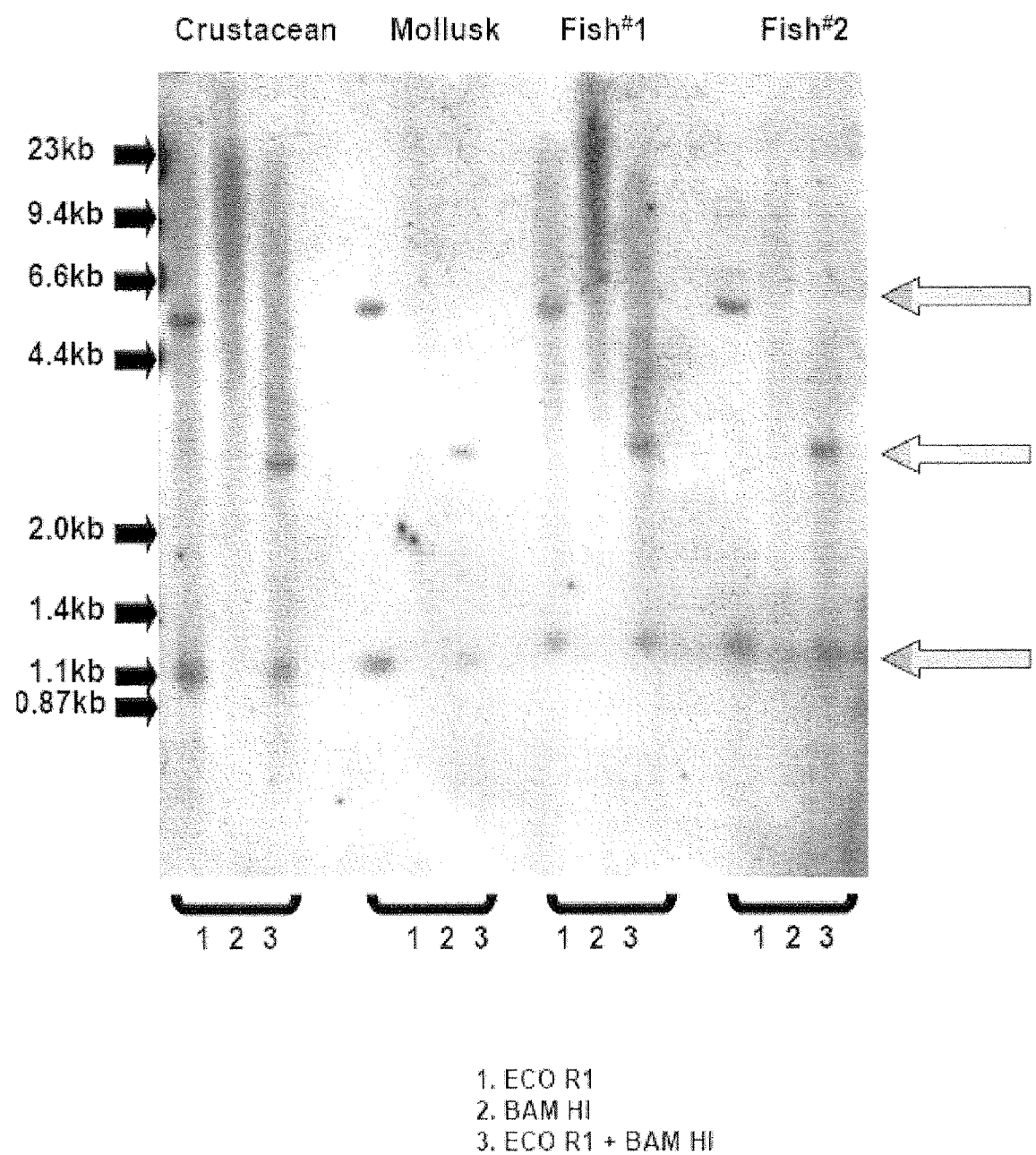
FIG. 10 is an autoradiogram of a genomic Southern hybridization blot showing CaSR gene structure in crustaceans, mollusks and teleost fish. Purified genomic DNA prepared from crustacean (lobster), mollusc (mussel) and teleost fish, (i.e., goldfish (Fish #1) and guppy (Fish #2)) was digested with either ECOR1 (lanes marked "1"), BAM H1 (lanes marked "2") or a combination of ECOR1+BAM H1 (lanes marked "3"), subjected to agarose electrophoresis fractionation, transferred to a membrane and hybridized under high stringency conditions using a full length $^{32}$P-labeled LobCaR DNA as a probe. The leftward pointing arrows indicate specific DNA fragments from the crustacean, mollusc and teleost fish genomes that hybridize to the LobCaR DNA probe.

DNA-DNA hybridization analyses were performed to assess the utility of the LobCaR DNA in identifying and assessing the structure of CaSR genes in various invertebrates. Genomic DNA from crustacean (lobster), mollusc (mussel) or teleost fish (goldfish and guppy) was subjected to restriction endonuclease digestion with either ECOR1, BAM H1 or a combination of ECOR1+BAM H1, and fractionated using agarose gel electrophoresis. The resulting DNA contents of the agarose gel was transferred to a membrane and probed with LobCaR DNA (SEQ ID NO:1) under high stringency conditions (0.1×SSC, 0.1% SDS at 65° C.). FIG. 10 shows the resulting autoradiogram where labeled bands represent specific DNA-DNA hybridization between $^{32}$P-labeled LobCaR DNA and DNA from invertebrate or teleost fish genomes coding for CaSR homologs in these organisms.

Figure 11:
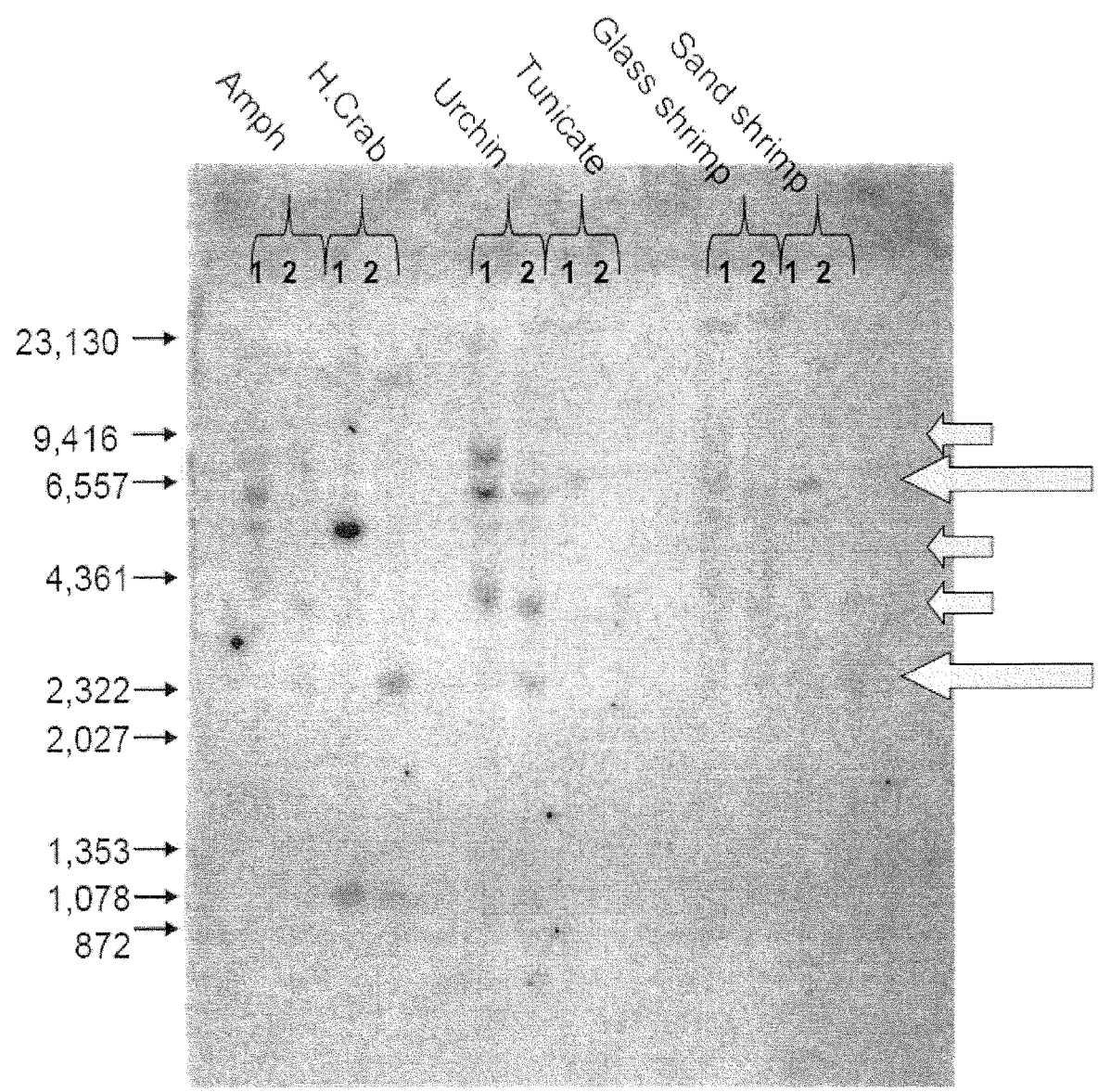
FIG. 11 is an autoradiogram of a genomic Southern hybridization blot showing the presence and structure of CaSR gene homologs in amphioxus (Amph), horseshoe crab (*Limulus polyphemus*) (H. Crab), sea urchin (Urchin), tunicate and two species of shrimp (Glass shrimp (*Palaemonetes* spp.) and Sand shrimp (*Crangon septemspinosa*)). Purified genomic DNA prepared from each of these species was digested with either ECO R1 (lanes marked "1") or a combination of ECOR1+BAM H1 (lanes marked "2"), subjected to agarose electrophoresis fractionation, transferred to a membrane and hybridized under reduced stringency conditions using a full-length $^{32}$P-labeled LobCaR DNA probe. Specific DNA fragments that hybridize to the LobCaR DNA probe are indicated by leftward pointing arrows.

A similar DNA-DNA hybridization analysis was performed under reduced stringency conditions using $^{32}$P-labeled LobCaR DNA as a probe and genomic DNA from cephalochordate (amphioxus), an ancient invertebrate (horseshoe crab, *Limulus polyphemus*), sea urchin, tunicate and two species of decapod shrimp (FIG. 11), revealing the existence of CaSR homologs of the LobCaR gene in these species.

These data indicate that complete and partial DNA sequences of the LobCaR gene (e.g., SEQ ID NOS: 1 and 2) can be utilized as probes to determine the presence and structure of putative CaSR genes in invertebrates using standard genomic DNA-DNA hybridization techniques. Information gained from these studies can be used not only to select what species and class of invertebrate organism to conduct scientific or commercial development studies on, but also to guide the direction of future functional assessment using knowledge of both the size and presence of specific fragments of CaSR gene homologs present in invertebrate species.

Example 6

Identification of Putative CaSR Genes and Protein sequences in Publicly-Available Databases using LobCaR Nucleotide and Amino Acid Sequences Interactive websites that allow for computer searches of databases containing genomic sequences have been developed for multiple organisms, including the cnidarian starlet sea anemone (*Nematostella vectensis*), the tunicate sea squirt (*Ciona intestinalis*), the echinoderm purple sea urchin (*Strongylocentrotus purpuratus*), and nematode round worm (*Caenorhabditis elegans*). However, the utility of searches in these databases are limited by the lack of appropriate sequence probes to search them. Therefore, the nucleic acid and amino acid sequences of LobCaR (e.g., SEQ ID NOS:1, 2 and 3) can be used to search these databases and others to identify candidate CaSR genes and proteins that can be studied further.

Figure 12A:
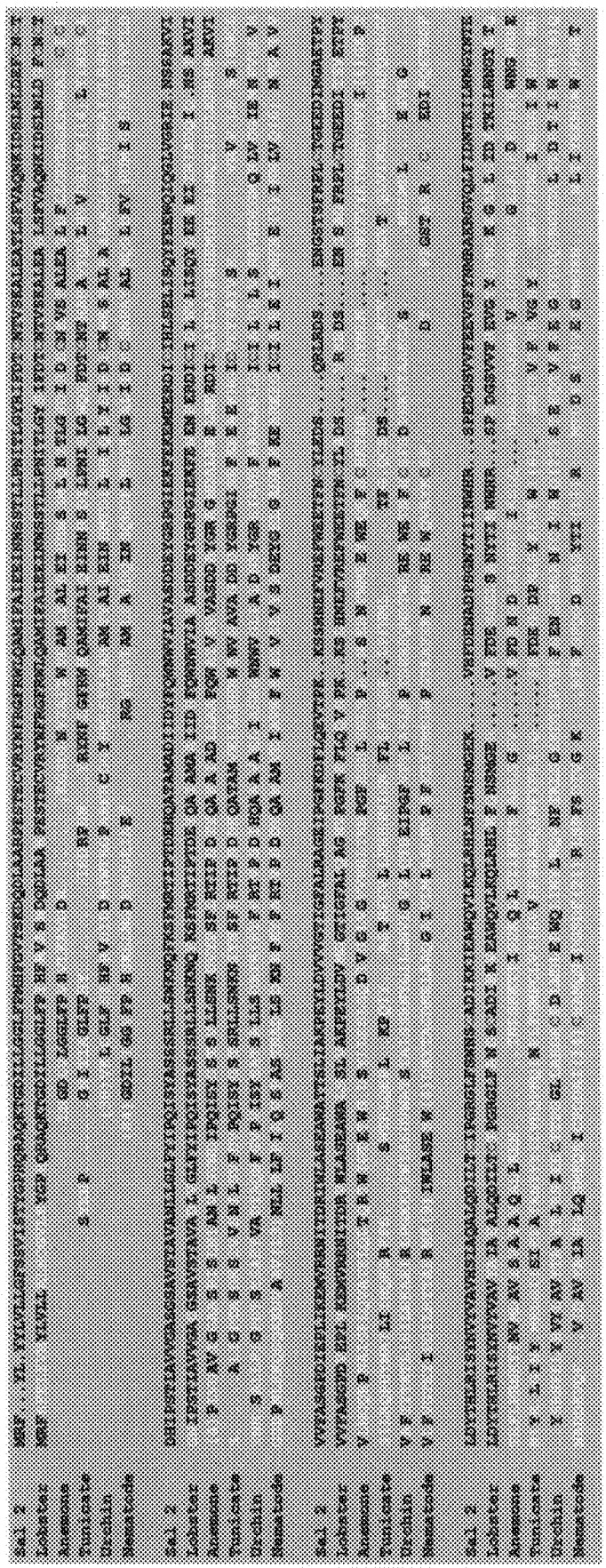
FIG. 12 is an alignment of amino acid sequences of candidate CaSR proteins obtained from publicly available databases with the amino acid sequence of SalmoKCaR-2 (Sal 2), used as a probe to isolate LobCaR, and the amino acid sequence of LobCaR (Lobster) (SEQ ID NO:3). Amino acid sequences included in the figure are from Anemone (*Nematostella vectensis*), Tunicate (*Ciona intestinalis*), Urchin (*Stongylocentrotus purpuratus*) and Nematode (*Caenorhabditis elegans*). Identical amino acid residues at the same position are shown in black and differing amino acids at the same position are shown in light gray. Highly conserved cysteine residues (C) that may be involved in appropriate folding of the expressed protein are shown in medium gray.
Figure 12B:
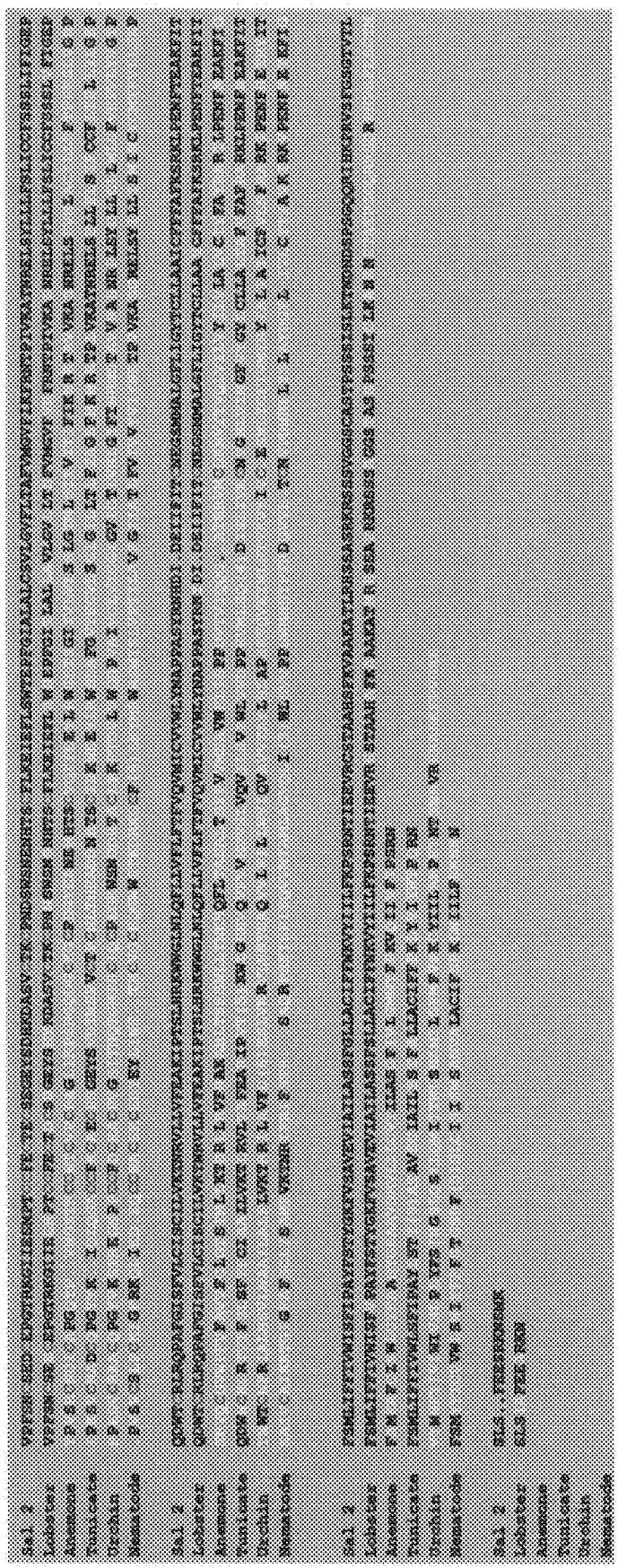

Accordingly, the complete LobCaR amino acid sequence (SEQ ID NO:3) or portions thereof were used to identify candidate CaSR proteins in publicly available databases. FIG. 12 shows an alignment of SEQ ID NO:3 with amino acid sequences of candidate CaSR proteins, which were not identified as calcium sensing receptor proteins (CaSRs) in their respective databases. Rather, these sequences were labeled as either "weakly similar to" (*Ciona intestinalis*) or "predicted peptide similar to CaSR" (sea urchin), or mislabeled as a "ANF receptor" (*Nematostella vectensis*) or "metabotropic glutamate receptor-7" (*C. elegans*) in their respective databases. However, comparison of SEQ ID NO:3 from lobster with these candidate sequences from various databases shows that these amino acid sequences are actually CaSR homologs.

These claims can be further substantiated using the nucleic acid sequences of LobCaR (e.g., SEQ ID NOS:1 and 2) to perform DNA-DNA hybridization studies as described in Examples 1 and 4, or by performing immunolocalization studies on sections or immunoblot analyses on SDS-PAGE fractionated protein mixtures as described in Example 3. Taken together, these data indicate that SEQ ID NOS:1, 2 and 3 can be used, either individually or in various combinations, to identify and characterize candidate CaSR proteins in various species of widely divergent invertebrate organisms.

Example 7

Proteins Reactive with LobCaR Antiserum are Expressed in Nutrient Transporting and Osmoregulatory Tissues of the Shrimp *Litopenaeus vannamei*

To determine whether putative CaSR proteins in shrimp localize to nutrient transporting and osmoregulatory tissues, sections of intestine and posterior gill from the shrimp *Litopenaeus vannamei* were stained with LobCaR antiserum. Specific staining was observed in cells lining the lumen of the intestine (FIG. 13D) and at the base of secondary filaments in tissues of the gill that are putatively involved in ionoregulation rather than respiration (FIGS. 13A & B). Similar results were obtained when using the SDD antiserum. Staining was also present in eyestalk tissues as well as integumentary epithelium (FIG. 13C). Putative CaSR proteins in shrimp gill osmoregulatory tissues also colocalize Na/K atpase, an enzyme that is crucial to osmoregulation in this species.

Example 8

Figure 14:
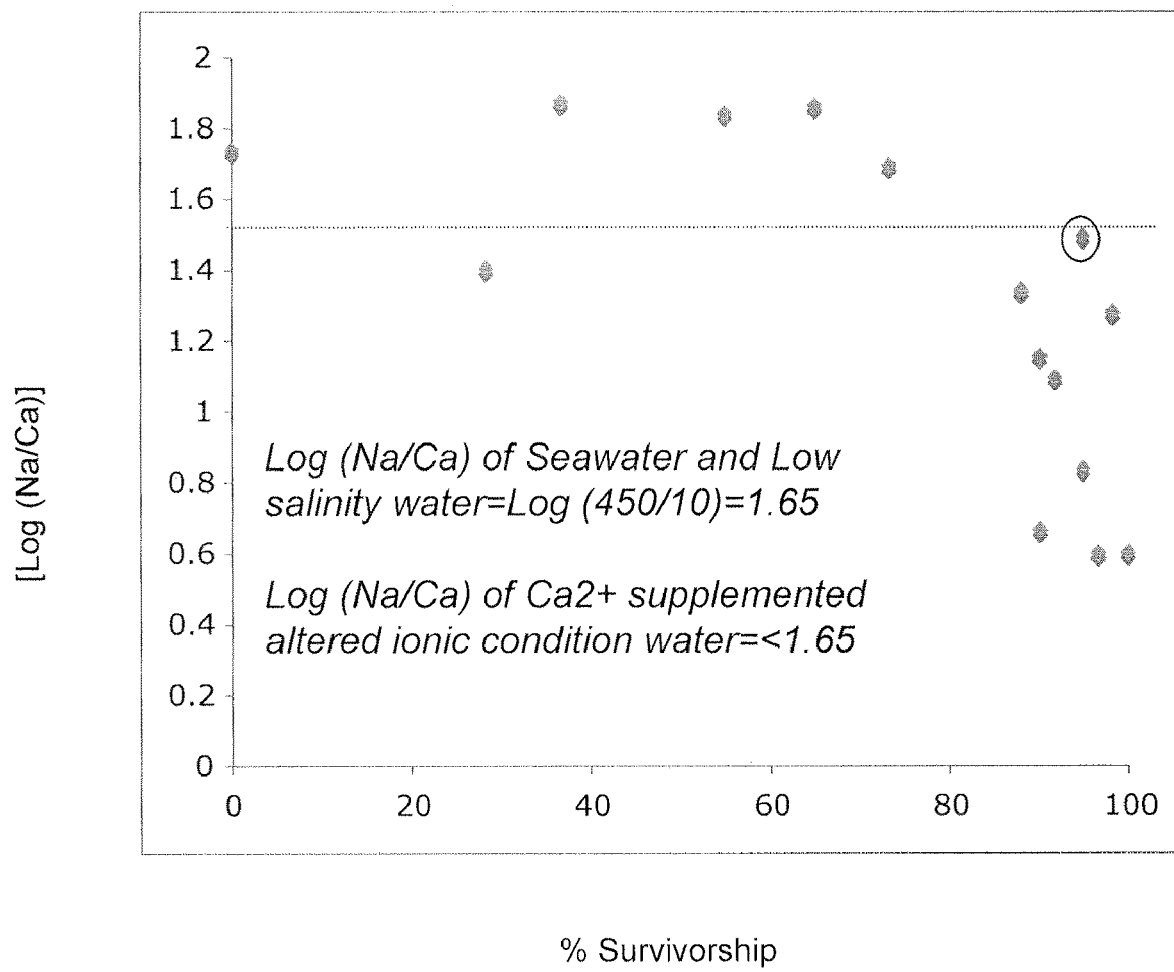
FIG. 14 is a graph depicting the relationship of shrimp postlarval survivorship to inland well water ionic composition. Percent survivorship is shown for shrimp raised in well waters with differing sodium/calcium ratios. The encircled data point indicates 95% survivorship in artificial seawater at 4 ppt, which had a [log(Na/Ca)] ratio of 1.49 in this particular study (values taken from tables in Saoud, I, D. Davis, and D. Rouse, 2003. Suitability studies of inland well waters for *Litopenaeus vannamei* culture. Aquaculture 217:373-383).

Relationship of Shrimp Postlarval Survivorship to Inland Well Water Ionic Composition The relative 48 hr survivorship of shrimp postlarvae (PL20) in southern U.S. well waters with various ionic compositions was tested. Percent (%) survivorship varied from 0-100%, depending on the ionic composition of the water (FIG. 14). All well waters with $Na^+/Ca^{2+}$ ratios that were less than those found in artificial seawater (at or about 45), which are generally indicative of higher $Ca^{2+}$ concentrations than in artificial seawater, showed good survivorship, whereas well waters with higher $Na^+/Ca^{2+}$ ratios than artificial seawater showed uniformly poor survivorship (values taken from tables in Saoud, I, D. Davis, and D. Rouse, 2003). Suitability studies of inland well waters for *Litopenaeus vannamei* culture. Aquaculture 217:373-383). Thus, the ratio of $Na^+$ to $Ca^{2+}$, both CaSR modulatory compounds, appears to have a significant influence on survivorship of shrimp.

Example 9

Figure 16A:
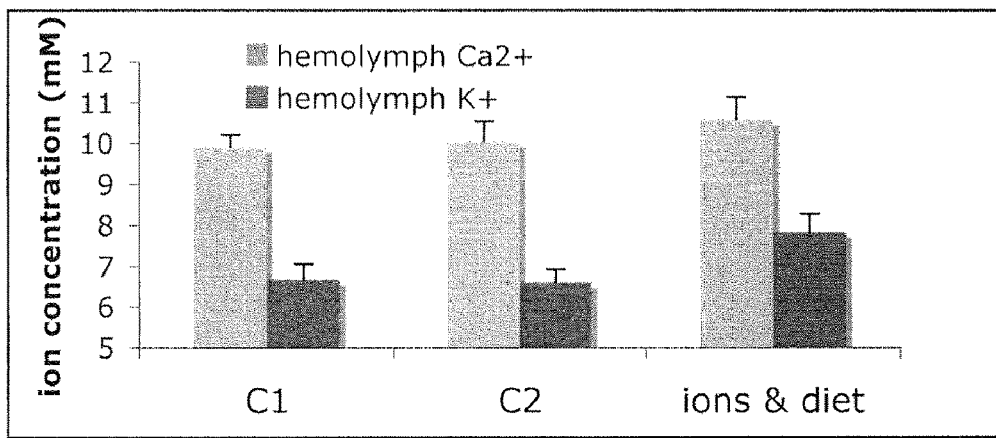
FIG. 16A is a graph depicting the effect of adding CaSR modulators to the water and feed (ions & diet group) on levels of $Ca^{2+}$ and $K^+$ in the hemolymph of the shrimp *Litopenaeus vannamei*. No CaSR modulators were added to the water or feed in either control group (C1, C2).
Figure 16B:
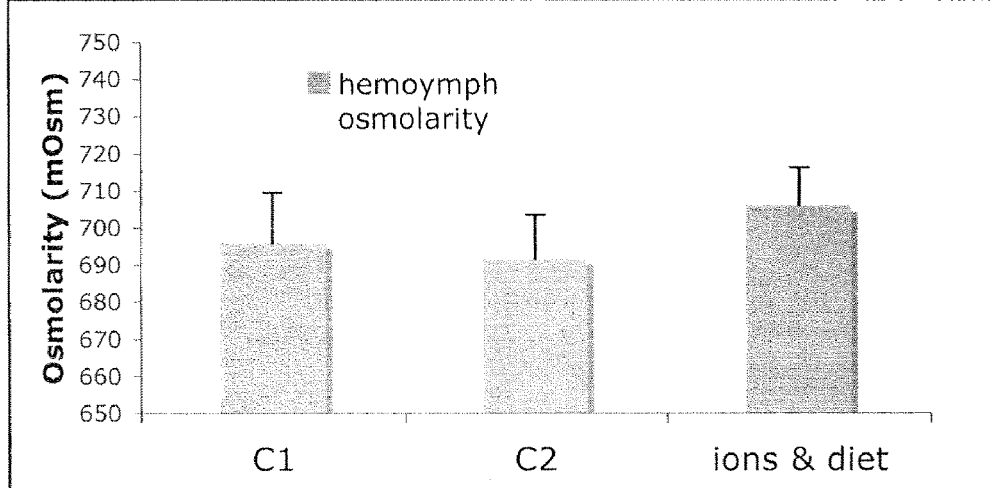
FIG. 16B is a graph depicting the effect of adding CaSR modulators to the water and feed (ions & diet group) on hemolymph osmolarity in the shrimp *Litopenaeus vannamei*. No CaSR modulators were added to the water or feed in either control group (C1, C2).
Figure 16C:
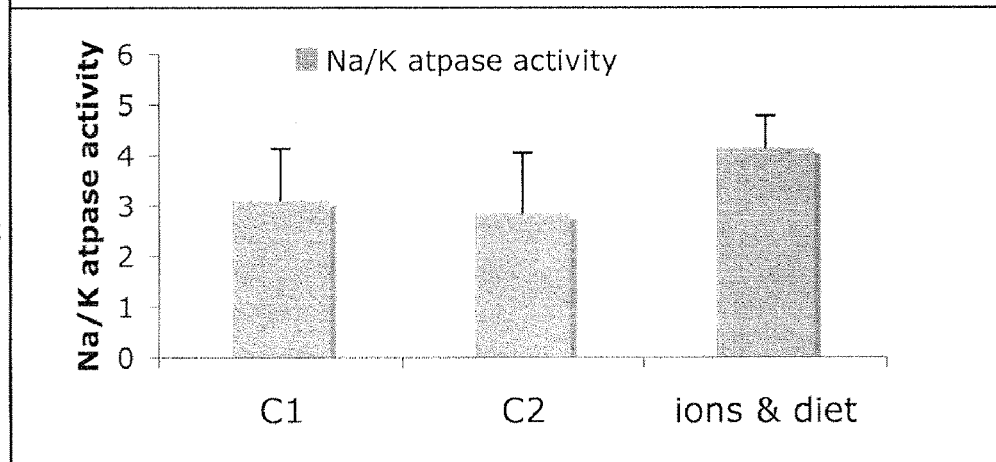
FIG. 16C is a graph depicting the effect of adding CaSR modulators to the water and feed (ions & diet group) on Na/K atpase activity in the shrimp *Litopenaeus vannamei*. No CaSR modulators were added to the water or feed in either control group (C1, C2).

Addition of CaSR Modulators to Water and Diet Induces Multiple Changes in Shrimp Physiology To test the effect of CaSR modulators on shrimp physiology, three groups of *Litopenaeus vannemei* shrimp were tested for 4 weeks. Two control groups (C1 and C2) were held under 4 ppt recirculating water conditions, whereas an experimental group (SS & diet) was held under identical conditions, except that CaSR modulators were added to the water (3 mM $CaCl_2$, 1 mM $MgCl_2$) and the feed (5% NaCl, 0.4% Tryptophan). The experimental group showed an elevated incidence of molting (FIG. 15A), a reduction of mortality (FIG. 15 B) and increased growth (FIG. 15C) relative to both control groups. The experimental group also showed elevated levels of certain ions in the hemolymph as compared to controls (FIG. 16A), as well as increased hemolymph osmolarity (FIG. 16B). Gill Na/K atpase activity was also increased in the experimental group (FIG. 16C).

Example 10

Figure 17:
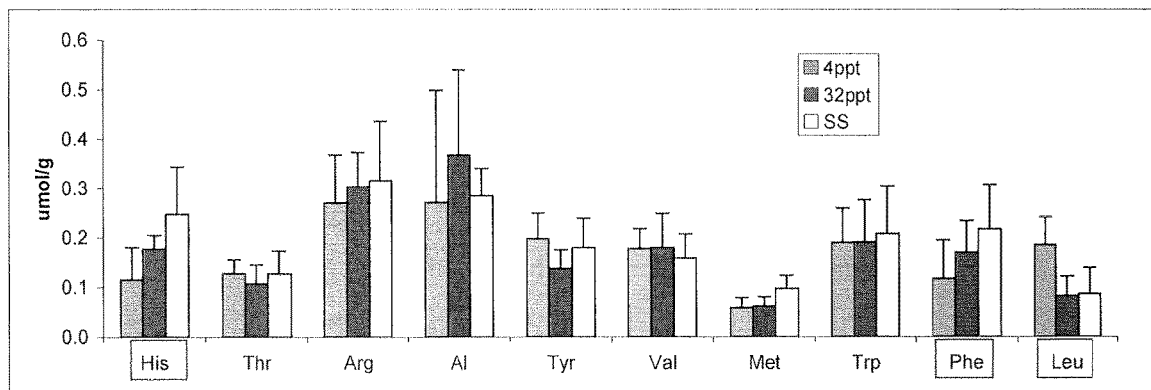
FIG. 17 is a graph depicting the concentrations of various amino acids in tail muscle of shrimp raised for greater than 2 weeks under each of 3 experimental condition standardized to the glycine concentration in each sample (n=3 per treatment mean±SEM): 1) low salinity water (4 ppt), 2) normal seawater (32 ppt), and 3) low salinity water (4 ppt) supplemented with CaSR modulators, as well as feed containing the CaSR modulator tryptophan (SS). These data show that the invention has specific effects on amino acids that may be important to osmoregulation or taste, specifically the amino acids outlined (H is, Phe, Leu) show that the method leads to amino acid concentrations that are more like shrimp adapted to seawater as compared to those adapted to standard low salinity water.

The addition of CaSR Modulators to Low Salinity Water and Feed Alters the Concentrations of Various Amino Acids in Shrimp Shrimp cultured in low salinity water often exhibit undesirable differences in texture and taste relative to shrimp raised in sea water. These differences are influenced in part by amino acid concentrations in the muscle. To assess the effect of CaSR modulators on the amino acid composition of the shrimp tail muscle, shrimp were raised for more than 2 weeks under 3 experimental conditions: 1) low salinity (4 ppt seawater), 2) normal seawater (32 ppt) and 3) low salinity water (4 ppt) supplemented with calcium and magnesium, as well as feed supplemented with tryptophan. Differences in amino acid concentrations in tail muscle were observed for each treatment group (FIG. 17), indicating that the presence of CaSR modulators in the water and feed alter the amino acid of the shrimp tail muscle. Notably, the addition of CaSR modulators to the water and feed produced shrimp tail muscles with concentrations of at least some amino acids that are closer to those found in shrimp raised in normal sea water.

The relevant teachings of all patents, published applications and references cited herein are incorporated by reference in their entirety. Also, the teachings of companion International Patent Application No.: PCT/US08/05683, entitled "Methods of Inhibiting Biofouling by Aquatic Bio fouling Organisms," filed concurrently on May 2, 2008, are hereby incorporated by reference in their entirety.

While this invention has been particularly shown and described with references to example and preferred embodiments thereof, it will be understood by those skilled in the art that various changes may be made therein without departing from the scope of the invention encompassed by the appended claims and equivalents.

What is claimed is:

1. A method of raising crustaceans in low salinity water, comprising:
   a) maintaining crustaceans in low salinity water having one or more Calcium-sensing Receptor (CaSR) modulator(s) in an amount sufficient to modulate at least one CaSR in the crustaceans; and
   b) adding feed for crustacean consumption to the low salinity water containing the one or more CaSR modulator(s), wherein the feed contains an agent in an amount sufficient to contribute to modulation of the at least one CaSR in a tissue of the crustaceans, after consumption of the feed by the crustaceans.

2. The method of claim 1, wherein the one or more CaSR modulator(s) is a calcimimetic agent.

3. The method of claim 1, wherein the one or more CaSR modulator(s) is a calcilytic agent.

4. The method of claim 1, wherein the one or more CaSR modulator(s) is selected from the group consisting of a polyvalent cation, an aminoglycoside, a linear peptide, a cyclic peptide, 1,25 dihydroxyvitamin D, a cytokine, macrophage chemotactic peptide-1, an aromatic amino acid, and a tryptophan-pathway metabolite.

5. The method of claim 1, wherein the one or more CaSR modulator(s) is selected from the group consisting of $Ca^{2+}$, $Mg^{2+}$ and a combination thereof.

6. The method of claim 5, wherein the one or more CaSR modulator(s) is $Ca^{2+}$ and $Mg^{2+}$, wherein the $Ca^{2+}$ is present in the water at a concentration of about 0.3 mM to about 12 mM and the $Mg^{2+}$ is present in the water at a concentration of about 0.5 mM to about 30 mM.

7. The method of claim 1, wherein the agent in the feed is present in an amount sufficient to contribute to an increased level of the one or more CaSR modulator(s) in a tissue of the crustaceans.

8. The method of claim 1, wherein the agent in the feed comprises NaCl.

9. The method of claim 8, wherein the feed contains at least about 1% NaCl by weight.

10. The method of claim 1, wherein the feed contains one or more CaSR modulator(s).

11. The method of claim 1, wherein the crustaceans are selected from the group consisting of shrimp, prawns, spiny lobsters, clawed lobsters, crayfish and crabs.

12. The method of claim 1, wherein the low salinity water is low salinity water with altered ionic conditions.

13. The method of claim 12, wherein the altered ionic conditions include a $Na^+/Ca^{2+}$ ratio that is less than the $Na^+/Ca^{2+}$ ratio in standard sea water.

14. The method of claim 1, wherein the low salinity water has a salinity of about 0.5 ppt to about 12 ppt.

15. The method of claim 1, wherein the crustaceans are raised under recirculating conditions.

16. The method of claim 1, wherein the crustaceans are in one or more phases of commercial production selected from the group consisting of a broodstock phase, a reproductive phase, and a spawning phase.

17. The method of claim 1, wherein the crustaceans are in one or more phases of production selected from the group consisting of a hatchery phase, a settlement phase, a larval phase, and a postlarval phase.

18. The method of claim 1, wherein the crustaceans are in one or more phases of production selected form the group consisting of a juvenile growout phase, an adult growout phase, a harvest phase, and a finishing phase.

19. A method of raising crustaceans in low salinity water, comprising:
   a) adding one or more Calcium-sensing Receptor (CaSR) modulator(s) to low salinity water in an amount sufficient to modulate at least one CaSR in the crustaceans;
   b) transferring the crustaceans to the low salinity water containing the one or more CaSR modulator(s); and
   c) adding feed for crustacean consumption to the low salinity water containing the one or more CaSR modulator(s), wherein the feed contains an agent in an amount sufficient to contribute to modulation of the at least one CaSR in a tissue of the crustaceans, after consumption of the feed by the crustaceans.

20. A method of raising crustaceans, comprising:
   a) adding one or more Calcium-sensing Receptor (CaSR) modulator(s) to low salinity water in which crustaceans are maintained, wherein the one or more CaSR modulator(s) are added in an amount sufficient to modulate at least one CaSR in tissue of the crustaceans; and
   b) adding feed for crustacean consumption to the low salinity water containing the one or more CaSR modulator(s), wherein the feed contains an agent in an amount sufficient to contribute to modulation of the at least one CaSR in a tissue of the crustaceans, after consumption of the feed by the crustaceans.

* * * * *

SEQUENCE LISTING

<160> NUMBER OF SEQ ID NOS: 11

<210> SEQ ID NO 1
<211> LENGTH: 6377
<212> TYPE: DNA
<213> ORGANISM: Panulirus interruptus

<400> SEQUENCE: 1

```
cgtcgtcgtc atctcgtatg ggagcatttt ttaggagtaa atcggtattg gaatgattcg        60
tgatacgaat gtcagaatct gtacatcctc actgatgata cttatggctt cagcgaaatt       120
cagcagcaca tctgtgtaaa atgtagcttt aattgttaga aactttataa atcaataatc       180
cgacctagat tttagcctgt agttctttta tttacaaaaa aaaaaaaaaa aaaatcattc       240
catgacttct agtcattgtc atgactttta cagttcagtc attagtactt gtacattggt       300
tcagtcattg agggcccgtg ttattgagga ctagagttca gcatcttaaa actgaatttt       360
gggtgcatac actgaagatc aaactttta attttaacgt ctatctttgt ttgttttttac       420 ctttttttt atatatatat ttttttttct gtagggatat acagctttac cttcacccct       480
gctgttctca aattcctgcg tcttataact tcatggaaca ttccgtctta aaagcatccc       540
acagaccaca aagtgcatcg gagatgaaga tgagactgac ggaggatagg acgaagagat       600
cgatcgctcc tcagatagac ccctggtgaa aggggggagag agaaaaaata ccctgaacac       660
agactatcaa gcgtttaggg ctcagactgc ttctgccatg catttgcttt tagttcctgt       720
gttatagcat gtcatatata tatatatata tatacgatta caagcttttc tatcttgtac       780
tttaatggac catgtttcta ggttttactc cgatttcctg aattcatact gagaaacaca       840
taaacgtaga ttaatttgcc agatagtttt tattcaaagc ttgggatttg agctcacgac       900
cttctggcca aacactcagc tgctgctcta ccctgtcta tggccaaaaa acattcaaag        960
cactgagact atgaggtttt ctttcgagct ctatgtgcac tacttggtgc tgttggcttt      1020
gaactgtgga gttttatcat acggccctcg tcagagagct cagaagacgg gggacatcct      1080 gctgggggggc ttgttcccta tacacttcag agtcgcttcc aacgaccagg atttggctgc      1140
taaaccggaa tcaaccgagt gcgtgaggta cgtggagaaa gaaacggaaa tgaactgtac      1200
aggaaagcgc tgttgtaata tagcgttcga cgatgtttaa attcaaaaga acgaaaaaaa      1260
cccctcatgt ctgtgacttg aaccgatcaa aaatggactt tccttttgac ctgtaaataa      1320 tatgggttc tgctgatgga tcagcttcgt aaacatttct ttcctctgtg ctgtgtgatt      1380
tctcaggtac aatttccgtg gatttcgttg gctccaggct atgattttg caatcgagga       1440 aatcaacaac agttctactc ttttaccaaa catcactttg gggtacagta tattcgacac      1500
ctgtaacacc gtctccaaag ccctggaggc gtctctgagc ttcgtggctc agaataagat      1560
```

```
cgactctctg aacttggatg ggttttgtaa ctgcaccggg aacatcccgt ccaccatcgc    1620
cgtggtcggg gcttgcggat cggcggtttc gacggccgtg gccgacctcg tcggtctctt    1680
ctacatccca caggtgagcg gggacttttc tgtaaagagg ttttttttt ttttattaag    1740 aaagaaatgg tgttactttt tttgagcttt taatttgct ccatcagatc agctatgctt    1800
cttcgagtcg ccttctgagc aacaagaacc agtacaagtc cttcatgagg actattccga    1860
ctgacgagta ccaggccatc gcgatggcgg ccatcatcga tcacttccag tggaactggg    1920
tcatcgcgat cgcctcggac gatgaatacg gtcgtcccgg gatagagaaa ttcgagaacg    1980
agatgttcga gagggacatc tgcatcgacc tcaacgtgct gatctctcag tatctggaag    2040
aagccgagat tatccgcatt gcagaccaaa tccagaactc caccgctaaa gtcatcgtcg    2100
tctttgctag cgggcccgac gttgagccgc tggttaagga atggtgagg cgcaacatca    2160 cggatcgtgt gtggttagcg agcgaagcgt gggctctgtc gagcctggtg gccaaacccg    2220
agtacctgga tgtcatgggc gggacgatcg gcttcgcgct gcaggccgga cacgtacccg    2280
gattcaagga attcctgcag caggtccatc cgaaaaaatc cctccataac gagttcgtgc    2340 gagagtttg ggaagagacg ttcaactgtt acctggcgga cagtgtgagg aaggaggaca    2400
gcgagaacag cagcgcgggc tttaggccgc tttgcacggg cgaggaggac atcacgagcg    2460 tcgacgcc ttacctggac tacactcacc tgagaatctc ctataacgtc tacgtggcag    2520
tttacgccat agccgaggcg ctgcaggaca ttctcacctg tacgcccggg agaggactct    2580
tcgctaacgg atcctgtgct gatattcgaa agtggaggc gtggcaggtg aatgagcagg    2640
aagtccggtg ttttctgtgc tgtaagacct ttagctgtgt tgaactttaa caatgatctg    2700
tgataaacgt gtagttttt ttttccttcc aggtcttaaa gcagctgagg catctgaagt    2760
tccagaacag catgggcgag cgagtgcgtt tcgacgagag cagtgaactt tctgccaact    2820
acaccatcat gaactggcac cgttccccg cggacggctc ggtggtgttc agggaggtcg    2880
ggtactacag cgttaacggc aaaaagggcg ccaaactctc catagacaaa acaaaaatac    2940
tgtggaacgg ctatctgacc caggtgagaa gcagagggctc cgagtacgtc ctcacgacgc    3000
ccgtttacag gactagaaaa ttattttaga aatcataaga gaactcaatg caatgattag    3060
caatatataa ataaatacac tcaccgtcca gtttaatagg aacgcccgaa caccgcctca    3120
tctgtacggt tctctaatca tgtggcatca gcagcacagt gcatgaaagc aggtaagatg    3180
caggtgtgtg tgagctctag agactgctgt gtgtgaaaat tcccggagac cagcccatcc    3240
acgccacggt taaagtcaca gagatcagac ttttctcg tcccgatgtt tgacgtgaac    3300
actaactgaa gctctcgacc tgccacatga tttctatccg atctgctcct gtgacgcata    3360
gaaaacgttc gtttgaatgt ttacatgtaa agacactcga ttctttcagt caggatagat    3420
ttttagtata tttatttgtg tggaaactga ggttttgtgc aagtcttgtt tttcatatga    3480
ctcatcatat ggacctgccc gtgtaaatac cgtctgttta catcagcagg tcacttctcc    3540
ccggatcttg tagctcgtat aatcccatca ccacccttttt aacaaatttg cttcccaatc    3600
aagtcacact acacccactg cacacgccaa cattcaggaa ttcaccgaca tgacacgcag    3660
tcgtatcttc ttccattcgc attacttcaa aacaaaaaga aagaaaaga aagacttgta    3720 ttactgaaaa aaaatagaca ctgttgaata tctgtgcgtg aatgatctcg gaatataatc    3780
gtttgcatgt ttttatatta atctctgctc acatgcttca ttctgcattc attagcagag    3840
ctttagaaac aaacttacat ctataaactt ctagtaagaa tacgttattt ccggagcttc    3900
agtaaccgag ttaggttgtc cctcgtcgtc tttgcccagg tcccgttttc gaactgcagc    3960
```

-continued

```
gaggagtgcg agcccggcac caggaagggc atcatcgagg ggaaacccac ctgctgcttc    4020
gagtgtaccg actgctctga tggagaatac agcgagtata aaggtgcagg tttattcact    4080
cttcaccacg cttttattt attaaccccca acagccagat tgagaagtac ttataagtac    4140 cccttttgtgt ttataataat aattgaaaac aaatttata tatatatata tatatatgct    4200
tattataaaa tctacaatat aactaatgta tagacatttt tcaaataaat atttatatag    4260
aaataaaact aaaaaattgc tcgtgtgttt ttatttatat atatatatat atatatatag    4320
acggtagcca tagtgctgtt gtaggtcatc cacctccgca tggtgtatgg tgtctacttc    4380
ctgtagacta tagactctga ccagtctggt cattctcctc tgatctctct catccaggcg    4440
tattcattaa caatgctcta atggcatttt gcaatcaatt tacttaaata atacattttt    4500
attattaaat gatctaaata ataaagttaa cgggtattaa taataatagt tatttcatta    4560 cctttttatgg tttgttttta ttcttaatga ttctcatttt ctttacagat gccagcgttt    4620
gtaccaaatg tcccaacaat tcttggtcca acgggaacca cacttcctgt ttcttgaagg    4680
agatcgagtt tctggcgtgg tcggagccgt tcgggatcac tctggccctg ctcgccgtgc    4740
tcggcgttct cctgacgtcc ttcgtgatgg gcgtgtttgt gcgatttagg aacacgccta    4800
tagtcaaggc ttcgaaccga gagctgtcct acttgttgct gttctcgtta atctgctgtt    4860
tctccagttc gctcgtgttc atcggcgagc cccaggactg gacgtgtcgt ttgcgccagc    4920
ccgcgttcgg gatcagcttc gtcttgtgca tctcctgcat cctggtgaag accaaccggg    4980
ttcttctggt gttcgaagcc aagattccca ccagcctcca tcgtaagtgg tggggtctga    5040
acctgcagtt cctgttggtg ttcctgttca ccttcgtgca ggtgatgatc tgcgtggtgt    5100
ggctgtacaa cgctccgccg gcgagctaca gaaactacga catcgacgag atcatcttca    5160
taacatgcaa tgaaggctcc atgatggctc tgggcttctt gatcggctac acctgcctcc    5220
tggcggccgt ctgcttctt ttcgccttca agtcgcggaa gctgccggag aacttcacgg    5280
aggccaagtt catcaccttt agcatgctca tcttcttcat cgtctggatc tccttcgtcc    5340
cagcctactt cagcacctac ggaagttcg tctctgctgt ggaggtcatc gccatcctgg    5400
cgtccagctt cagcctgctc gcgtgcatct tcttcaataa ggtctacatc atcctgttca    5460
agccttccag gaacaccatc gaggaagttc gctccagcac agcggcacac gccttcaaag    5520
cggctgcgaa agccacaatg aggcgaagct ccgccttcag gaagaggtcc agcagcgcgg    5580
gagggtccac cgcctcttcg ccatcctcgt cgatctgcct gaaagccaac gagaatgaga    5640
cagccacgcc ctccgggcag aggcggagcc aaaggcccag ggtgagcttt gaaagcggga    5700
cgatgagtct gtccatcgct tttgaggagg cgcgaaaaaa ctaaacgcac ccgcgagacg    5760
ctgctgaaat cacgaaaaca tcaaatcacg acgaaatatc tacactcggt agctgggttta   5820 tcaagtctat ccaccctgca gatcacttac taagtataca gttaccaact acagctcttc    5880
tgtcgtactg tacaaagtat tggcaccccg cccaccgaac aggtattatt tgggtgaacc    5940
gtccgttaaa ggcgacagtc gggagtttct gatgaacatg aacataaaca atacaattaa    6000
agctagtaat taaagtacaa cagtataaag caaatgctta tgactttgtc tcgcatctac    6060
atttcatact gttaactgca tcgtgttgtt tccagatcat gcaaatgatg tgcttaaatg    6120
tgtgcaacaa tttctgtaaa tcctgtactt tataaatcat tatatttcat tatctcttgt    6180
ttagaattta ataacgaatt tctttagaaa tggttccagt tttaaaaaaa atatcttta    6240 atacaatttg aatgaaaata caatgtgata tataaaactc gacataaccg gtaaaatatc    6300
gattatatca atcgaatcac gtcacgtcca aacgactcta aatcacagga aactgaatta    6360
```

-continued aatggaactt cggaacg    6377

<210> SEQ ID NO 2
<211> LENGTH: 2835
<212> TYPE: DNA
<213> ORGANISM: Panulirus interruptus

<400> SEQUENCE: 2

| | | | | | |
|---|---|---|---|---|---|
| atgaggtttt | ctttcgagct | ctatgtgcac | tacttggtgc | tgttggcttt | gaactgtgga | 60 |
| gttttatcat | acggccctcg | tcagagagct | cagaagacgg | gggacatcct | gctgggggc | 120 |
| tgttcccta | tacacttcag | agtcgcttcc | aacgaccagg | atttggctgc | taaaccggaa | 180 |
| tcaaccgagt | gcgtgaggta | caatttccgt | ggatttcgtt | ggctccaggc | tatgattttt | 240 |
| gcaatcgagg | aaatcaacaa | cagttctact | cttttaccaa | acatcacttt | ggggtacagt | 300 |
| atattcgaca | cctgtaacac | cgtctccaaa | gccctggagg | cgtctctgag | cttcgtggct | 360 |
| cagaataaga | tcgactctct | gaacttggat | gggttttgta | actgcaccgg | aacatcccg | 420 |
| tccaccatcg | ccgtggtcgg | ggcttgcgga | tcggcggttt | cgacggccgt | ggccgacctc | 480 |
| gtcggtctct | tctacatccc | acagatcagc | tatgcttctt | cgagtcgcct | tctgagcaac | 540 |
| aagaaccagt | acaagtcctt | catgaggact | attccgactg | acgagtacca | ggccatcgcg | 600 |
| atggcggcca | tcatcgatca | cttccagtgg | aactgggtca | tcgcgatcgc | tcggacgat | 660 |
| gaatacggtc | gtcccgggat | agagaaattc | gagaacgaga | tgttcgagag | ggacatctgc | 720 |
| atcgacctca | acgtgctgat | ctctcagtat | ctggaagaag | ccgagattat | ccgcattgca | 780 |
| gaccaaatcc | agaactccac | cgctaaagtc | atcgtcgtct | ttgctagcgg | gcccgacgtt | 840 |
| gagccgctgg | ttaaggaaat | ggtgaggcgc | aacatcacgg | atcgtgtgtg | gttagcgagc | 900 |
| gaagcgtggg | ctctgtcgag | cctggtggcc | aaacccgagt | acctggatgt | catgggcggg | 960 |
| acgatcggct | tcgcgctgca | ggccggacac | gtacccggat | tcaaggaatt | cctgcagcag | 1020 |
| gtccatccga | aaaaatccct | ccataacgag | ttcgtgcgag | agttttggga | agagacgttc | 1080 |
| aactgttacc | tggcggacag | tgtgaggaag | gaggacagcg | agaacagcag | cgcgggcttt | 1140 |
| aggccgcttt | gcacgggcga | ggaggacatc | acgagcgtcg | agacgcctta | cctggactac | 1200 |
| actcacctga | gaatcctcta | taacgtctac | gtggcagttt | acgccatagc | cgaggcgctg | 1260 |
| caggacattc | tcacctgtac | gcccgggaga | ggactcttcg | ctaacggatc | ctgtgctgat | 1320 |
| attcgaaaag | tggaggcgtg | gcaggtctta | aagcagctga | gcatctgaa | gttccagaac | 1380 |
| agcatgggcg | agcgagtgcg | tttcgacgag | agcagtgaac | tttctgccaa | ctacaccatc | 1440 |
| atgaactggc | accgttcccc | cgcggacggc | tcggtggtgt | tcagggaggt | cgggtactac | 1500 |
| agcgttaacg | gcaaaaaggg | cgccaaactc | tccatagaca | aaacaaaaat | actgtggaac | 1560 |
| ggctatctga | cccaggtccc | gttttcgaac | tgcagcgagg | agtgcgagcc | cggcaccagg | 1620 |
| aagggcatca | tcgagggaa | acccacctgc | tgcttcgagt | gtaccgactg | ctctgatgga | 1680 |
| gaatacagcg | agtataaaga | tgccagcgtt | tgtaccaaat | gtcccaacaa | ttcttggtcc | 1740 |
| aacgggaacc | acacttcctg | tttcttgaag | gagatcgagt | ttctggcgtg | gtcggagccg | 1800 |
| ttcgggatca | ctctggccct | gctcgccgtg | ctccggcgttc | tcctgacgtc | cttcgtgatg | 1860 |
| ggcgtgtttg | tgcgatttag | gaacacgcct | atagtcaagg | cttcgaaccg | agagctgtcc | 1920 |
| tacttgttgc | tgttctcgtt | aatctgctgt | ttctccagtt | cgctcgtgtt | catcggcgag | 1980 |
| ccccaggact | ggacgtgtcg | tttgcgccag | cccgcgttcg | ggatcagctt | cgtcttgtgc | 2040 |
| atctcctgca | tcctggtgaa | gaccaaccgg | gttcttctgg | tgttcgaagc | caagattccc | 2100 |

-continued

```
accagcctcc atcgtaagtg gtggggtctg aacctgcagt tcctgttggt gttcctgttc    2160
accttcgtgc aggtgatgat ctgcgtggtg tggctgtaca acgctccgcc ggcgagctac    2220
agaaactacg acatcgacga gatcatcttc ataacatgca atgaaggctc catgatggct    2280
ctgggcttct tgatcggcta cacctgcctc ctggcggccg tctgcttctt tttcgccttc    2340
aagtcgcgga agctgccgga gaacttcacg gaggccaagt tcatcacctt tagcatgctc    2400
atcttcttca tcgtctggat ctccttcgtc ccagcctact tcagcaccta cgggaagttc    2460
gtctctgctg tggaggtcat cgccatcctg gcgtccagct tcagcctgct cgcgtgcatc    2520
ttcttcaata aggtctacat catcctgttc aagccttcca ggaacaccat cgaggaagtt    2580
cgctccagca cagcggcaca cgccttcaaa gcggctgcga aagccacaat gaggcgaagc    2640
tccgccttca ggaagaggtc cagcagcgcg ggagggtcca ccgcctcttc gccatcctcg    2700
tcgatctgcc tgaaagccaa cgagaatgag acagccacgc cctccgggca gaggcggagc    2760
caaaggccca gggtgagctt tgaaagcggg acgatgagtc tgtccatcgc ttttgaggag    2820
gcgcgaaaaa actaa                                                     2835
```

<210> SEQ ID NO 3
<211> LENGTH: 944
<212> TYPE: PRT
<213> ORGANISM: Panulirus interruptus

<400> SEQUENCE: 3

```
Met Arg Phe Ser Phe Glu Leu Tyr Val His Tyr Leu Val Leu Leu Ala
 1               5                  10                  15

Leu Asn Cys Gly Val Leu Ser Tyr Gly Pro Arg Gln Arg Ala Gln Lys
                20                  25                  30

Thr Gly Asp Ile Leu Leu Gly Gly Leu Phe Pro Ile His Phe Arg Val
            35                  40                  45

Ala Ser Asn Asp Gln Asp Leu Ala Ala Lys Pro Glu Ser Thr Glu Cys
        50                  55                  60

Val Arg Tyr Asn Phe Arg Gly Phe Arg Trp Leu Gln Ala Met Ile Phe
 65                 70                  75                  80

Ala Ile Glu Glu Ile Asn Asn Ser Ser Thr Leu Leu Pro Asn Ile Thr
                85                  90                  95

Leu Gly Tyr Ser Ile Phe Asp Thr Cys Asn Thr Val Ser Lys Ala Leu
            100                 105                 110

Glu Ala Ser Leu Ser Phe Val Ala Gln Asn Lys Ile Asp Ser Leu Asn
        115                 120                 125

Leu Asp Gly Phe Cys Asn Cys Thr Gly Asn Ile Pro Ser Thr Ile Ala
    130                 135                 140

Val Val Gly Ala Cys Gly Ser Ala Val Ser Thr Ala Val Ala Asp Leu
145                 150                 155                 160

Val Gly Leu Phe Tyr Ile Pro Gln Ile Ser Tyr Ala Ser Ser Ser Arg
                165                 170                 175

Leu Leu Ser Asn Lys Asn Gln Tyr Lys Ser Phe Met Arg Thr Ile Pro
            180                 185                 190

Thr Asp Glu Tyr Gln Ala Ile Ala Met Ala Ala Ile Ile Asp His Phe
        195                 200                 205

Gln Trp Asn Trp Val Ile Ala Ile Ala Ser Asp Asp Glu Tyr Gly Arg
    210                 215                 220

Pro Gly Ile Glu Lys Phe Glu Asn Glu Met Phe Glu Arg Asp Ile Cys
225                 230                 235                 240

Ile Asp Leu Asn Val Leu Ile Ser Gln Tyr Leu Glu Glu Ala Glu Ile
```

-continued

```
                245                 250                 255
Ile Arg Ile Ala Asp Gln Ile Gln Asn Ser Thr Ala Lys Val Ile Val
            260                 265                 270
Val Phe Ala Ser Gly Pro Asp Val Glu Pro Leu Val Lys Glu Met Val
            275                 280                 285
Arg Arg Asn Ile Thr Asp Arg Val Trp Leu Ala Ser Glu Ala Trp Ala
            290                 295                 300
Leu Ser Ser Leu Val Ala Lys Pro Glu Tyr Leu Asp Val Met Gly Gly
305                 310                 315                 320
Thr Ile Gly Phe Ala Leu Gln Ala Gly His Val Pro Gly Phe Lys Glu
                325                 330                 335
Phe Leu Gln Gln Val His Pro Lys Lys Ser Leu His Asn Glu Phe Val
            340                 345                 350
Arg Glu Phe Trp Glu Glu Thr Phe Asn Cys Tyr Leu Ala Asp Ser Val
            355                 360                 365
Arg Lys Glu Asp Ser Glu Asn Ser Ser Ala Gly Phe Arg Pro Leu Cys
            370                 375                 380
Thr Gly Glu Glu Asp Ile Thr Ser Val Glu Thr Pro Tyr Leu Asp Tyr
385                 390                 395                 400
Thr His Leu Arg Ile Ser Tyr Asn Val Tyr Val Ala Val Tyr Ala Ile
                405                 410                 415
Ala Glu Ala Leu Gln Asp Ile Leu Thr Cys Thr Pro Gly Arg Gly Leu
            420                 425                 430
Phe Ala Asn Gly Ser Cys Ala Asp Ile Arg Lys Val Glu Ala Trp Gln
            435                 440                 445
Val Leu Lys Gln Leu Arg His Leu Lys Phe Gln Asn Ser Met Gly Glu
            450                 455                 460
Arg Val Arg Phe Asp Glu Ser Ser Glu Leu Ser Ala Asn Tyr Thr Ile
465                 470                 475                 480
Met Asn Trp His Arg Ser Pro Ala Asp Gly Ser Val Val Phe Arg Glu
                485                 490                 495
Val Gly Tyr Tyr Ser Val Asn Gly Lys Lys Gly Ala Lys Leu Ser Ile
            500                 505                 510
Asp Lys Thr Lys Ile Leu Trp Asn Gly Tyr Leu Thr Gln Val Pro Phe
            515                 520                 525
Ser Asn Cys Ser Glu Glu Cys Glu Pro Gly Thr Arg Lys Gly Ile Ile
            530                 535                 540
Glu Gly Lys Pro Thr Cys Cys Phe Glu Cys Thr Asp Cys Ser Asp Gly
545                 550                 555                 560
Glu Tyr Ser Glu Tyr Lys Asp Ala Ser Val Cys Thr Lys Cys Pro Asn
                565                 570                 575
Asn Ser Trp Ser Asn Gly Asn His Thr Ser Cys Phe Leu Lys Glu Ile
            580                 585                 590
Glu Phe Leu Ala Trp Ser Glu Pro Phe Gly Ile Thr Leu Ala Leu Leu
            595                 600                 605
Ala Val Leu Gly Val Leu Leu Thr Ser Phe Val Met Gly Val Phe Val
            610                 615                 620
Arg Phe Arg Asn Thr Pro Ile Val Lys Ala Ser Asn Arg Glu Leu Ser
625                 630                 635                 640
Tyr Leu Leu Leu Phe Ser Leu Ile Cys Cys Phe Ser Ser Ser Leu Val
                645                 650                 655
Phe Ile Gly Glu Pro Gln Asp Trp Thr Cys Arg Leu Arg Gln Pro Ala
            660                 665                 670
```

```
Phe Gly Ile Ser Phe Val Leu Cys Ile Ser Cys Ile Leu Val Lys Thr
            675                 680                 685

Asn Arg Val Leu Leu Val Phe Glu Ala Lys Ile Pro Thr Ser Leu His
        690                 695                 700

Arg Lys Trp Trp Gly Leu Asn Leu Gln Phe Leu Leu Val Phe Leu Phe
705                 710                 715                 720

Thr Phe Val Gln Val Met Ile Cys Val Val Trp Leu Tyr Asn Ala Pro
                725                 730                 735

Pro Ala Ser Tyr Arg Asn Tyr Asp Ile Asp Glu Ile Ile Phe Ile Thr
                740                 745                 750

Cys Asn Glu Gly Ser Met Met Ala Leu Gly Phe Leu Ile Gly Tyr Thr
                755                 760                 765

Cys Leu Leu Ala Ala Val Cys Phe Phe Phe Ala Phe Lys Ser Arg Lys
        770                 775                 780

Leu Pro Glu Asn Phe Thr Glu Ala Lys Phe Ile Thr Phe Ser Met Leu
785                 790                 795                 800

Ile Phe Phe Ile Val Trp Ile Ser Phe Val Pro Ala Tyr Phe Ser Thr
                805                 810                 815

Tyr Gly Lys Phe Val Ser Ala Val Glu Val Ile Ala Ile Leu Ala Ser
                820                 825                 830

Ser Phe Ser Leu Leu Ala Cys Ile Phe Phe Asn Lys Val Tyr Ile Ile
        835                 840                 845

Leu Phe Lys Pro Ser Arg Asn Thr Ile Glu Glu Val Arg Ser Ser Thr
850                 855                 860

Ala Ala His Ala Phe Lys Ala Ala Lys Ala Thr Met Arg Arg Ser
865                 870                 875                 880

Ser Ala Phe Arg Lys Arg Ser Ser Ser Ala Gly Gly Ser Thr Ala Ser
                885                 890                 895

Ser Pro Ser Ser Ser Ile Cys Leu Lys Ala Asn Glu Asn Glu Thr Ala
            900                 905                 910

Thr Pro Ser Gly Gln Arg Arg Ser Gln Arg Pro Arg Val Ser Phe Glu
        915                 920                 925

Ser Gly Thr Met Ser Leu Ser Ile Ala Phe Glu Glu Ala Arg Lys Asn
        930                 935                 940

<210> SEQ ID NO 4
<211> LENGTH: 18
<212> TYPE: PRT
<213> ORGANISM: Panulirus interruptus

<400> SEQUENCE: 4

Ser Val Asn Gly Lys Lys Gly Ala Lys Leu Ser Ile Asp Lys Thr Lys
1               5                   10                  15

Ile Leu

<210> SEQ ID NO 5
<211> LENGTH: 19
<212> TYPE: PRT
<213> ORGANISM: Panulirus interruptus

<400> SEQUENCE: 5

Ser Asp Asp Glu Tyr Gly Arg Pro Gly Ile Glu Lys Phe Glu Lys Glu
1               5                   10                  15

Asn Glu Met

<210> SEQ ID NO 6
<211> LENGTH: 19
```

```
<212> TYPE: PRT
<213> ORGANISM: Salmo salar

<400> SEQUENCE: 6

Ser Asp Asp Glu Tyr Gly Arg Pro Gly Ile Glu Lys Phe Glu Lys Glu
 1               5                  10                  15

Lys Glu Met

<210> SEQ ID NO 7
<211> LENGTH: 941
<212> TYPE: PRT
<213> ORGANISM: Salmo salar

<400> SEQUENCE: 7

Met Arg Phe Tyr Leu Tyr Tyr Leu Val Leu Leu Gly Phe Ser Ser Val
 1               5                  10                  15

Ile Ser Thr Tyr Gly Pro His Gln Arg Ala Gln Lys Thr Gly Asp Ile
             20                  25                  30

Leu Leu Gly Gly Leu Phe Pro Met His Phe Gly Val Thr Ser Lys Asp
         35                  40                  45

Gln Asp Leu Ala Ala Arg Pro Glu Ser Thr Glu Cys Val Arg Tyr Asn
     50                  55                  60

Phe Arg Gly Phe Arg Trp Leu Gln Ala Met Ile Phe Ala Ile Glu Glu
 65                  70                  75                  80

Ile Asn Asn Ser Ser Thr Leu Leu Pro Asn Ile Thr Leu Gly Tyr Arg
                 85                  90                  95

Ile Phe Asp Thr Cys Asn Thr Val Ser Lys Ala Leu Glu Ala Thr Leu
            100                 105                 110

Ser Phe Val Ala Gln Asn Lys Ile Asp Ser Leu Asn Leu Asp Glu Phe
        115                 120                 125

Cys Asn Cys Thr Asp His Ile Pro Ser Thr Ile Ala Val Val Gly Ala
    130                 135                 140

Ser Gly Ser Ala Val Ser Thr Ala Val Ala Asn Leu Leu Gly Leu Phe
145                 150                 155                 160

Tyr Ile Pro Gln Ile Ser Tyr Ala Ser Ser Arg Leu Leu Ser Asn
                165                 170                 175

Lys Asn Gln Phe Lys Ser Phe Met Arg Thr Ile Pro Thr Asp Glu His
                180                 185                 190

Gln Ala Thr Ala Met Ala Asp Ile Ile Asp Tyr Phe Gln Trp Asn Trp
            195                 200                 205

Val Ile Ala Val Ala Ser Asp Asp Glu Tyr Gly Arg Pro Gly Ile Glu
210                 215                 220

Lys Phe Glu Lys Glu Met Glu Glu Arg Asp Ile Cys Ile His Leu Ser
225                 230                 235                 240

Glu Leu Ile Ser Gln Tyr Phe Glu Glu Trp Gln Ile Gln Gly Leu Val
                245                 250                 255

Gly Arg Ile Glu Asn Ser Ser Ala Lys Val Ile Val Val Phe Ala Ser
            260                 265                 270

Gly Pro Asp Ile Glu Pro Leu Ile Lys Glu Met Val Arg Arg Asn Ile
        275                 280                 285

Thr Asp Arg Ile Trp Leu Ala Ser Glu Ala Trp Ala Thr Thr Ser Leu
    290                 295                 300

Ile Ala Lys Pro Glu Tyr Leu Asp Val Val Gly Thr Ile Gly Phe
305                 310                 315                 320

Ala Leu Arg Ala Gly Glu Ile Pro Gly Phe Lys Asp Phe Leu Gln Glu
                325                 330                 335
```

```
Val Thr Pro Lys Lys Ser Ser His Asn Glu Phe Val Arg Glu Phe Trp
            340                 345                 350

Glu Glu Thr Phe Asn Cys Tyr Leu Glu Asp Ser Gln Arg Leu Arg Asp
            355                 360                 365

Ser Glu Asn Gly Ser Thr Ser Phe Arg Pro Leu Cys Thr Gly Glu Glu
            370                 375                 380

Asp Ile Met Gly Ala Glu Thr Pro Tyr Leu Asp Tyr Thr His Leu Arg
385                 390                 395                 400

Ile Ser Tyr Asn Val Tyr Val Ala Val His Ser Ile Ala Gln Ala Leu
            405                 410                 415

Gln Asp Ile Leu Thr Cys Ile Pro Gly Arg Gly Leu Phe Ser Asn Asn
            420                 425                 430

Ser Cys Ala Asp Ile Lys Lys Ile Glu Ala Trp Gln Val Leu Lys Gln
            435                 440                 445

Leu Arg His Leu Asn Phe Ser Asn Ser Met Gly Glu Lys Val His Phe
            450                 455                 460

Asp Glu Asn Ala Asp Pro Ser Gly Asn Tyr Thr Ile Ile Asn Trp His
465                 470                 475                 480

Arg Ser Pro Glu Asp Gly Ser Val Val Phe Glu Glu Val Gly Phe Tyr
            485                 490                 495

Asn Met Arg Ala Lys Arg Gly Val Gln Leu Phe Ile Asp Asn Thr Lys
            500                 505                 510

Ile Leu Trp Asn Gly Tyr Asn Thr Glu Val Pro Phe Ser Asn Cys Ser
            515                 520                 525

Glu Asp Cys Glu Pro Gly Thr Arg Lys Gly Ile Ile Glu Ser Met Pro
            530                 535                 540

Thr Cys Cys Phe Glu Cys Thr Glu Cys Ser Gly Glu Tyr Ser Asp
545                 550                 555                 560

His Lys Asp Ala Ser Val Cys Thr Lys Cys Pro Asn Asp Ser Trp Ser
            565                 570                 575

Asn Glu Asn His Thr Ser Cys Phe Leu Lys Glu Ile Glu Phe Leu Ser
            580                 585                 590

Trp Thr Glu Pro Phe Gly Ile Ala Leu Ala Leu Cys Ser Val Leu Gly
            595                 600                 605

Val Phe Leu Thr Ala Phe Val Met Gly Val Phe Ile Lys Phe Arg Asn
            610                 615                 620

Thr Pro Ile Val Lys Ala Thr Asn Arg Glu Leu Ser Tyr Leu Leu Leu
625                 630                 635                 640

Phe Ser Leu Ile Cys Cys Phe Ser Ser Ser Leu Ile Phe Ile Gly Glu
            645                 650                 655

Pro Gln Asp Trp Thr Cys Arg Leu Arg Gln Pro Ala Phe Gly Ile Ser
            660                 665                 670

Phe Val Leu Cys Ile Ser Cys Ile Leu Val Lys Thr Asn Arg Val Leu
            675                 680                 685

Leu Val Phe Glu Ala Lys Ile Pro Thr Ser Leu His Arg Lys Trp Trp
            690                 695                 700

Gly Leu Asn Leu Gln Phe Leu Leu Val Phe Leu Phe Thr Phe Val Gln
705                 710                 715                 720

Val Met Ile Cys Val Val Trp Leu Tyr Asn Ala Pro Pro Ala Ser Tyr
            725                 730                 735

Arg Asn His Asp Ile Asp Glu Ile Ile Phe Ile Thr Cys Asn Glu Gly
            740                 745                 750

Ser Met Met Ala Leu Gly Phe Leu Ile Gly Tyr Thr Cys Leu Leu Ala
```

```
                   755                 760                 765
Ala Ile Cys Phe Phe Ala Phe Lys Ser Arg Lys Leu Pro Glu Asn
            770                 775                 780

Phe Thr Glu Ala Lys Phe Ile Thr Phe Ser Met Leu Ile Phe Phe Ile
785                 790                 795                 800

Val Trp Ile Ser Phe Ile Pro Ala Tyr Phe Ser Thr Tyr Gly Lys Phe
                805                 810                 815

Val Ser Ala Val Glu Val Ile Ala Ile Leu Ala Ser Ser Phe Gly Leu
                820                 825                 830

Leu Ala Cys Ile Phe Phe Asn Lys Val Tyr Ile Ile Leu Phe Lys Pro
            835                 840                 845

Ser Arg Asn Thr Ile Glu Glu Val Arg Cys Ser Thr Ala Ala His Ser
850                 855                 860

Phe Lys Val Ala Ala Lys Ala Thr Leu Arg His Ser Ser Ala Ser Arg
865                 870                 875                 880

Lys Arg Ser Ser Ser Val Gly Gly Ser Cys Ala Ser Thr Pro Ser Ser
                885                 890                 895

Ser Ile Ser Leu Lys Thr Asn Asp Asn Asp Ser Pro Ser Gly Gln Gln
                900                 905                 910

Arg Ile His Lys Pro Arg Val Ser Phe Gly Ser Gly Thr Val Thr Leu
            915                 920                 925

Ser Leu Ser Phe Glu Glu Ser Arg Lys Asn Ser Met Lys
930                 935                 940

<210> SEQ ID NO 8
<211> LENGTH: 797
<212> TYPE: PRT
<213> ORGANISM: Nematostella vectensis

<400> SEQUENCE: 8

Leu Asn Gly Asp Leu Val Leu Gly Gly Leu Phe Pro Val His Val Leu
1               5                   10                  15

Lys Ala Val Gly Asp Arg Lys Gly Ser Asp Leu Asn Tyr Tyr Ala Ile
                20                  25                  30

Thr Trp Val Glu Ala Met Leu Tyr Ala Leu Asn Glu Ile Arg His Asn
            35                  40                  45

Ser Ser Met Leu Gln Asn Tyr Thr Leu Gly Phe Asp Ile Arg Asp Ser
        50                  55                  60

Cys Asn Lys Val Ser Thr Ala Leu Glu Ala Ser Leu Asp Phe Leu Leu
65                  70                  75                  80

Gly Asp Thr Ala Gly Lys Thr Trp Asn Ala Ser Cys Phe Cys Glu Pro
                85                  90                  95

Leu Val Gly Ala Val Ile Gly Gly Ala Ala Ser Pro Ile Ser Leu Asn
                100                 105                 110

Ile Ala Asn Val Leu Ser Val Asn Asp Ile Pro Gln Ile Ser Tyr Ser
            115                 120                 125

Ser Thr Ser Val Leu Leu Ser Asn Lys Asp Val Tyr Pro Ser Phe Leu
        130                 135                 140

Arg Thr Ile Pro Ser Asp Thr Tyr Gln Ala Lys Ala Ile Ala Asp Leu
145                 150                 155                 160

Leu Ala Ala Phe Gln Trp Ala Tyr Val Ser Val Ala Ser Asp Asp
                165                 170                 175

Ala Tyr Gly Arg Ala Gly Met Asp Ala Leu Lys Glu Glu Leu Lys Lys
                180                 185                 190

Arg Asp Ile Cys Leu Ala Ile Asp Ala Ile Phe His His Glu Met Tyr
```

```
            195                 200                 205
Lys Ser Glu Leu His Gln Ile Ile Thr Ser Leu Lys Ser Lys Pro Arg
210                 215                 220

Ala Lys Val Ile Val Leu Trp Cys Gln Arg Pro Asn Ala Ile Gly Phe
225                 230                 235                 240

Leu Gln Val Ala Thr Glu Leu Gln Leu Thr Gln Arg Thr Trp Ile Gly
                245                 250                 255

Thr Glu Thr Trp Gly Asp Ser Tyr Leu Leu Ser Leu Ser Gln Asp
        260                 265                 270

Ile Val Gly Gly Leu Val Gly Val Pro His Leu Ile Lys Asn Pro
            275                 280                 285

Gly Phe Glu Ser His Leu Ser Gly Leu Ser Pro Ala Asn Ser Glu Arg
        290                 295                 300

Asn Pro Trp Met Phe Glu Tyr Trp Glu Gln Glu Phe Ser Cys His Lys
305                 310                 315                 320

Thr Ala Asn Asp Ser Tyr Met Leu Asn Thr Ala Asn Tyr Phe Val Tyr
                325                 330                 335

Lys Thr Asn Ser Asp Val Asn Val Thr Ile Gly Lys Pro Thr Thr Glu
            340                 345                 350

Phe Leu Pro Arg Asn Lys Tyr Thr Asn Val Met Asp Ala Val Tyr Ser
                355                 360                 365

Val Ala Tyr Ala Val Gln Ala Leu Leu Lys Glu Asn Thr Asn Ser Ser
        370                 375                 380

Lys Lys Thr Thr Ile Ser Pro Lys Gln Leu Leu Gly Tyr Ile Lys Asn
385                 390                 395                 400

Thr Ser Phe Ala Gly Leu Ser Gly Ser Val Val Ser Phe Asp Lys Asn
                405                 410                 415

Gly Asp Leu Lys Tyr Gly Ser Phe Ser Ile Lys Ser Leu Gln Val Asp
            420                 425                 430

Ala Ser Lys Pro Ala Lys Met Lys Phe Val Glu Ile Gly Ser Trp Glu
        435                 440                 445

Gly Val Thr Gly Glu Leu Lys Ile Phe Asp Glu Val Ser Phe Lys Trp
450                 455                 460

Asn Gly Trp Arg Asn Glu Thr Pro Val Ser Arg Cys Asn Asp Ile Cys
465                 470                 475                 480

Ala Pro Gly Gln Tyr Pro Val Asn Gly Ser Thr Arg Cys Cys Trp Thr
                485                 490                 495

Cys Val Pro Cys Pro Ala Gly Leu Ile Lys Pro Ser Arg Gly Gln Asp
            500                 505                 510

Gly Cys Lys Gly Cys Pro Glu Gly Tyr Glu Ala Asn Glu Met His Thr
        515                 520                 525

Ser Cys Val Gln Ile Thr Glu Glu Tyr Leu Arg Trp Gly Ser Thr Ser
    530                 535                 540

Gly Ile Ile Val Leu Val Phe Ser Ser Leu Gly Thr Met Leu Ser Ile
545                 550                 555                 560

Thr Val Ile Thr Ile Phe Ile Lys His Arg Glu Thr Ala Val Val Lys
                565                 570                 575

Ala Ser Asn Arg Glu Leu Ser Phe Val His Leu Ala Cys Ile Leu Leu
            580                 585                 590

Thr Phe Thr Phe Pro Phe Ser Leu Val Gly Arg Pro Ser Arg Val Gln
        595                 600                 605

Cys Gly Val Trp Pro Phe Val Phe Ala Val Val Phe Cys Leu Gly Thr
610                 615                 620
```

```
Ser Ile Met Leu Leu Lys Thr Asp Arg Leu Leu Arg Val Phe Arg Ala
625                 630                 635                 640

Lys Ala Arg Leu Thr Ser Arg Ser Asn Leu Leu Thr Asn Lys Met Gln
                645                 650                 655

Phe Leu Thr Ala Ser Ala Leu Thr Ser Phe Pro Val Val Met Ser Ala
            660                 665                 670

Val Trp Phe Leu Ile Ser Pro Pro Asp Val Thr Val Thr Gln Gln Gly
        675                 680                 685

Ala Thr Arg Arg Val Met Cys Asp Lys Asn Val Tyr Thr Val Gln Leu
    690                 695                 700

Val Ile Leu Val Tyr Ile Leu Val Leu Ala Leu Val Cys Thr Tyr Phe
705                 710                 715                 720

Ala Tyr Arg Ala Arg Thr Leu Pro Glu Asn Phe Asn Glu Ala Lys Phe
                725                 730                 735

Ile Gly Phe Ala Met Phe Ala Phe Cys Ile Ser Trp Leu Cys Tyr Phe
            740                 745                 750

Ala Ala Ser Tyr Gly Ser Ala Ala Val Asp Arg Val Leu Ile Leu Cys
        755                 760                 765

Val Thr Ile Leu Ala Ser Gly Phe Ile Val Leu Gly Met Met Tyr Phe
770                 775                 780

Pro Lys Val Gln Ile Ile Val Phe Tyr Pro Ser Arg Asn
785                 790                 795

<210> SEQ ID NO 9
<211> LENGTH: 756
<212> TYPE: PRT
<213> ORGANISM: Ciona intestinalis

<400> SEQUENCE: 9

Ser Tyr Lys His Pro Gly Asn Ile Thr Ile Ala Gly Leu Phe Pro His
1               5                   10                  15

Tyr Ile Ser Asp Arg Pro Asp Met Tyr Arg Tyr Asn Phe Leu Gly Phe
            20                  25                  30

Arg Trp Met Gln Ala Met Ile Phe Ala Ile Gln Glu Ile Asn Asn Arg
        35                  40                  45

Ser Asp Ile Leu Pro Asn Ile Ser Leu Gly Trp Gln Leu Phe Asp Thr
    50                  55                  60

Cys Asn Thr His Ala Arg Ala Val Thr Gln Ala Leu His Val Val Asp
65                  70                  75                  80

Ser Ile Tyr Lys Leu Tyr Tyr Met Ser Ser Cys Leu Ser Ala Leu Ile
                85                  90                  95

Gly Pro Thr Ala Ser Asp Lys Ser Ile Val Val Ser Asn Ile Leu Ser
            100                 105                 110

Val Phe Asp Val Pro Gln Ile Ser Tyr Gly Ser Thr Ser Arg Leu Leu
        115                 120                 125

Ser Asn Lys Asn Ile Tyr Asn Ser Phe Leu Arg Thr Ile Pro Asn Asp
    130                 135                 140

Asp Glu Gln Ala Thr Ala Met Val Gly Leu Leu Leu His His Asn Trp
145                 150                 155                 160

Thr Trp Val Gly Ala Val Ala Gly Asp Asp Asp Tyr Gly Arg Pro Gly
                165                 170                 175

Ile Ser Arg Phe Lys Glu Glu Ala Glu Lys His Gly Ile Cys Val Glu
            180                 185                 190

Tyr Thr Ala Tyr Val Ser Glu Val Arg Val Pro Leu Pro Ser Ser Ile
        195                 200                 205
```

-continued

Glu Trp Cys Leu Ser Ile Leu Lys Gln Pro His Tyr Met Ala Thr Leu
    210                 215                 220
Ile Ile His Gln Lys Gly Arg Phe Phe Ser Ser Trp Thr Arg Leu Gln
225                 230                 235                 240
Glu Pro Leu Lys Pro Gln Thr Tyr Ala Ser Thr Arg Phe Cys Val Leu
                245                 250                 255
Leu Pro His His Ser Met Ile Asn Asn Phe Leu Ser Phe Ile Gln Ser
            260                 265                 270
Phe Leu Pro Phe Asn Met Leu Thr Phe Gly Gln Cys Ser Asp Ser Leu
        275                 280                 285
Ile His Gln Lys Cys Val Lys Gln Gly Val Thr Gln Leu Val Ile Lys
290                 295                 300
Ala Ser Thr Leu Met Val Arg Phe Gln Ser Ser Gly Val Asn Ile Tyr
305                 310                 315                 320
Glu Leu Gly Ile Asn Tyr Met Arg Leu Gly Ile Ile Ser Ile Glu Phe
                325                 330                 335
Ala Ile Lys Asn Tyr Tyr Ile Leu Val His Gln Pro Lys Gln Ile
            340                 345                 350
Asn Phe Leu Thr His Met Pro Cys Leu Val Ile Ser Val Val Glu
        355                 360                 365
Phe Ser His Ala Ser Gln Ile Asn Phe Tyr Pro Leu Ile Gln Phe Asn
370                 375                 380
Phe Asp Glu Asn Gly Asp Pro Asn Ala Ser Tyr Lys Leu Val Ser Trp
385                 390                 395                 400
Ile Gly Asn Ile Thr Val Asp Phe Val His Val Gly Asn Tyr Ser Ser
                405                 410                 415
Met Val Thr Pro Lys Trp Ser Ile Asn Glu Ser Ala Ile Tyr Trp His
            420                 425                 430
Lys His Asn Asp Ile Pro Lys Ser Val Cys Asn Ala Asp Cys Gln Pro
        435                 440                 445
Gly Tyr Tyr Lys Ile Gln Leu Gln Ser Ala Cys Cys Phe Lys Cys Ala
450                 455                 460
Glu Cys Pro Ser Gly Glu Tyr Ser Val Asp Ile Asn Ser Pro Val Cys
465                 470                 475                 480
Thr Pro Cys Asn Leu Thr His Arg Ala Asp Asp Asn Arg Thr Ser Cys
                485                 490                 495
Ile Pro Lys Asn Glu Glu Tyr Ile Arg Trp Ser Asp Ala Phe Gly Val
            500                 505                 510
Thr Phe Cys Val Leu Ser Gly Ile Gly Ile Leu Leu Thr Leu Phe Thr
        515                 520                 525
Ala Gly Ser Phe Met Lys Met Arg Arg Thr Pro Leu Val Lys Ala Thr
530                 535                 540
Asn Arg Glu Leu Ser Phe Leu Leu Phe Leu Ser Ile Phe Cys Cys Phe
545                 550                 555                 560
Leu Thr Pro Leu Leu Tyr Leu Gly Lys Pro Gln Asp Trp Asn Cys Lys
                565                 570                 575
Gly Arg Thr Val Thr Phe Ser Leu Ser Phe Thr Phe Cys Ile Ala Ala
            580                 585                 590
Ile Leu Val Lys Thr Leu Arg Val Leu Thr Ala Phe Glu Ala Arg Ile
        595                 600                 605
Pro Val Thr Lys Trp Leu Gly Glu His Val Gln Val Phe Val Val Met
610                 615                 620
Val Val Ser Leu Val Gln Val Ile Leu Ser Val Thr Trp Leu Val Val
625                 630                 635                 640

```
Asp Pro Pro Lys Val Met Leu Ser Gln Asp Ile Ser Leu Ile Val Glu
            645                 650                 655

Cys Asn Val Gly Asn Leu Val Ile Met Gly Phe Val Tyr Gly Tyr Leu
            660                 665                 670

Cys Leu Leu Ala Leu Thr Ala Phe Val Phe Ala Phe Arg Ala Arg Lys
            675                 680                 685

Leu Pro Glu Asn Phe Asn Glu Ala Lys Phe Ile Thr Phe Ser Met Leu
            690                 695                 700

Ile Phe Phe Ile Val Trp Leu Ser Phe Ile Pro Ala Tyr Leu Ser Thr
705                 710                 715                 720

Thr Ala Thr Ala Val Ser Cys Ile Ala Ile Leu Ser Ser Thr Phe Ala
                    725                 730                 735

Leu Leu Ala Cys Ile Phe Phe Pro Lys Leu Tyr Val Ile Tyr Trp Thr
                740                 745                 750

Pro Gln Arg Asn
            755

<210> SEQ ID NO 10
<211> LENGTH: 826
<212> TYPE: PRT
<213> ORGANISM: Stongylocentrotus purpuratus

<400> SEQUENCE: 10

Val Lys Leu Cys Gly Leu Phe Ser Ile His Phe Arg Val Asp Ile Asp
1               5                   10                  15

Asp Met Ser Trp Thr Glu Gly Pro Ala Arg Glu Arg Cys Asp Gly Tyr
            20                  25                  30

His Met Leu Ser Tyr Leu Arg Ala Arg Ala Met Thr Tyr Ala Ile Asp
        35                  40                  45

Glu Ile Asn His Asn Thr Asp Ile Leu Asn His Ile Gln Leu Asp Tyr
    50                  55                  60

Asp Ile Arg Asp Ile Cys Asn Trp Lys Ser Ser Ala Leu Arg Ala Ala
65                  70                  75                  80

Ser Gln Cys Leu Gly Leu Glu Tyr Asp Glu Glu Ala Ile Thr Leu Asn
                85                  90                  95

Ser Asp Pro Ala Ile Thr Asn His Ser Ala Leu Leu Phe Ile Gly Pro
            100                 105                 110

Asp Thr Ser Glu Ser Ala Glu Thr Val Ala Asp Tyr Ala Gln Asn Phe
        115                 120                 125

Gly Val Pro Val Ile Ser Tyr Ser Ala Thr Ser Ala Leu Leu Ser Asp
    130                 135                 140

Arg Thr Lys Tyr Arg Thr Phe Phe Arg Thr Val Pro Ser Asp Ile His
145                 150                 155                 160

Gln Ala Ala Ala Val Ala Glu Leu Ile Ala Ser Glu Gly Trp Asn Trp
                165                 170                 175

Val Gly Leu Ile Ala Leu Asp Asn Ser Tyr Gly Arg Ser Ile Ala Val
            180                 185                 190

Asp Phe Arg Ala Arg Ala Ala Arg Leu Gly Ile Cys Ile Ala Leu Asp
        195                 200                 205

Leu Leu Val Ser Arg Glu Val Asp Asp Glu Gly Met Gln Arg Leu Val
    210                 215                 220

Asp Gly Ile Glu Met Asn Pro Val Leu Glu Val Met Val Ala Phe Thr
225                 230                 235                 240

Tyr Thr Lys Thr Leu Ile Ser Ile Leu Glu Lys Ala Glu Ile Arg Leu
                245                 250                 255
```

```
Pro Gly Lys Lys Phe Thr Trp Ile Ala Ser Asp Val Trp Ala Thr Ser
            260                 265                 270

Thr Ala Ile Ser Ser Arg Asn Tyr Gly Ile Leu Gly Asn Val Leu Gly
        275                 280                 285

Val Val Leu Gln Thr His Glu Ile Pro Gly Phe Val Pro Tyr Leu Ala
    290                 295                 300

Ser Leu Asn Pro Thr Asp His Arg Phe Gln Asn Asp Thr Trp Leu Arg
305                 310                 315                 320

Glu Ile Trp Glu Thr Asn Phe His Cys Ser Phe Ser Asp Pro Asn Lys
                325                 330                 335

Thr Ile Ala Ala Lys Cys Ala Ser His Asp Leu Met Asp Leu Glu Ser
                340                 345                 350

Val Arg Gly Tyr Ser Arg Ser Phe Ser Leu Tyr His Val Tyr Leu Ala
            355                 360                 365

Val Tyr Thr Ala Ala Tyr Thr Leu Arg Ser Ile Glu Glu Cys Thr Thr
    370                 375                 380

Pro Gly Gly Leu Leu Ala Glu Gly Arg Cys Pro Asp Leu Asn Asp Leu
385                 390                 395                 400

Glu Pro Trp Gln Leu Ile Asn Tyr Leu Asn Gln Val Asn Phe Thr Lys
                405                 410                 415

Leu Ser Gly Ser Lys Asp Thr Ser Pro Tyr His Thr Phe Asn Glu Asn
            420                 425                 430

Gly Glu Met Ala Ala Asn Phe Cys Ile Val His Trp Gln Ser Thr Glu
        435                 440                 445

Glu Gln Thr Val Arg Phe Val Glu Ile Gly Arg Phe Asp Val Gln Pro
    450                 455                 460

Asn Gly Glu Gly Ala Leu Thr Leu Asp Arg Thr Leu Ile Asp Trp His
465                 470                 475                 480

His Gln Pro Pro Glu Gly Val Cys Arg Ala Ala Cys Gln Pro Gly Tyr
                485                 490                 495

Val Lys Ser Thr Arg Glu Gly Ser Pro Pro Cys Cys Phe Asp Cys Glu
            500                 505                 510

Ala Cys Pro Val Gly Ser Ile Thr Asn Gln Thr Gly Arg Thr His Cys
        515                 520                 525

Ile Gln Cys Pro Glu Gly Glu Trp Ser Asn Asp Asp Arg Thr Ala Cys
    530                 535                 540

Leu Pro Lys Phe Thr Asp Val Leu Val Trp Gln Asp Pro Val Ala Ile
545                 550                 555                 560

Val Cys Leu Val Ile Cys Gly Ile Gly Val Ile Cys Thr Leu Val Ser
                565                 570                 575

Leu Gly Ile Phe Ile His His His Asp Thr Ala Val Val Arg Ala Ser
            580                 585                 590

Asn Arg Pro Leu Ser Tyr Cys Leu Leu Cys Leu Leu Met Leu Gly Phe
        595                 600                 605

Val Glu Pro Val Leu Tyr Val Gly Thr Pro Thr Asn Trp Thr Cys Asn
    610                 615                 620

Phe Arg Ile Ala Leu His Ser Val Leu Asn Ala Ala Ile Leu Ala Leu
625                 630                 635                 640

Phe Leu Val Lys Thr Arg Arg Ile Leu Ala Val Phe Asp Glu Ser Leu
                645                 650                 655

Val Lys Arg Val Leu Arg Asn Thr Ser Ala Gln Val Val Leu Phe Ile
            660                 665                 670

Leu Leu Trp Val Ile Gln Val Ala Val Val Thr Ala Tyr Leu Ser Leu
```

```
                675                 680                 685
Ala Pro Ser Arg Val Gln Val Glu Tyr Asn Leu Ser Thr Thr Lys Val
690                 695                 700

Tyr Ile Val Cys Glu Ser Asn Leu Tyr Cys Phe Ile Val Met Tyr Ser
705                 710                 715                 720

Tyr Ile Ala Leu Ile Ala Ile Ile Cys Phe Val Leu Ser Phe Arg Ala
            725                 730                 735

Arg Lys Ile Pro Glu Asn Phe His Glu Thr Arg Tyr Ile Thr Val Thr
            740                 745                 750

Met Met Phe Tyr Ile Val Ile Trp Ile Val Ser Leu Pro Leu Tyr Phe
            755                 760                 765

Ser Ile Asn Gly Ser Leu Gln Ser Leu Leu Gln Met Ile Thr Thr Trp
            770                 775                 780

Leu Ser Asn Ala Met Ile Leu Gly Phe Met Phe Val Pro Lys Cys Tyr
785                 790                 795                 800

Ile Ile Leu Ala Arg Pro Glu Thr Asn Thr Ser Asn Asn Val Arg Arg
            805                 810                 815

Lys Ala Ser Lys Phe Pro Val Gly Ala Glu
            820                 825

<210> SEQ ID NO 11
<211> LENGTH: 746
<212> TYPE: PRT
<213> ORGANISM: Caenorhabditis elegans

<400> SEQUENCE: 11

Gly Asp Ile Leu Ile Gly Gly Val Phe Pro Val His Ser Lys Ser Leu
1               5                   10                  15

Asn Gly Asp Glu Pro Cys Gly Glu Ile Ala Glu Thr Arg Gly Val His
            20                  25                  30

Arg Val Glu Ala Met Leu Tyr Ala Leu Asp Gln Ile Asn Ser Gln Asn
        35                  40                  45

Asp Phe Leu Arg Gly Tyr Lys Leu Gly Ala Leu Ile Leu Asp Ser Cys
    50                  55                  60

Ser Asn Pro Ala Tyr Ala Leu Asn Gln Ser Leu Asp Phe Val Arg Asp
65                  70                  75                  80

Met Ile Gly Ser Ser Glu Ala Ser Asp Tyr Val Cys Leu Asp Gly Ser
                85                  90                  95

Asp Pro Asn Leu Lys Lys Gln Ser Gln Lys Asn Val Ala Ala Val
            100                 105                 110

Asn Leu Leu Arg Leu Phe Arg Ile Ala Gln Val Ser Pro Ala Ser Thr
        115                 120                 125

Asn Ala Asp Leu Ser Asp Lys Asn Arg Phe Glu Tyr Phe Ala Arg Thr
    130                 135                 140

Val Pro Ser Asp Asp Tyr Gln Ala Met Ala Met Val Glu Ile Ala Val
145                 150                 155                 160

Lys Phe Lys Trp Ser Tyr Val Ser Leu Val Tyr Ser Ala Asp Glu Tyr
                165                 170                 175

Gly Glu Leu Gly Ala Asp Ala Phe Lys Lys Glu Ala Arg Lys Lys Gly
            180                 185                 190

Ile Cys Ile Ala Leu Glu Glu Arg Ile Gln Asn Lys Lys Glu Ile Asn
        195                 200                 205

Asn Leu Val Gln Asn Val Gly Ala Thr Val Val Leu Phe Val Gly
    210                 215                 220

Thr Glu Tyr Ile Pro Asp Ile Leu Arg Tyr Thr Ala Glu Arg Met Lys
```

-continued

```
               225                 230                 235                 240
        Ile Trp Leu Ala Ser Glu Ser Trp Asp Lys Tyr Thr Ala Gly Asp Asn
                         245                 250                 255
        Arg Leu Ala Ala Gln Gly Ala Ile Val Leu Met Leu Ala Ser Gln Lys
                         260                 265                 270
        Val Pro Ser Phe Glu Glu Tyr Phe Met Ser Leu His Pro Gly Thr Glu
                         275                 280                 285
        Ala Phe Glu Arg Asn Lys Trp Leu Arg Glu Leu Trp Gln Val Lys Tyr
                 290                 295                 300
        Lys Cys Glu Phe Asp Thr Pro Pro Gly Ser Thr Ala Ser Arg Cys Glu
        305                 310                 315                 320
        Asp Ile Lys Gln Ser Thr Glu Gly Phe Asn Ala Asp Lys Val Gln
                         325                 330                 335
        Phe Val Ile Asp Ala Val Tyr Ala Ile Ala His Gly Leu Gln Ser Met
                         340                 345                 350
        Lys Gln Ala Ile Cys Pro Asp Asp Ala Ile Cys His Ala Met Gln Asn
                         355                 360                 365
        Ile Asp Gly Ser Asp Phe Arg Leu Ser Pro Phe Ser Asp Ile Val Gly
                 370                 375                 380
        Lys Arg Phe Arg Phe Ser Pro Gln Gly Asp Gly Pro Ala Ser Tyr Thr
        385                 390                 395                 400
        Ile Arg Met Thr Asp Asp Glu Ser Val Glu Ile Gly His Trp Ser Glu
                         405                 410                 415
        Asn Asn Leu Thr Ile Tyr Glu Lys Asn Leu Trp Trp Asp Pro Asp His
                         420                 425                 430
        Thr Pro Val Ser Val Cys Ser Leu Pro Cys Lys Ile Gly Phe Arg Lys
                         435                 440                 445
        Gln Leu Ile Lys Asp Glu Gln Cys Cys Trp Ala Cys Ser Lys Cys Glu
                 450                 455                 460
        Asp Tyr Glu Tyr Leu Ile Asn Glu Thr His Cys Val Gly Cys Glu Gln
        465                 470                 475                 480
        Gly Trp Trp Pro Thr Lys Asp Arg Lys Gly Cys Phe Leu Lys Tyr Met
                         485                 490                 495
        Arg Trp Arg Ser Met Tyr Ser Leu Val Pro Thr Ile Leu Ala Val Phe
                         500                 505                 510
        Gly Ile Ile Ala Thr Leu Phe Val Ile Val Tyr Val Ile Tyr Asn
                         515                 520                 525
        Glu Thr Pro Val Val Lys Ala Ser Gly Arg Glu Leu Ser Tyr Ile Leu
                 530                 535                 540
        Leu Ile Ser Met Ile Met Cys Tyr Cys Met Thr Phe Val Leu Leu Ser
        545                 550                 555                 560
        Lys Pro Ser Ala Ile Val Cys Ala Ile Lys Arg Thr Gly Ile Gly Phe
                         565                 570                 575
        Ala Phe Ser Cys Leu Tyr Ser Ala Met Phe Val Lys Thr Asn Arg Ile
                         580                 585                 590
        Phe Arg Ile Phe Ser Thr Arg Ser Ala Gln Arg Pro Arg Phe Ile Ser
                         595                 600                 605
        Pro Ile Ser Gln Val Val Met Thr Ala Met Leu Ala Gly Val Gln Leu
                 610                 615                 620
        Ile Trp Leu Ser Val Val Pro Pro Gly Trp Arg His Tyr Pro Thr
        625                 630                 635                 640
        Arg Asp Gln Val Val Leu Thr Cys Asn Val Pro Asp His His Phe Leu
                         645                 650                 655
```

```
Tyr Ser Leu Ala Tyr Asp Gly Phe Leu Ile Val Leu Cys Thr Thr Tyr
            660             665             670
Ala Val Lys Thr Arg Lys Val Pro Glu Asn Phe Asn Glu Thr Lys Phe
            675             680             685
Ile Gly Phe Ser Met Tyr Thr Thr Cys Val Val Trp Leu Ser Trp Ile
            690             695             700
Phe Phe Phe Phe Gly Thr Gly Ser Asp Phe Ser Leu Cys Ile Ser Ile
705             710             715             720
Ser Met Ser Ala Asn Val Ala Leu Ala Cys Ile Phe Ser Pro Lys Leu
            725             730             735
Trp Ile Ile Leu Phe Glu Lys His Lys Asn
            740             745
```